United States Patent [19]

Copland et al.

[11] 3,760,362

[45] Sept. 18, 1973

[54] OIL FIELD PRODUCTION AUTOMATION METHOD AND APPARATUS

[75] Inventors: George V. Copland; Edward W. Gass, both of Duncan, Okla.

[73] Assignee: Halliburton Company, Duncan, Okla.

[22] Filed: Oct. 19, 1971

[21] Appl. No.: 190,481

Related U.S. Application Data

[63] Continuation-in-part of Ser. No. 876,911, Nov. 14, 1969, Pat. No. 3,629,859.

[52] U.S. Cl. .......................... 340/172.5, 340/151.1

[51] Int. Cl. .......................... H04b 3/00

[58] Field of Search .......................... 340/172.5; 235/151.1, 151.21

[56] References Cited

UNITED STATES PATENTS

| | | | |
|---|---|---|---|
| 3,350,687 | 10/1967 | Gabrielson et al. | 340/163 |
| 3,400,378 | 9/1968 | Smith et al. | 340/172.5 |
| 3,403,382 | 9/1968 | Frielinghaus et al. | 340/172.5 |
| 3,452,330 | 6/1969 | Avery | 340/172.5 |
| 3,564,509 | 2/1971 | Perkins et al. | 340/172.5 |
| 3,588,834 | 6/1971 | Pedersen et al. | 340/172.5 |

*Primary Examiner*—Paul J. Henon
*Assistant Examiner*—James D. Thomas
*Attorney*—Burns, Doane, Swecker & Mathis

[57] ABSTRACT

A system for monitoring the fluid production at a producing oil well. At the central station, a computer is connected through commercial telephone lines to the producing oil well sites which are referred to as satellite stations each having a telephone subscriber's apparatus connected to a nearby commercial telephone exchange. Data phones provided by the telephone company can be used in conjunction with teletypewriting equipment and calls initiated by automatic dialing equipment also supplied by the telephone company. Monitoring of gas, oil, and water content as well as the temperature and pressure at the site can be achieved. Commands for changing valve settings at the well sites can be sent from the central station, and the command executed at the satellite station after checking the command instruction for accuracy.

29 Claims, 44 Drawing Figures

SYSTEM

PATENTED SEP 18 1973

3,760,362

FIG. 1 SYSTEM

INVENTORS
GEORGE V. COPLAND
EDWARD W. GASS

BY Burns, Doane, Swecker & Mathis
ATTORNEYS

WELL TEST UNIT 32

REMOTE TERMINAL UNIT 30

NOR GATE

NOR GATE

NAND GATE

NAND GATE

JK FLIPFLOP

BCD/DECIMAL CONVERTER

BCD COUNTER

INVERTER

INVERTER

INPUT TIMING CIRCUIT 104

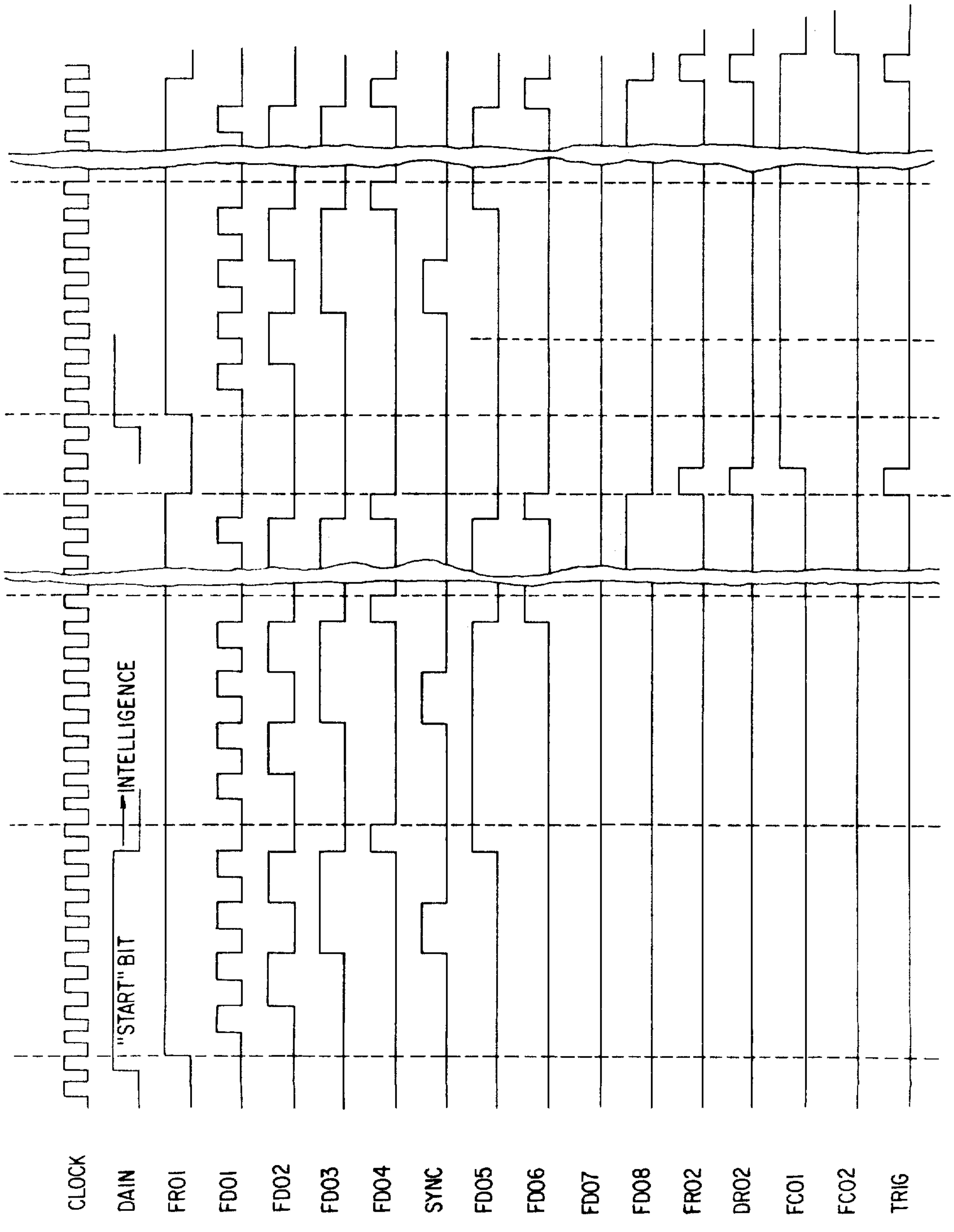
FIG. 6 TIMING DIAGRAM

SCAN DECODE CIRCUIT

SCAN DECODE CIRCUIT

OUTPUT BUSS LOGIC CIRCUIT

CONTROL RELAY LOGIC CIRCUIT

STATUS/ALARM REGISTER

OIL FIELD PRODUCTION AUTOMATION METHOD AND APPARATUS

RELATED APPLICATIONS

This application is a continuation-in-part of copending application Ser. No. 876,911 filed Nov. 14, 1969, for "Oil Field Production Automation Method and Apparatus," now Letters U.S. Pat. No. 3,629,859

BACKGROUND OF THE INVENTION

The subject invention relates to a method and apparatus for the acquisition of production data at a master or central processing station from a plurality of remote well test stations, and, more specifically, to the automatic monitoring and evaluation of conditions at a plurality of distant wells and the modification of the conditions in response to the evaluation.

Producing oil wells are often widely spaced, not only in a given field, but the fields of interest to any given party may be spread across the nation and even around the world. It is often desirable to monitor the production fluid at each producing oil well, not only for volume, but also for other conditions, such as oil and gas content, temperature, and pressure. The overall operation of the formation may also be of interest. Indeed, monitoring these conditions may be required by law in operations such as the comingling of leases. These conditions further may require the institution of corrective action to prevent the disasters too often prevalent in the production of oil, and to prevent waste in the form of contamination, spillage, the unnecessary handling of fluids, etc.

While data representative of conditions at the wells has in the past been gathered manually or by recording instruments located in the fields, this monitoring has generally required the services of large numbers of personnel stationed in the fields to gather the data accumulated by the recording devices, to evaluate the data, and to perform the function of control in response to the evaluation. Inaccuracies in transcribing the data have traditionally been a problem. The assignment of a number of wells to one man has been the natural compromise between the expense attendant to large numbers of employees in the fields and the delay occasioned by the lack of an attendant immediately present in reacting to an adverse condition.

It has been proposed that the evaluation functions be performed with the assistance of computers at a central station. In an effort to implement the central evaluation and control concept, initial efforts generally involved the recording of analog data at the various well sites and the periodic collection of the data by personnel for delivery to a field office for conversion to machine readable form and for transmission to the central station. Control function commands could thereafter be relayed from the personnel at the field office to personnel at the well site for execution.

A more recent development in increasing the availability of information at the master or central processing station for evaluation purposes and in increasing the speed of execution of the command signals at the well site has involved closed circuit telegraph or telephone lines for the transmission of data, alarms and command signals. While systems such as these have provided split second control due to having the computer at the central station constantly on-line with the wells, the degree of control is generally quite excessive and the expense associated with the installation of the closed loop system is quite high. No storage of the information is normally furnished until the data is stored in the computer at the central station.

In another type of data acquisition system disclosed in U.S. Pat. No. 3,400,378 to Smith et al. issued on Sept. 3, 1968, a plurality of remote stations are periodically interrogated from a master station to provide information for evaluation purposes at the master station. The master station is provided with programming means which automatically interrogates the remote stations by sequentially dialing stored telephone numbers assigned to the remote stations. When a particular telephone number is dialed, the designated remote station answers the call and, in response to the completed call, transmits alarm and data signals in the form of coded tones to the master station. The programming means at the master station can then evaluate the performance of the equipment at the remote station and such information as the quantity of products sold or used at the remote station.

All of the data stored at the remote station is transmitted to the master station each time the master station and the remote station are connected through the commercial telephone network. The master station then automatically advances to the next telephone number in the sequence and interrogates the remote station assigned that number. If because of apparent erroneous transmission of data, the validity of the received data must be verified, the telephone number of the remote station must be dialed again. Since the master station automatically advances to the next sequential stored telephone number, it is necessary to wait until the next operational cycle to verify the received data. Moreover, if only a particular block of data such as information concerning a single product is desired, the master station must receive all of the data stored at the remote station and then sort out the desired data after all data is received.

This lack of selective transmission of data between the two stations and lack of versatility in selective interrogation of remote stations may result in excessive interrogation time and excessive transmission of data where only one block of data is required. In addition, the Smith et al. system does not provide any means for controlling the operation of the remote station where, for example, it is desirable to control the position of valves and effect other control functions at the remote station.

It is accordingly an object of the present invention to provide a novel method and apparatus for the selective remote acquisition of data from a remote station.

It is another object of the present invention to provide a novel method and apparatus for the control of the remote station from a master station for selectively effecting control functions.

It is another object of the present invention to provide a novel method and apparatus for the remote acquisition of production data from a plurality of well test stations, each having a plurality of producing oil wells associated therewith, while simultaneously controlling apparatus with the well test stations and the associated oil wells.

Another object of the present invention is to provide a novel system including a master station having digital data processing apparatus and control means for selectively generating command signals, including a plurality of remote satellite stations each having a plurality of condition responsive sensors, digital data storage means, and apparatus to be controlled, and including a conventional commercial voice quality communication system interconnecting the master station and satellite stations.

Still another object of the present invention is to provide a novel data terminal unit for selectively transmitting serial data from a plurality of digital data accumulators upon command.

Yet another object of the present invention is to provide a novel method and apparatus for the selective transmission, error checking, and execution of a command word at a remote station under the control of teletype unit operating personnel or a computer at a master station.

Still a further object of the present invention is to provide a novel method and apparatus for oil field production automation which is directly expandable within the capacity of a general purpose digital computer to include additional data terminal units and additional transducers at each of the data terminal units.

Yet a further object of the present invention is to provide a novel system in which the maintenance and service groups are already established for the data processing and communication equipment, thereby realizing a substantial cost savings in the minimizing of the additional sensing equipment required.

Yet still a further object of the present invention is to provide a novel method and system in which the time base customarily generated at the field interface terminal for the purpose of accumulating digital data over a fixed time interval is eliminated by the utilization of a bank of a digital data accumulators at the remote terminal unit responsive to the time base within the data processing equipment at the master station.

Another object of the present invention is to provide a novel method and apparatus in which the accumulation of data may be selectively inhibited during the transmission of data from the satellite to the master station, thereby allowing multiple transmissions for an accuracy check.

These and other objects and advantages will be readily apparent to one skilled in the art to which the invention pertains from the claims from the following more detailed description when read in conjunction with the appended drawings.

THE DRAWINGS

Figure 1:
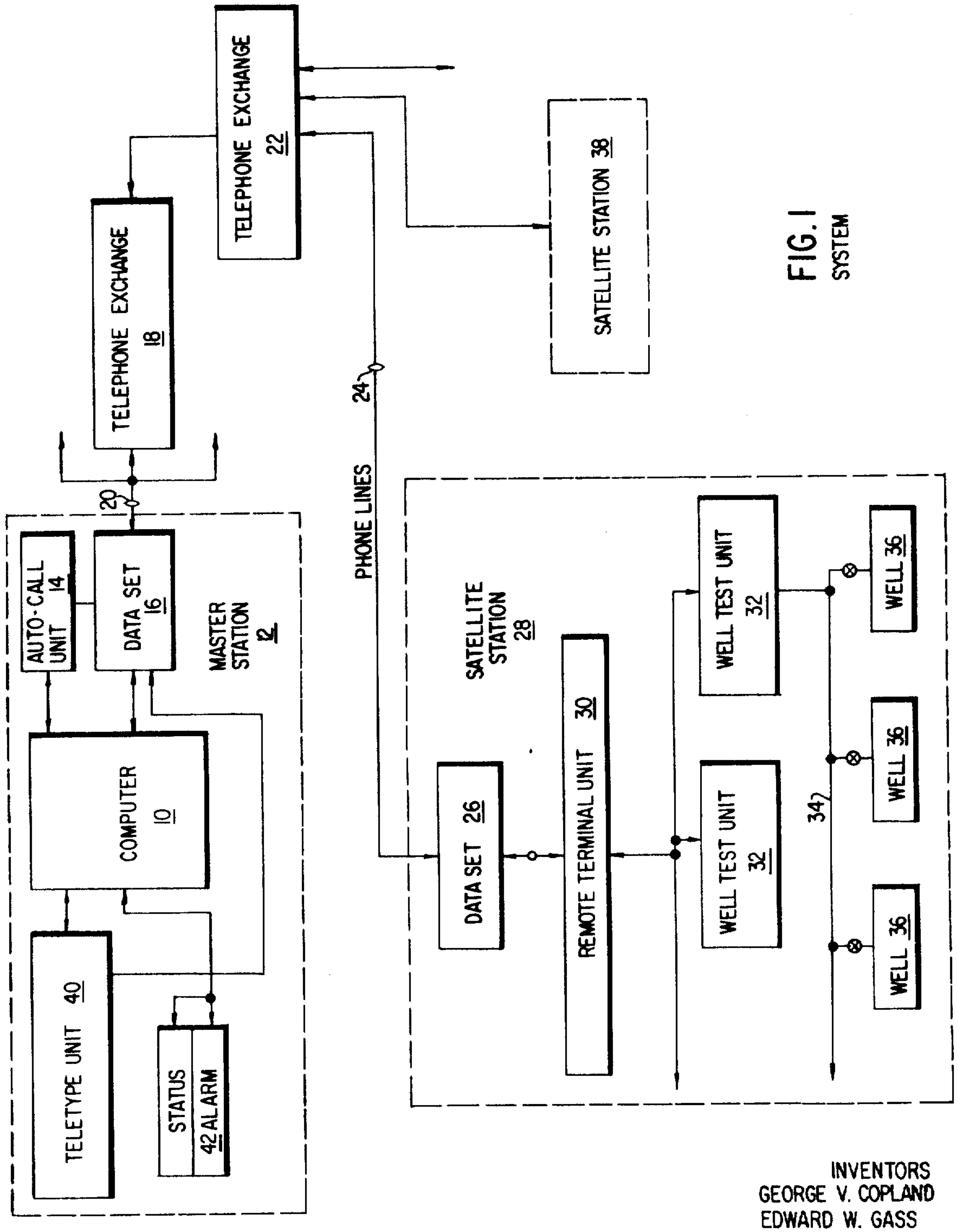
FIG. 1 is a functional block diagram of the system of the present invention.
Figure 3A:
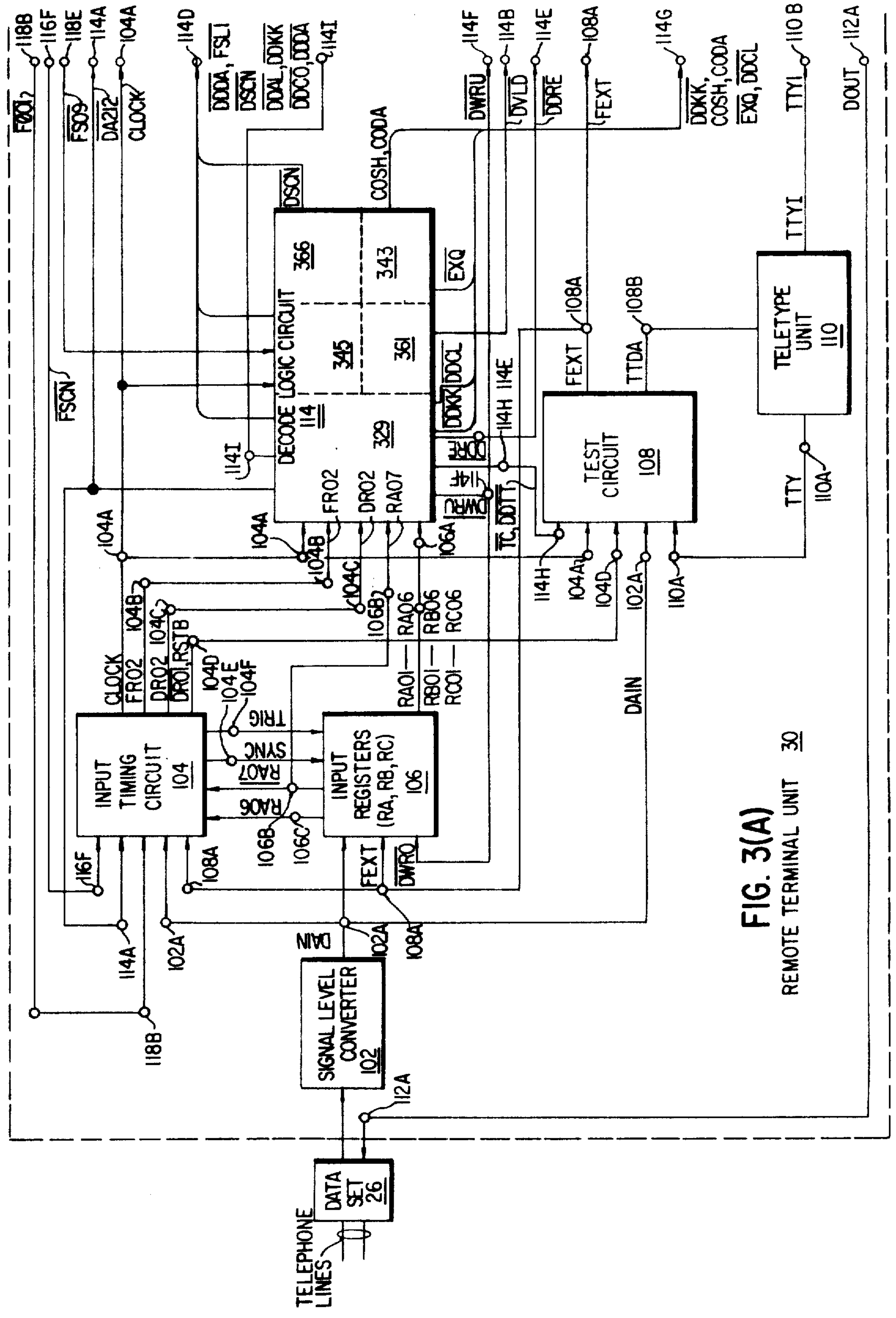
Figure 3B:
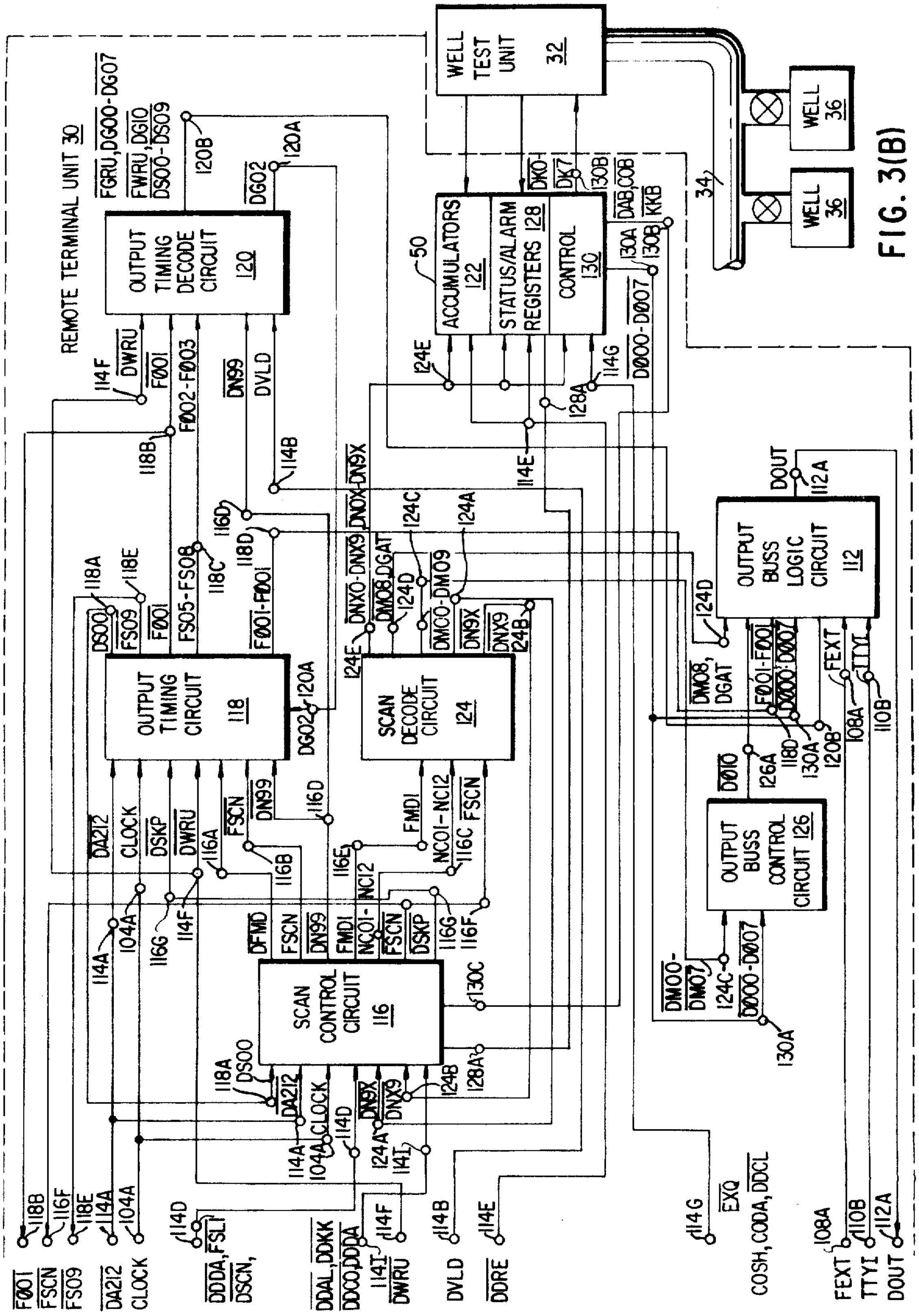
Figure 5:
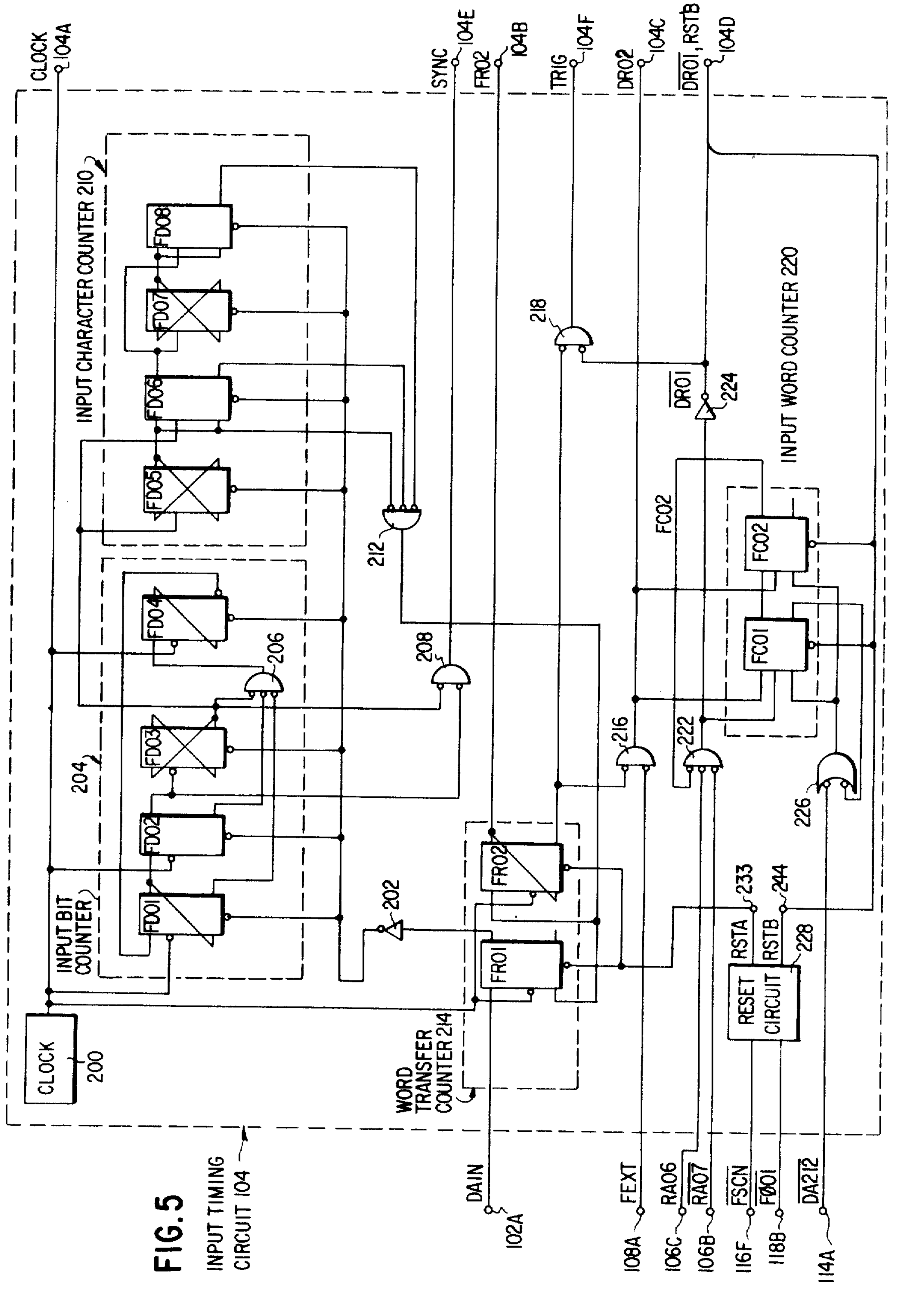
Figure 5A:
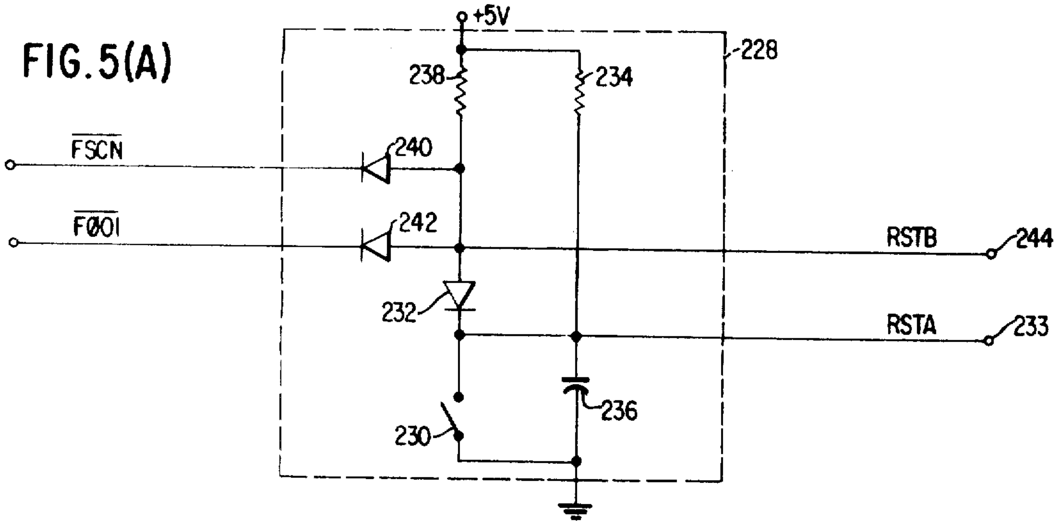
Figure 23:
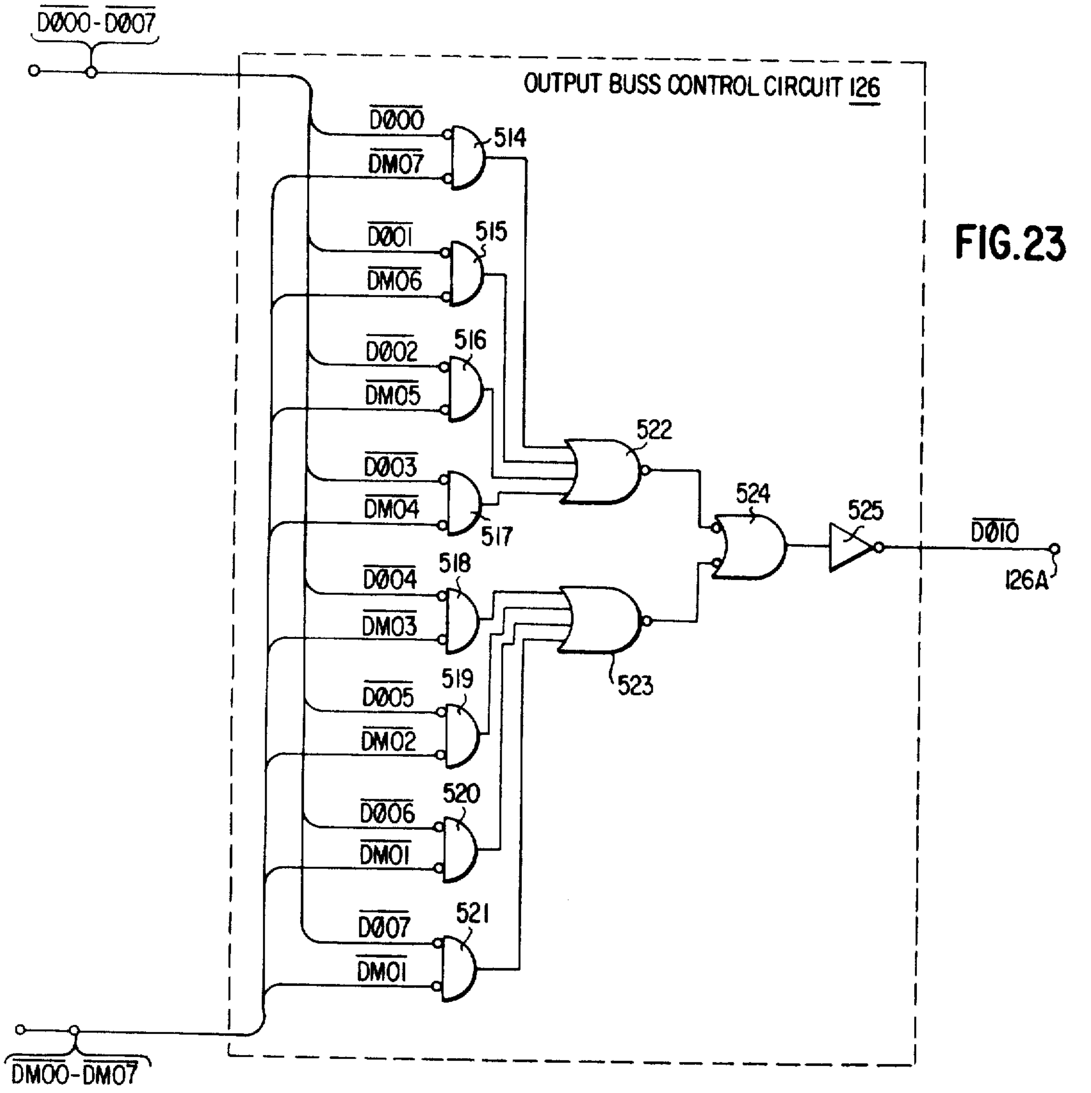
Figure 7:
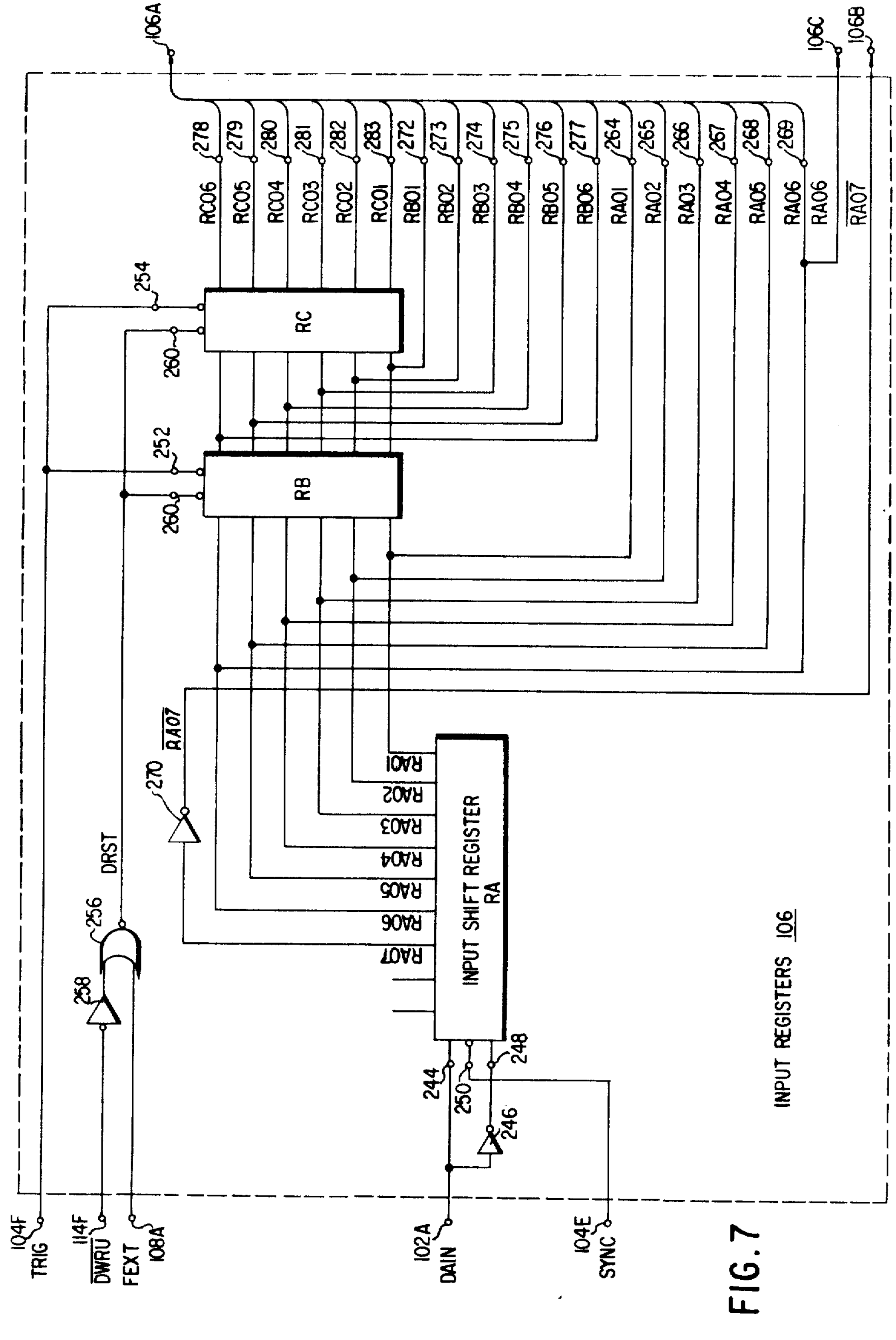
Figure 8A:
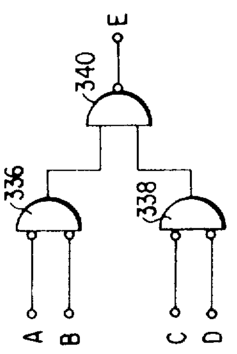
Figure 8B:
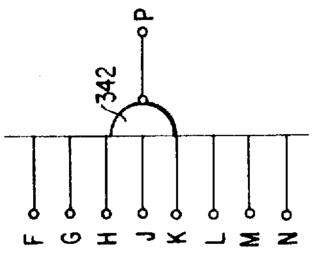
Figure 8:
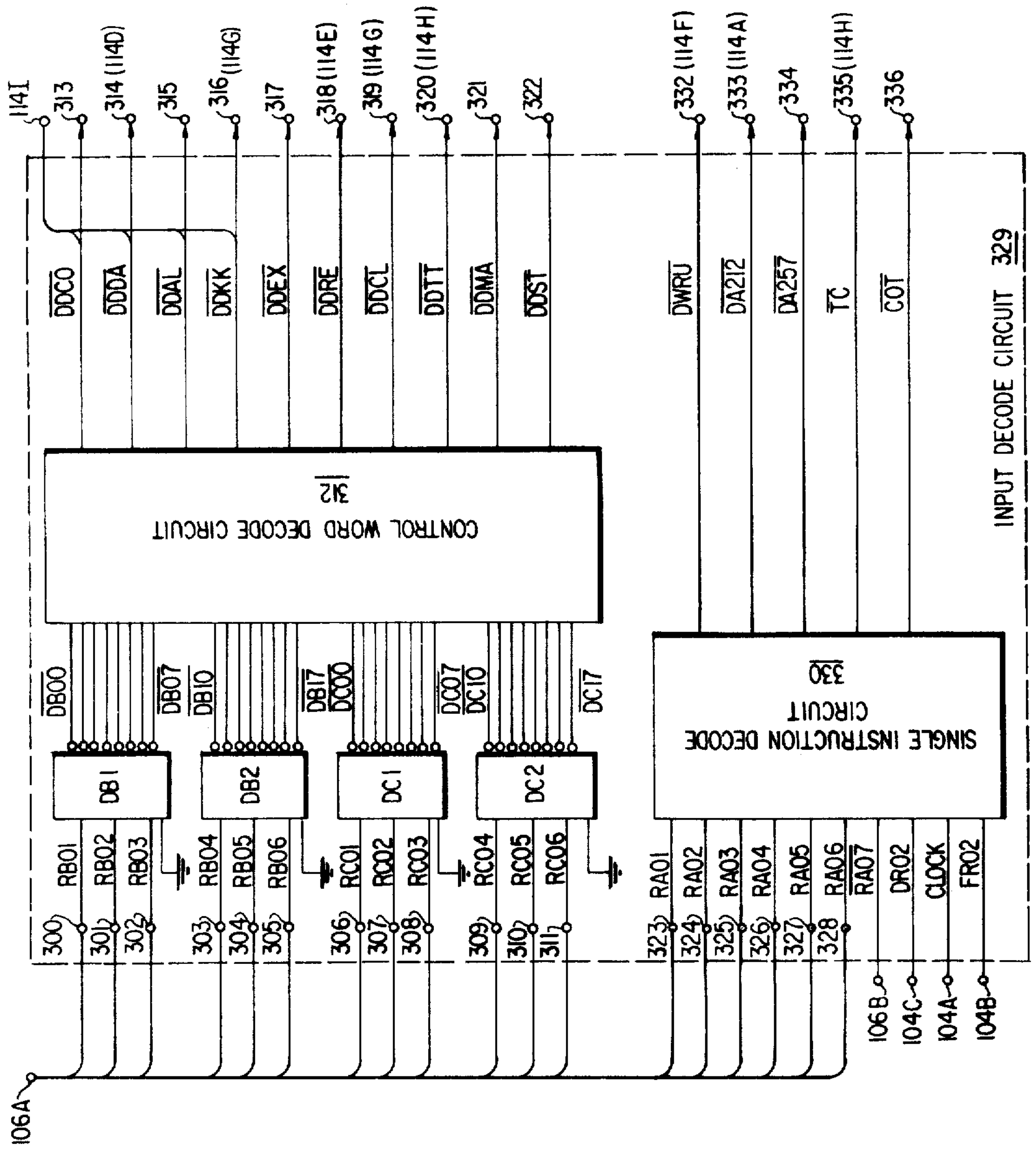
Figure 12:
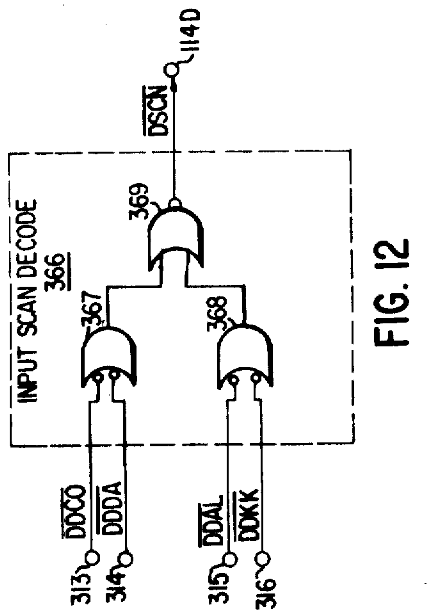
Figure 10:
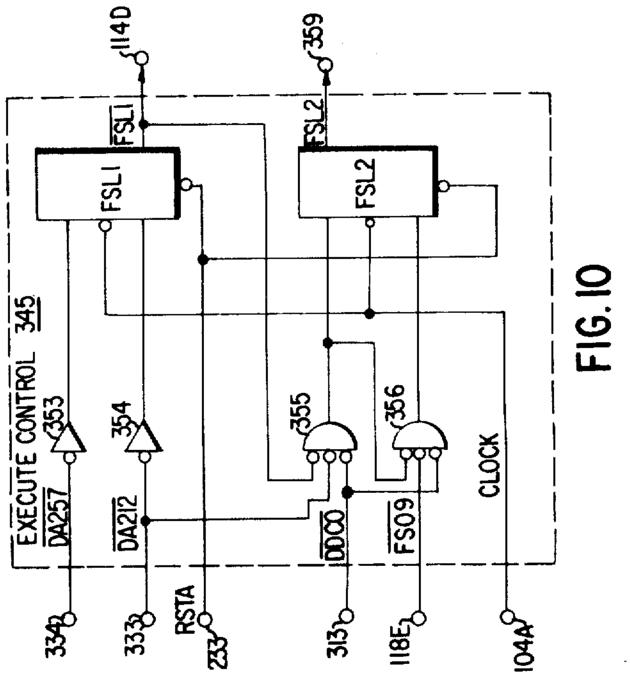
Figure 9:
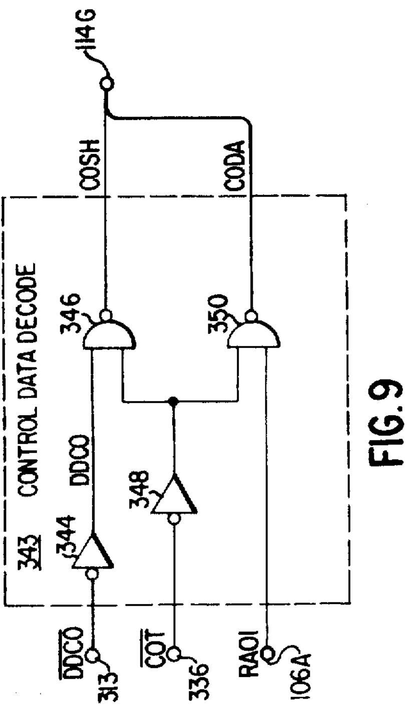
Figure 11:
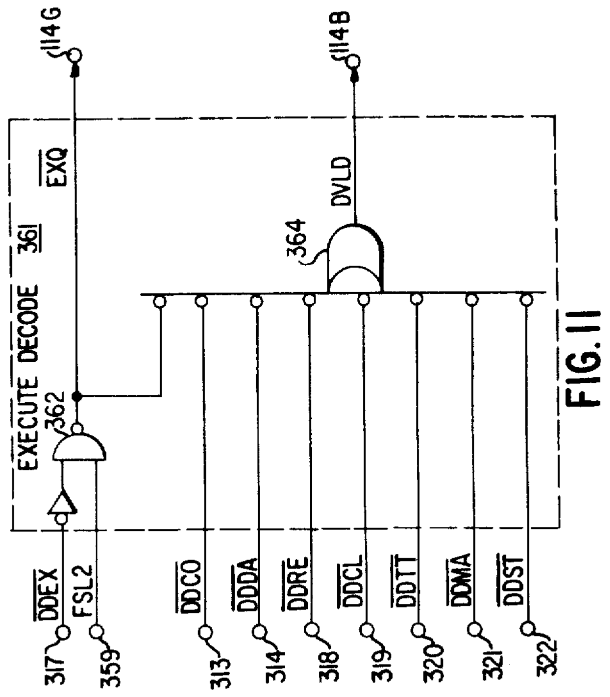
Figure 13:
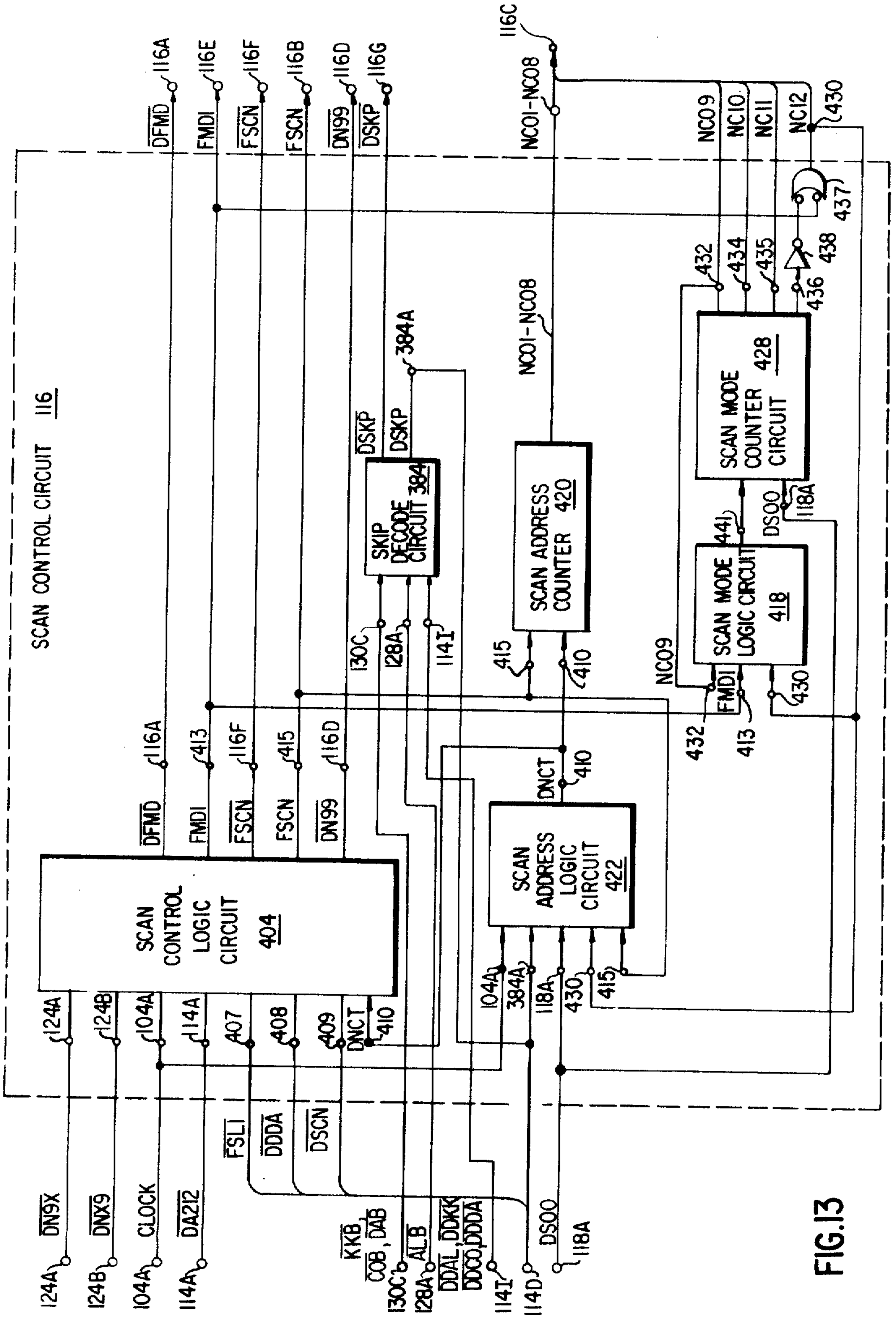
Figures 14, 26B:
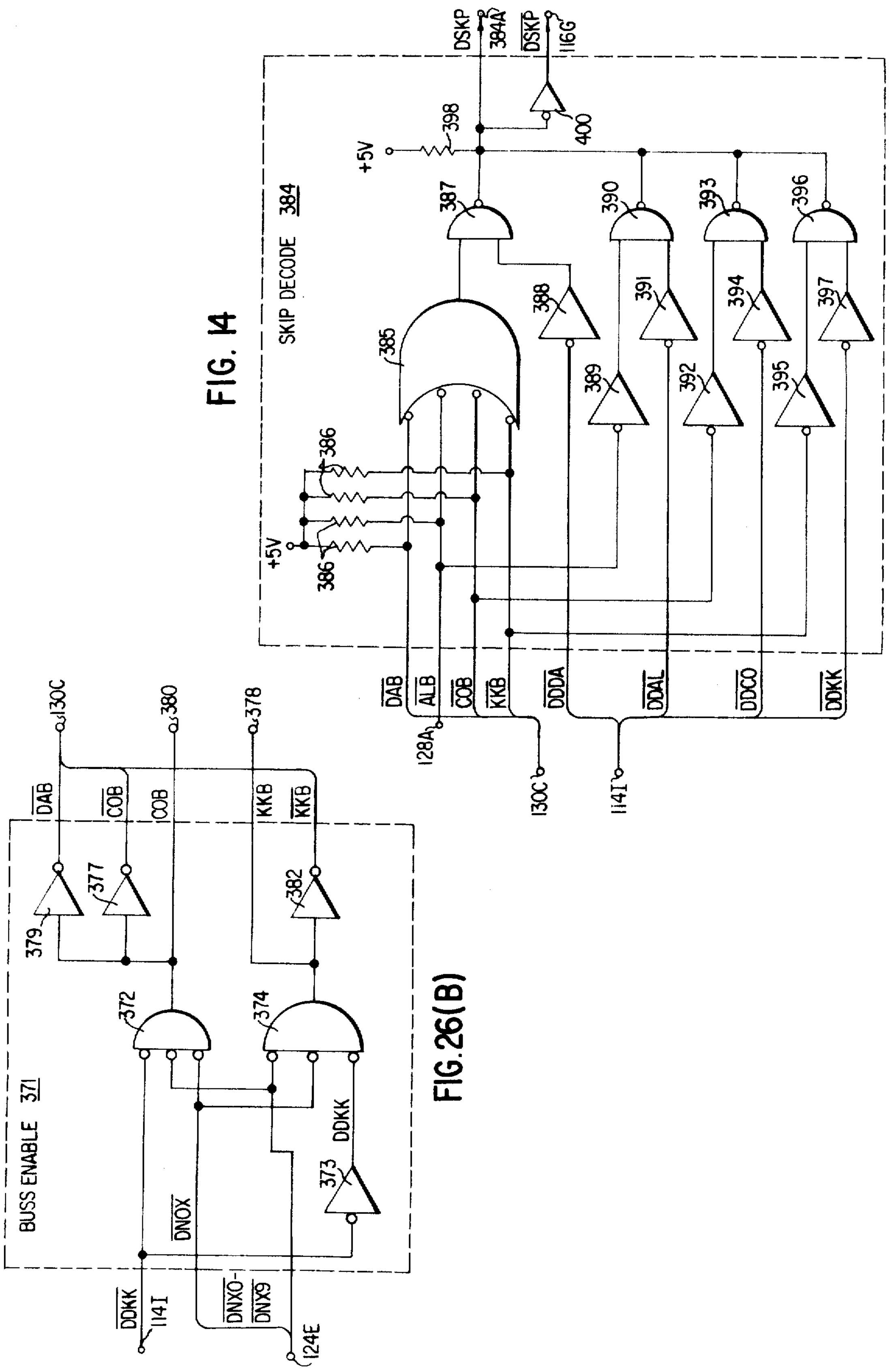
Figure 15:
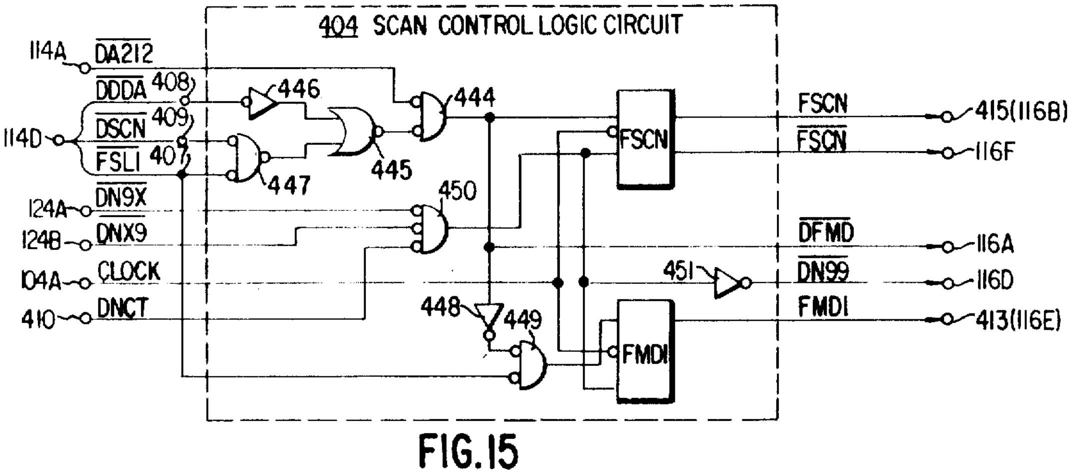
Figure 16:
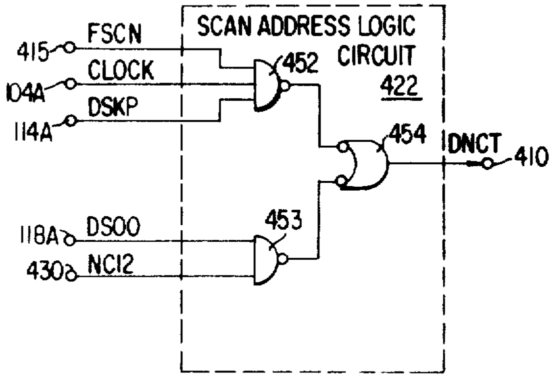
Figure 17:
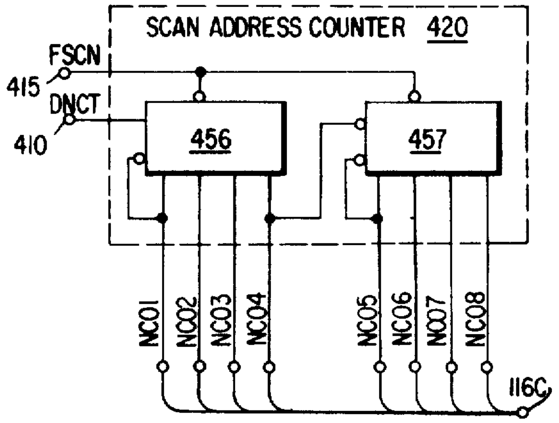
Figure 18:
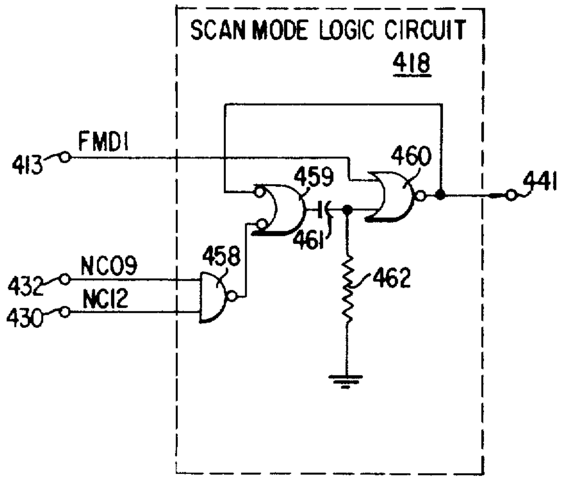
Figure 19:
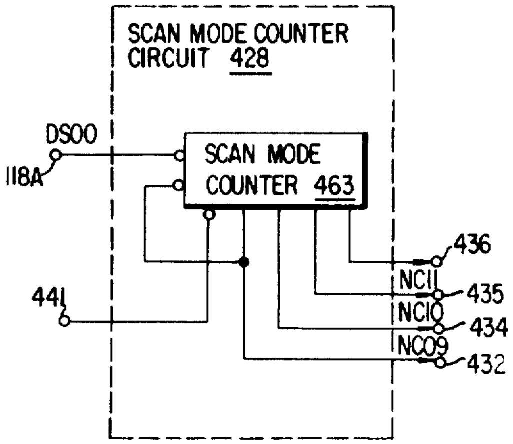
Figure 20A:
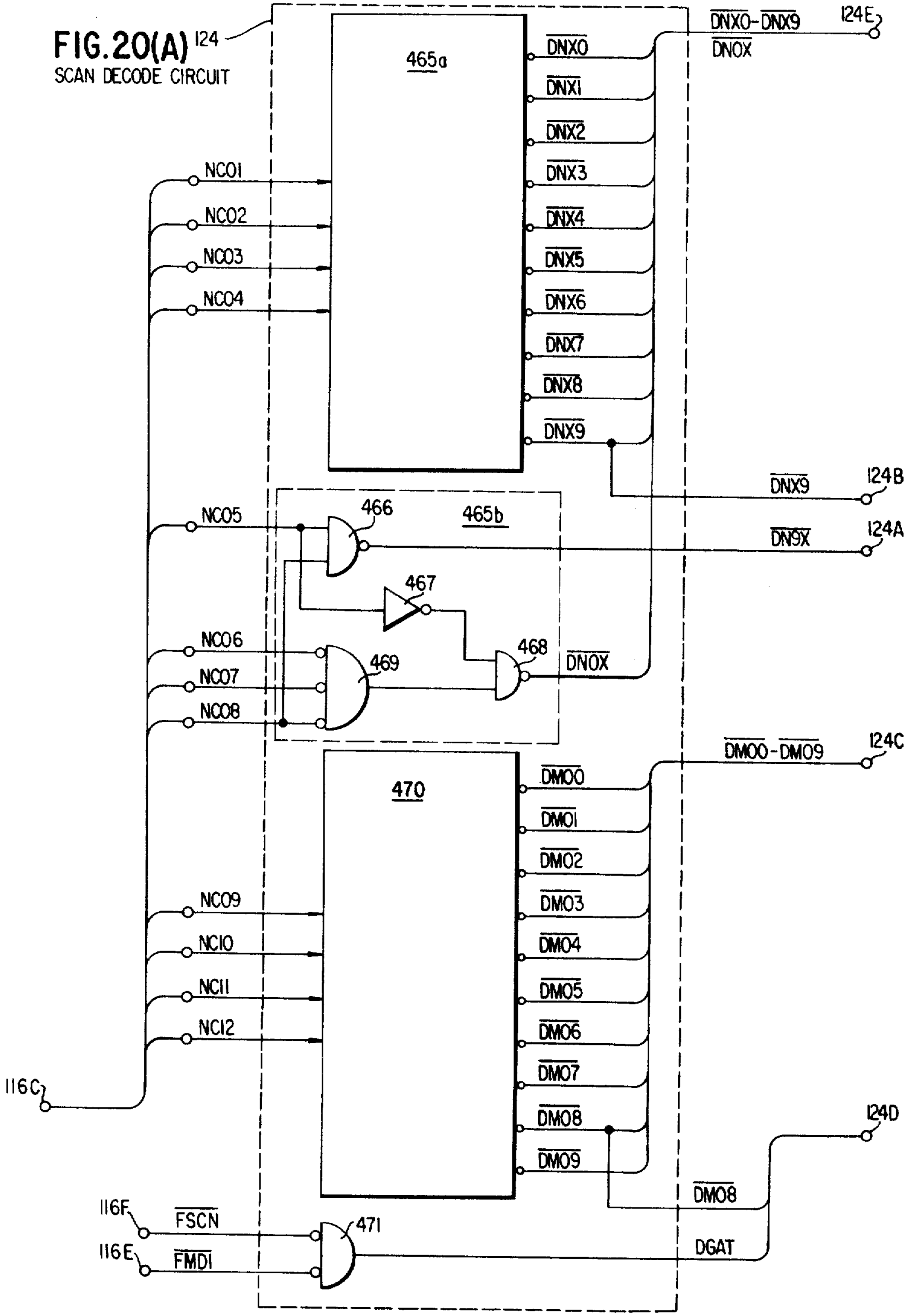
Figure 20B:
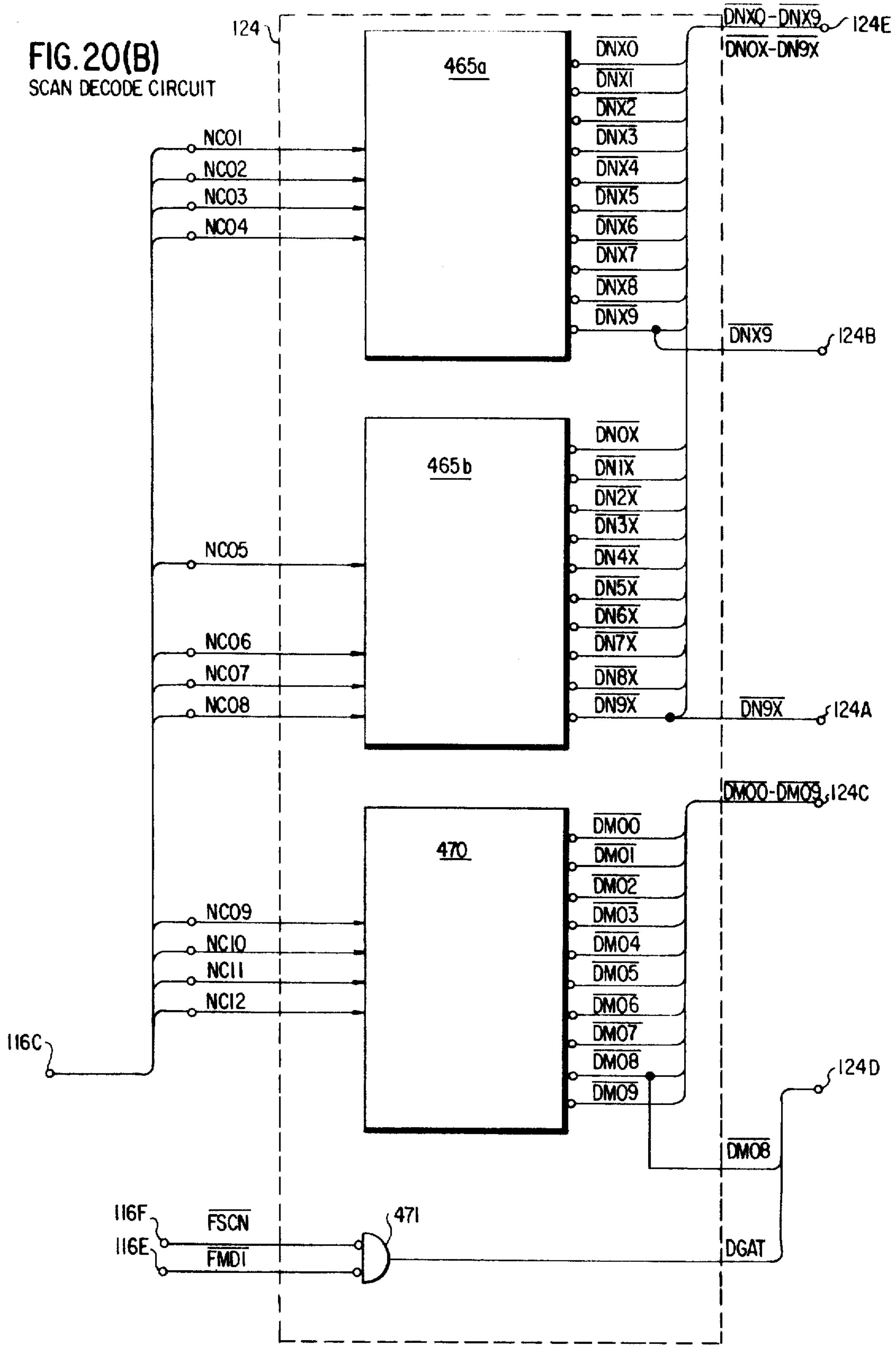
Figure 21:
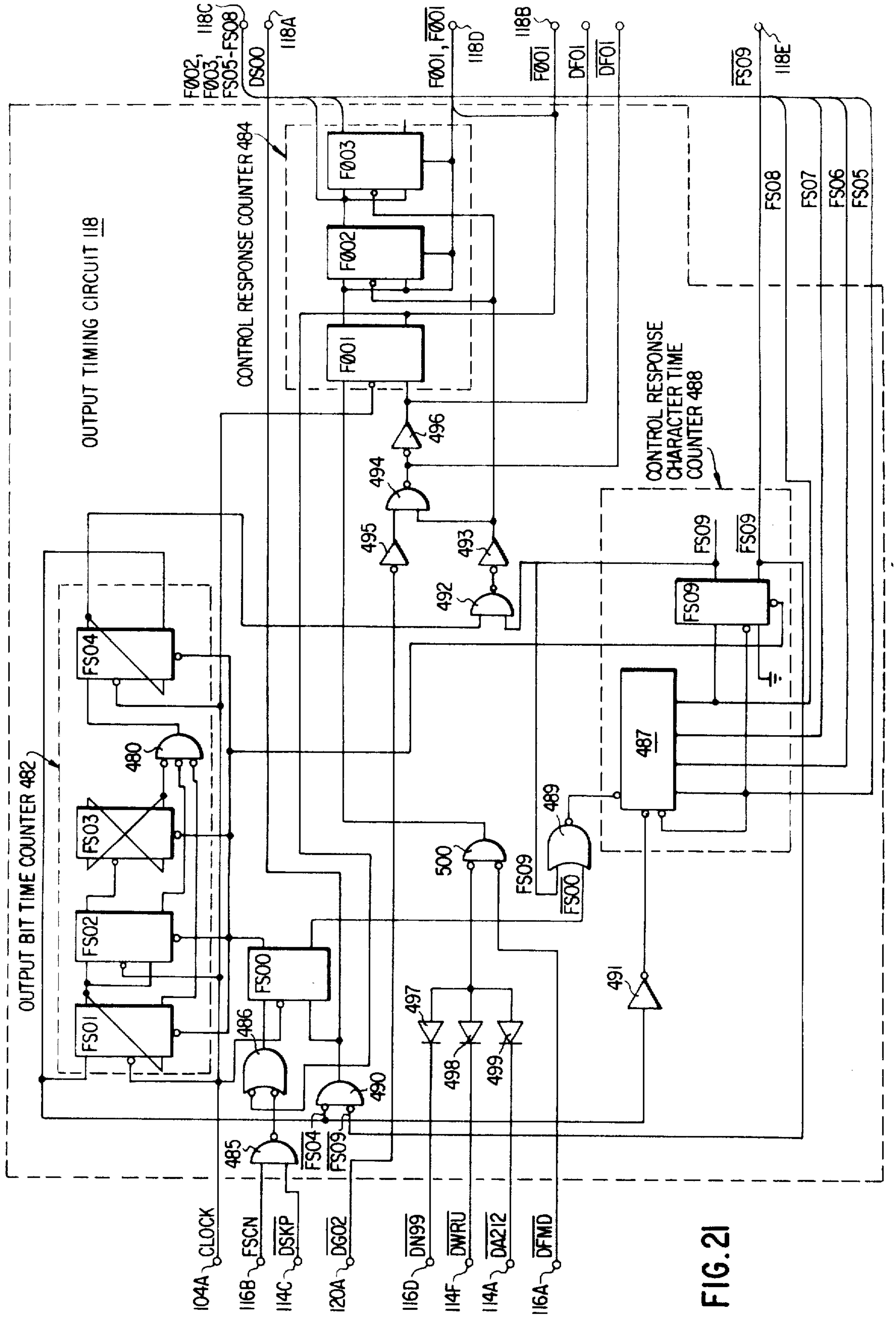
Figure 22:
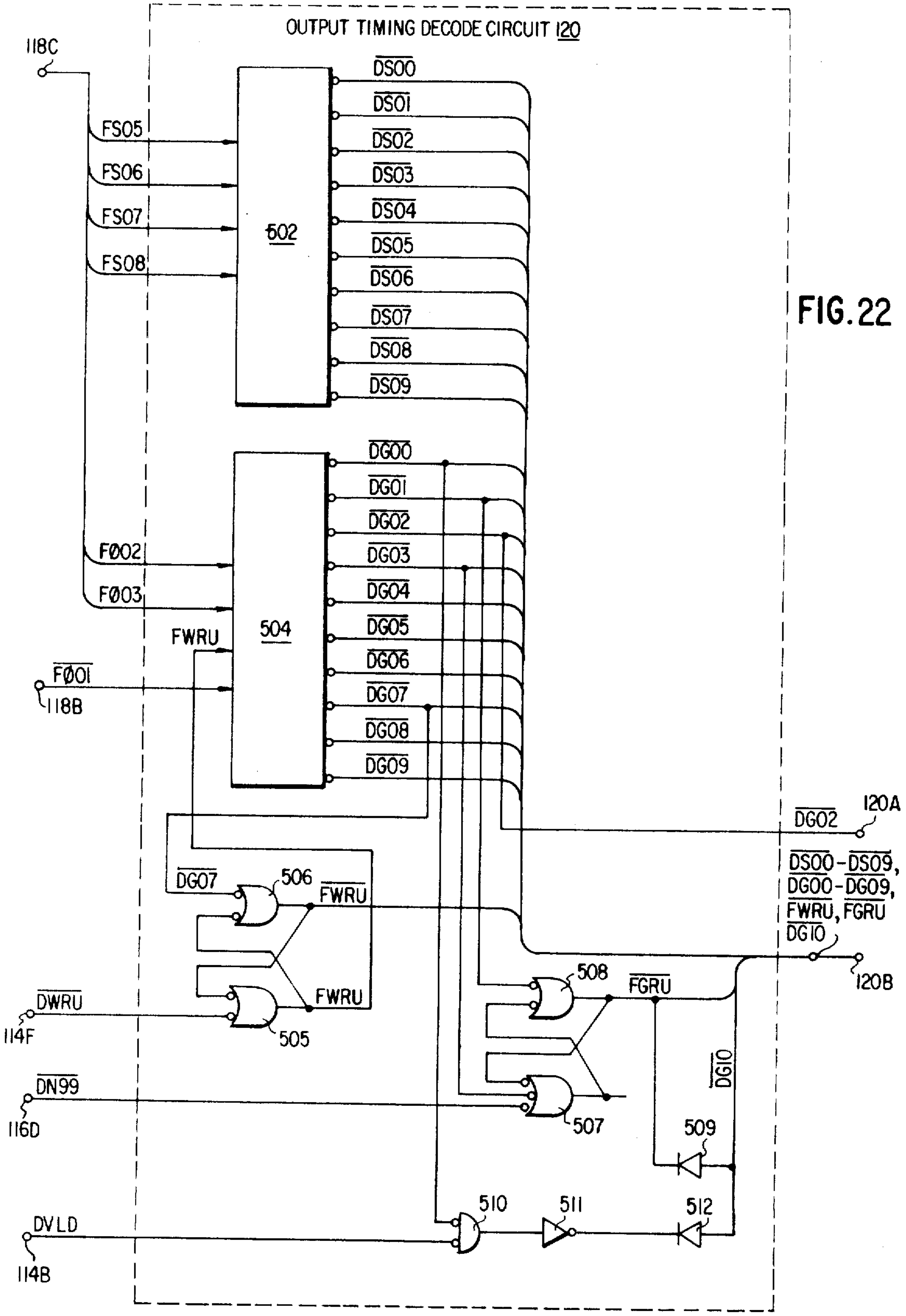
Figure 24:
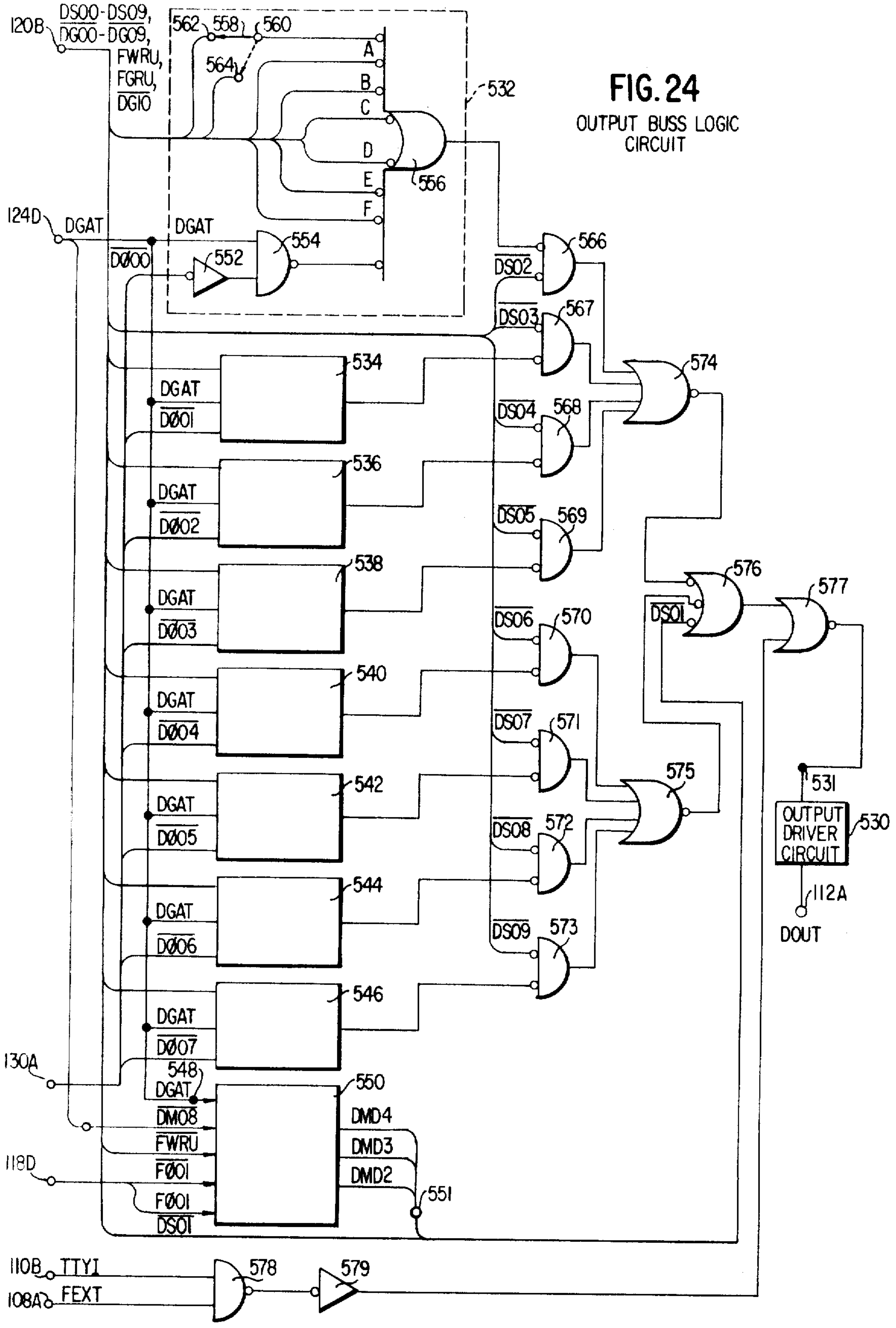
Figure 24:
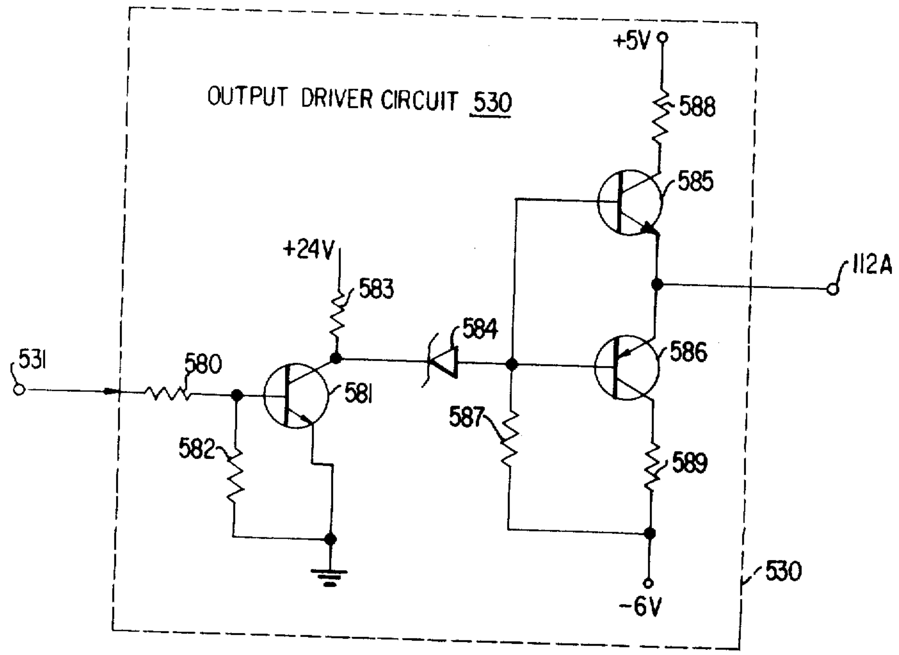
Figure 24B:
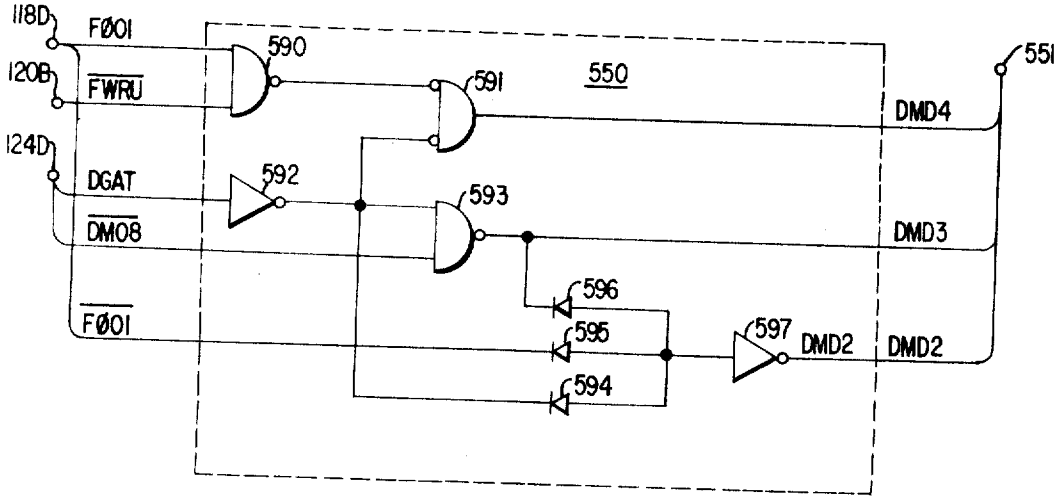
Figure 25:
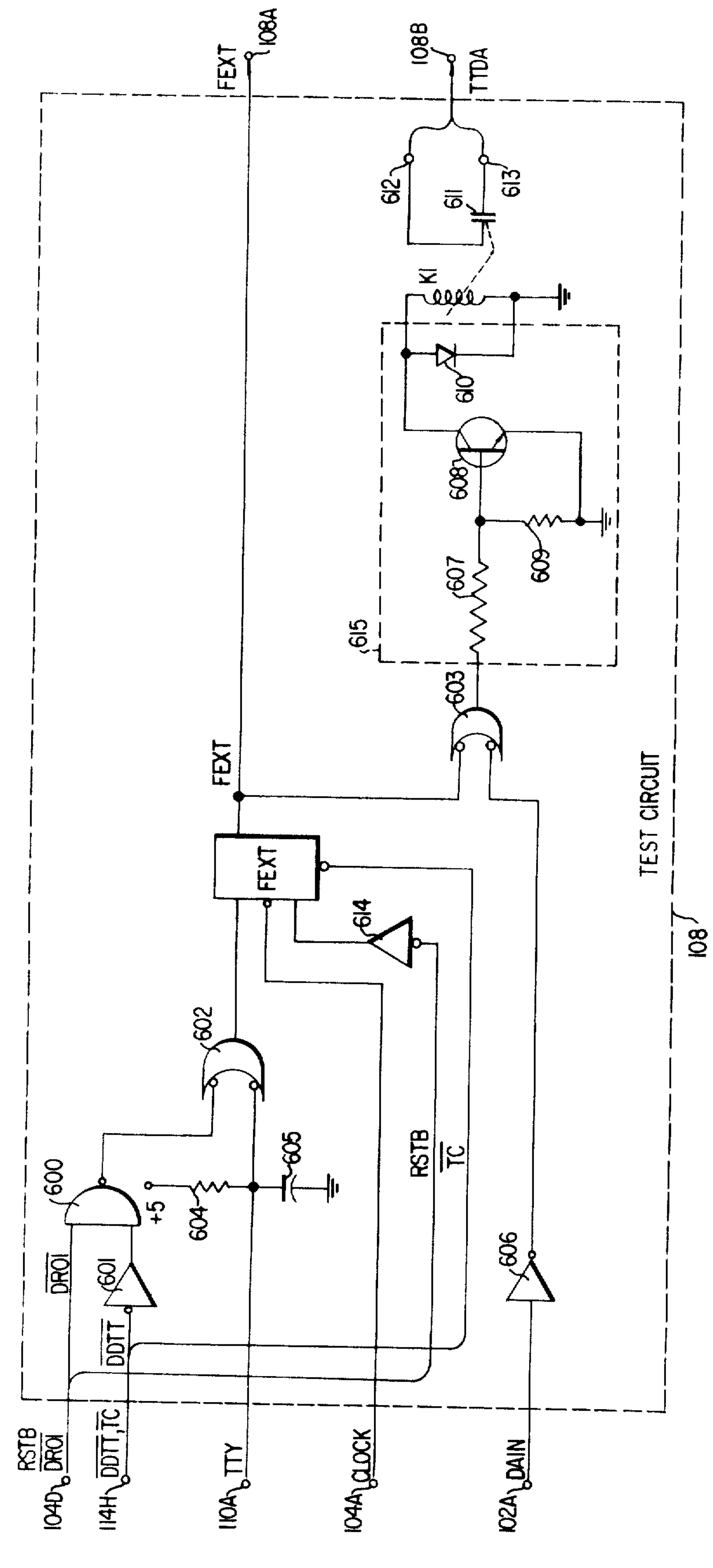
Figure 26:
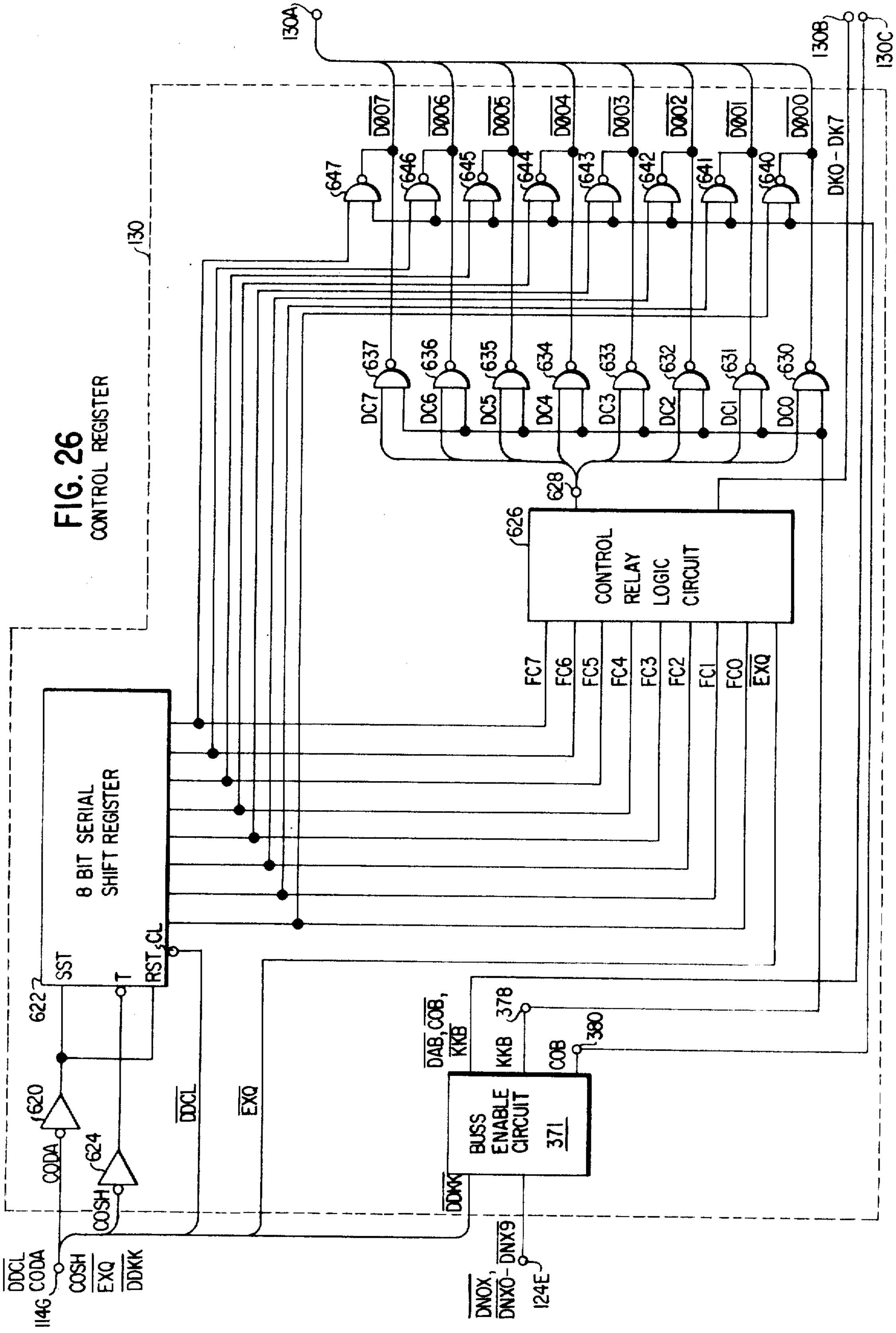
Figure 26A:
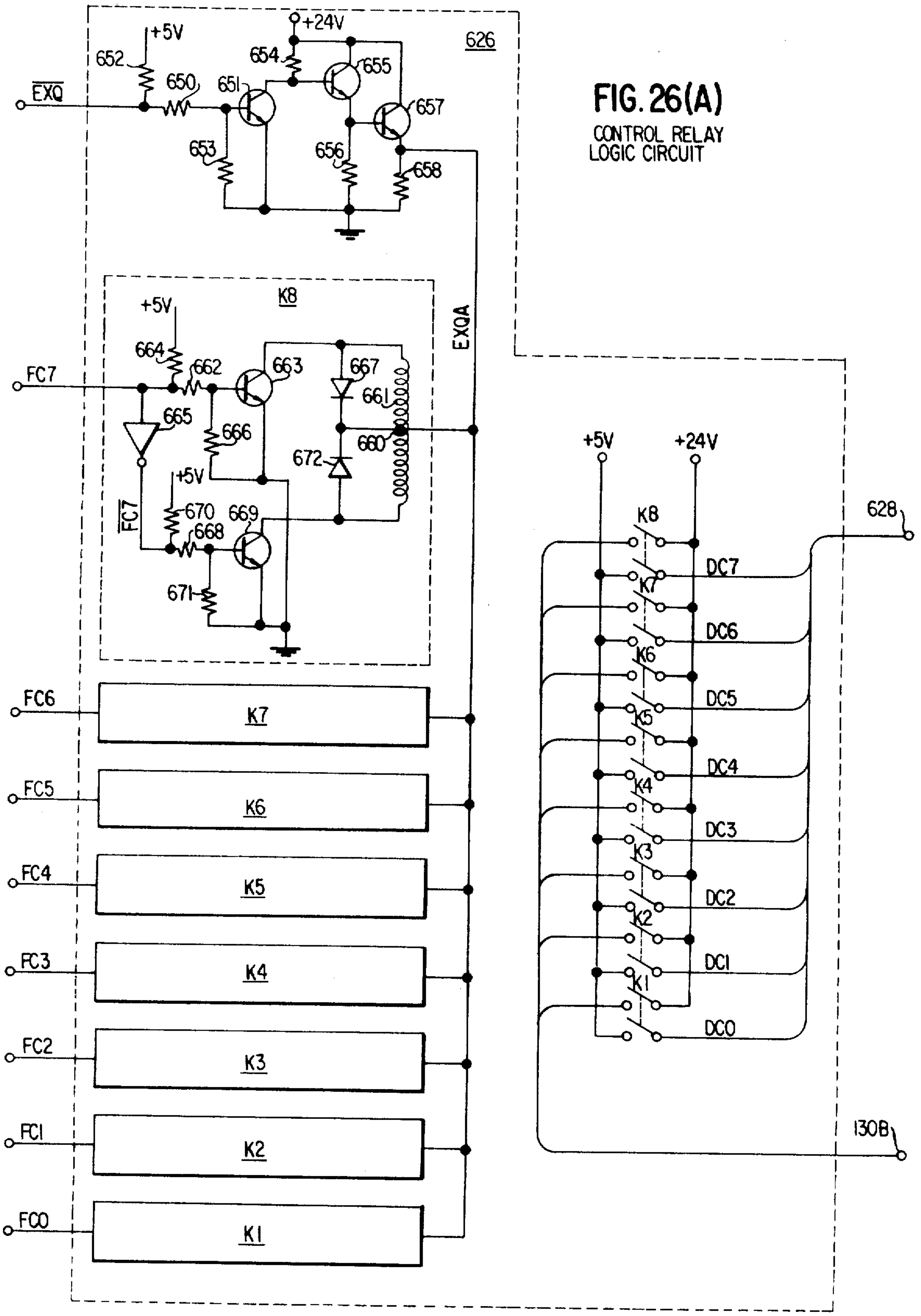
Figure 27:
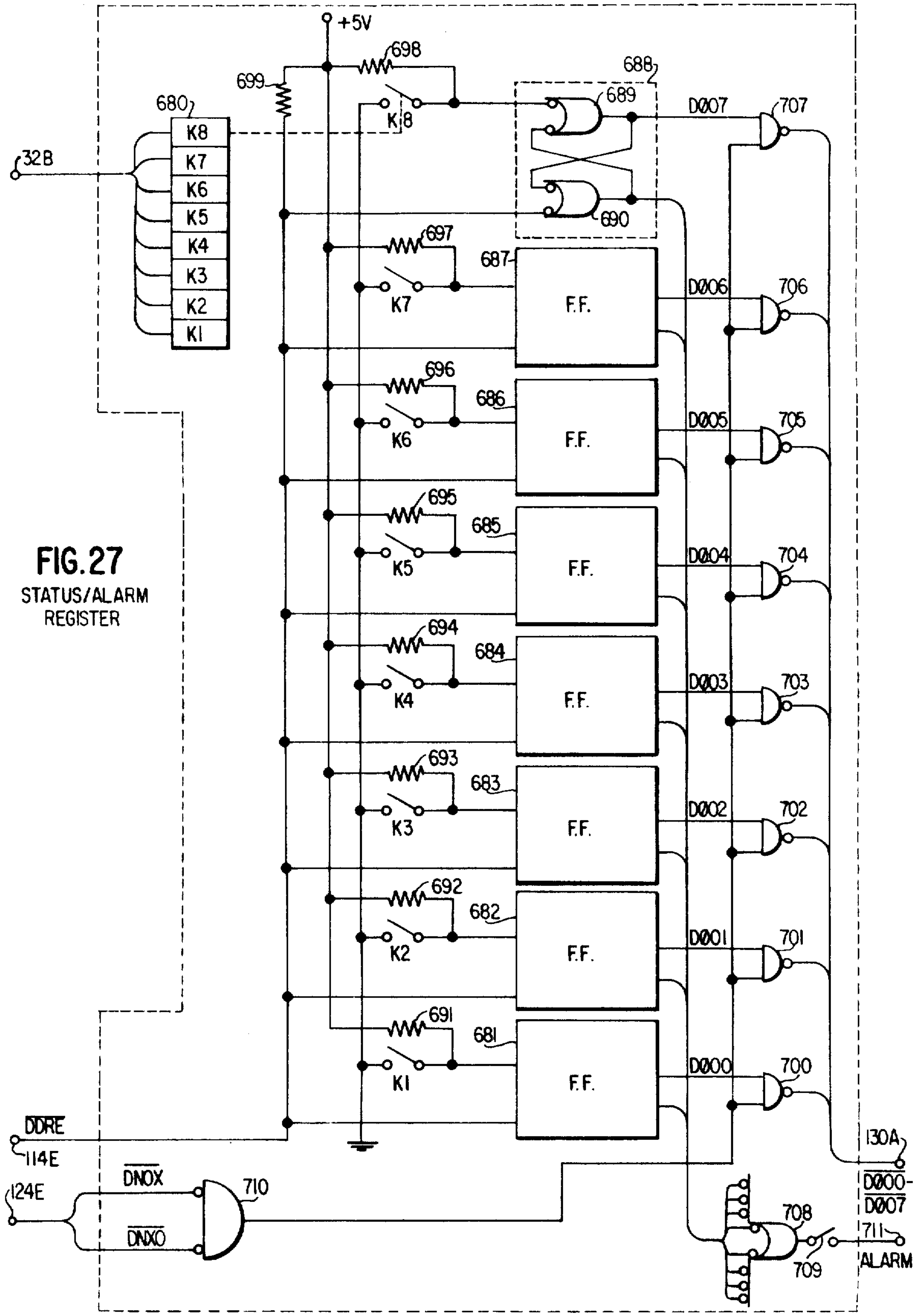

FIGS. 3(A) and 3(B) are collectively a functional block diagram of the satellite station of FIG. 1;

FIGS. 4(A) - 4(I) are logic symbols utilized throughout the detailed description;

FIGS. 5 and 5(A) are a schematic circuit diagram of the input timing circuit of FIG. 3;

FIG. 6 is a timing diagram of the input timing circuit of FIGS. 5 and 5(A);

FIG. 7 is a schematic circuit diagram of the input registers of FIG. 3;

FIG. 8 is a functional block diagram of the input decode circuit 329 of the decode logic circuit of FIG. 3;

FIG. 8(A) is a schematic circuit diagram of one of the gating circuits utilized in the control word decode circuit of FIG. 8;

FIG. 8(B) is a schematic circuit diagram of one of the gating circuits utilized in the single instruction decode circuit of FIG. 8;

FIG. 9 is a schematic circuit diagram of the control data decode circuit 343 of FIG. 3;

FIG. 10 is a schematic circuit diagram of the execute control circuit 345 of the decode logic circuit of FIG. 3;

FIG. 11 is a schematic circuit diagram of the execute decode circuit 361 of the decode logic circuit of FIG. 3;

FIG. 12 is a schematic circuit diagram of the input scan decode circuit 366 of FIG. 3;

FIG. 13 is a schematic circuit diagram of the scan control circuit of FIG. 3;

FIG. 14 is a schematic circuit diagram of the skip decode circuit 384 of the scan control circuit of FIG. 13;

FIG. 15 is a schematic circuit diagram of the scan control logic circuit of FIG. 13;

FIG. 16 is a schematic circuit diagram of the scan address logic circuit of FIG. 13;

FIG. 17 is a schematic circuit diagram of the scan address counter of FIG. 13;

FIG. 18 is a schematic circuit diagram of the scan mode logic circuit of FIG. 13;

FIG. 19 is a schematic circuit diagram of the scan mode counter circuit of FIG. 13;

FIGS. 20(A) and 20(B) are alternative schematic circuit diagrams of the scan decode circuit of FIG. 3;

FIG. 21 is a schematic circuit diagram of the output timing circuit of FIG. 3;

FIG. 22 is a schematic circuit diagram of the output timing decode circuit of FIG. 3;

FIG. 23 is a schematic circuit diagram of the output buss control circuit of FIG. 3;

FIGS. 24, 24(A) and 24(B) are schematic circuit diagrams of the output buss logic circuit of FIG. 3;

FIG. 25 is a schematic circuit diagram of the test circuit of FIG. 3;

FIGS. 26, 26(A) and 26(B) are schematic circuit diagrams of the control register of FIG. 3, the control relay logic circuit of the control register and the buss enable circuit of the control register, respectively; and, FIG. 27 is a schematic circuit diagram of the status/alarm register of FIG. 3.

THE DETAILED DESCRIPTION

Figure 2:
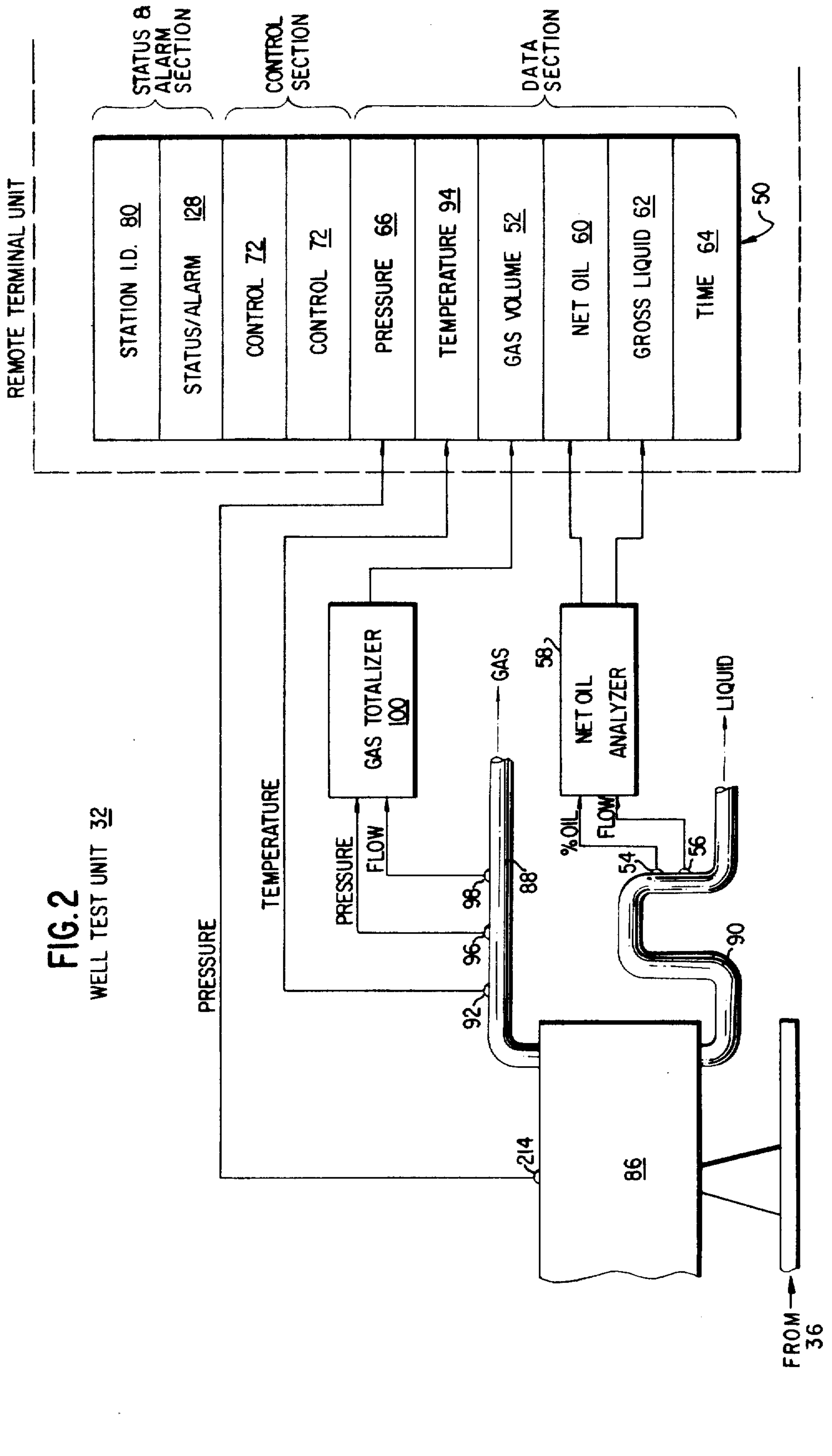
FIG. 2 is a schematic diagram of the well test unit of FIG. 1.

An understanding of the system of the present invention may be facilitated by a general functional description followed by a more detailed description of the components of an explanation of a typical operational sequence as set out in accordance with the following table:

TABLE OF CONTENTS:

I. General System Description (FIG. 1).
II. The Master Station:
III. The Communication System.
IV. The Satellite Station (FIGS. 2, 3(A) and 3(B)):
  A. The Well Test Unit (FIG. 2).
  B. The Remote Terminal Unit:
    1. Introduction and Signal Definition
    2. General Circuit Description (FIGS. 3(A) and 3(B))

3. Logic Symbols and Signal Definition (FIGS. 4(A) - 4(I))
4. Input Timing Circuit (FIGS. 5, 5(A) and 6)
5. Input Timing Circuit Operation
6. Input Registers (FIG. 7)
7. Decode Logic Circuit (FIGS. 8–12)
8. Decode Logic Circuit Operation
9. Scan Control Circuit (FIGS. 13–19)
10. Scan Control Circuit Operation
11. Scan Decode Circuit (FIG. 20)
12. Scan Decode Circuit Operation
13. Output Timing Circuit (FIG. 21)
14. Output Timing Circuit Operation
15. OUtput Timing Decode Circuit (FIG.22)
16. Output Timing Decode Circuit Operation
17. Output Buss Control Circuit (FIG. 23)
18. Output Buss Logic Circuit (FIG. 24)
19. Output Buss Logic Circuit Operation
20. Test Circuit (FIG. 25)
21. Data Registers (FIGS. 26 and 27)
V. Summary.

I. GENERAL SYSTEM DESCRIPTION

Referring to FIG. 1, a computer 10 at a master station 12 may be programmed to initiate a telephone call to a particular satellite station or the call may be initiated under the control of a teletype unit 40 either operating through the computer 10 or operating independently and directly through a suitable conventional automatic call unit 14 and a suitable conventional data set 16. The computer 10, when commanded by the teletype unit, or at the appropriate time, may initiate a telephone call through the automatic call unit 14 and the data set 16. Data set 16 is connected to a local telephone exchange 18 via a commercially installed telephone line 20. The call thus initiated is processed in the usual manner to establish a telephonic connection through one or more remote telephone exchanges 22 and transmission lines 24 to a suitable conventional data set 26 at a particular satellite station 28. The particular satellite station 28 with which the teletype unit 40 and/or the computer 10 are thus connected by means of the commercial telephone lines 24 and the telephone exchanges 18 and 22 is, of course, dependent upon the telephone number assigned to the satellite station 28 by the telephone company subscriber service and dialed by the automatic call unit 14 under the control of the computer 10 or the teletype unit 40.

At the satellite station 28, the data set 26 is interfaced with a remote terminal unit 30. The data terminal unit 30, or remote terminal unit as it may hereinafter be called, includes a number of data accumulators (not shown) connected to one of the well test units 32 and may include a teletype unit for test purposes. Each of the well test units 32 may be connected by means of a manifold 34 to selectively receive the output of one of the producing wells 36.

Each of the other satellite stations 38 may be identical to satellite station 28 with the exception that the number of data accumulators required to accumulate the desired information in the data terminal unit 30 may vary widely. The number of producing wells 36 which may be connected to a particular well test unit 32 may likewise vary.

Once the telephone connection is established by the computer 10 or the teletype unit 40 with the desired satellite staion 28, the computer 10 or the teletype operator will send an instruction or command signal enabling a timing circuit (not shown) at the remote data terminal unit 30 which provides the data transfer initiating pulses. The data transferred may include instructions to the remote terminal unit 30 and the data stored in the data accumulators of the remote terminal unit 30 which may contain any desired relevant information such as gross fluid flow, net oil flow, gas flow, temperature, pressure, valve position, and the like.

After the data in the accumulators of the data termial unit 30 has been transmitted and entered into the memory unit of the computer 10, it may be verified by the computer by comparing the data with a second duplicative transmission of the same data before further processing.

An important feature of the present invention resides in the fact that the teletype unit 40 may initiate an instruction signal which can be sent to the data terminal unit 30, read back to the operator of the teletype unit 40 for comparison, and then, if correct, ordered by the teletype operator to thereafter be executed or modified as desired.

This command signal from the teletype 40 may, for example, cause the operation of the appropriate valves in the manifold 34 to substitute a second producing oil well for the one previously connected to the well test unit 32 so that a new set of data may be accumulated for subsequent transmission. Pumps may be turned off to avoid tank overflows in the event of equipment malfunction and safety equipment such as fire extinguishers may be activated, all without human intervention or presence of personnel at the actual well site. The foregoing command signals may also be instituted by the computer 10 at any time that it is connected to the particular satellite station 28 but the execution thereof should be preceded by the transmission of data for error checking purposes.

After the teletype unit operator (or the computer 10 through its software program) at the master station 12 has performed the specific tasks assigned, the telephone circuit may be disconnected. Thereafter, the operator or computer may immediately place a call to another one of the satellite stations 38 and execute the instructions applicable to that particular station and to a particular producing well.

From the foregoing, it is evident that a single master or central processing station can monitor and supervise the operation of a vast number of producing oil wells. The only limitation on the geographic relationship between the master station 12 and the producing wells 36 is the availability of a direct dialing sytem. The expense of installing and maintaining a special data link is obviated by the use of existing telephone lines. New satellite stations may be added to the system merely by providing the equipment at the new satellite station, securing the assignment of a telephone number by the telephone company subscriber service and adding another telephone number and sub-program to the computer software program.

Moreover, the computer 10 need not be located at the central processing station since the above described operations may be accomplished solely through the use of a manually operated teletype unit. The computer may also be programmed to provide a print out of all data on the teletype unit at a separate location. Thus, the use of the time sharing computer systems is facilitated.

II. THE MASTER STATION

As illustrated in FIG. 1, the master station 12 may include a teletype unit 40 which may be of the type commercially available and well known in the art. Hence, no description as to its operation is deemed necessary.

Also connected to the computer 10 at the master station 12 may be a number of status and alarm devices 42 such as indicator panels with visual and/or sonic alarms.

The function of the automatic call unit 14 connected between the computer 10 and the data set 16 is one of providing the conventional dialing impulses or tones as directed by the computer 10. The commercially available Western Electric 801A6 Automatic Call Unit described in a publication, Data Auxiliary Set 801A Automatic Calling Unit Interface Specification, March 1964, by AT&T has been found satisfactory for this purpose.

The computer utilized with the systems of the present invention may be any suitable process control digital computer. A typical computer whose performance has been found satisfactory with a typewriter print out is a PDP 12 described in a publication, PDP-12 System Reference Manual, July 1970, by Digital Equipment Corporation of Maynard, Mass. The computer 10 must be directly programmable for control independently of the teletype unit 40. A time sharing feature of the PDP 12 allows the computer to take data from one or more of the remote terminal units of FIG. 1 while simultaneously establishing another call. This feature is, of course, particularly desirable once the number of satellite stations connected into the system becomes large.

Inasmuch as the data transmission system of the present invention is asynchronous in operation and the satellite station is relied upon to provide the timing pulses which have no absolute time reference, the computer 10 may be programmable to calculate the time interval between the successive sampling of a particular data terminal unit 30 so as to calculate average rates where this information is desired. This date as to time may be accumulated in an accumulator at the data terminal unit 30 which may be reset after being read.

III. THE COMMUNICATION SYSTEM

With continued reference to FIG. 1, the communication system comprises an automatic call unit 14, the data set 16 located at the master station 12, the commercially installed and maintained telephone lines 24 including various telephone exchanges 18 and 22, and the data set 26 located at the satellite station 28.

Reference to the automatic call unit 14 was made in the General System Description supra. An exemplary unit is the 801A6 automatic call unit produced by the Western Electric Company. The connections between the automatic call unit 14, the PDP 12 computer 10, and the data set 16 are within the skill of the art and are thus not shown.

The computer data set 16 may be the 103A2 data set produced by the Western Electric Company described in a publication, Data Set 103A Interface Specification, February 1967,by AT&T or may be any other suitable conventional serial data set.

The telephone lines connecting the data set 16 to the local exchange 18, the remote exchange 22 to the data set 26 at the satellite station 28, and the number of telephone exchanges 18 and 22 as may be required, are installed and maintained by the telephone company as a part of their regular commercially available subscriber service. It is only necessary for the operation of the system of the present invention that the telephone lines be of voice quality.

Utilization of existing commercial telephone lines provides not only a substantial reduction in the expense incurred in the initial installation of such a system, but provides extraordinary flexibility as well. As an example, it is possible for a teletype operator in one location such as Oklahoma to monitor and control the operation of satellite stations throughout the continental United States and in any foreign country to which a telephone call may be directly dialed. It is further possible, during a period when one computer and/or teletype unit is inoperative while undergoing downtime for routine and/or emergency maintenance and repair, for a second or supplemental computer and/or teletype unit at a different location, such as in Texas, to temporarily assume the data gathering and control functions of the Oklahoma station. As a further advantage, the communication system has for long distance calls many alternative routes that are automatically available in the event of a disruption in a part of the communication circuit due, for example, to local adverse weather conditions or equipment failure.

The remote terminal unit data set 26 may be any suitable conventional serial data set such as Model 103A2 manufactured by Western Electric Company. The data set operates in a conventional manner to interface the telephone line to the remote terminal unit 30.

IV. THE SATELLITE STATION

With continued reference to FIG. 1, the satellite station 28 comprises the 103A2 data set 26 and the data terminal unit 30, the operation of which will hereinafter respectively be described in detail in connection with FIGS. 2-28.

A. The Well Test Unit

As may be more clearly seen in FIG. 2, a data accumulator bank 50 comprises a series of accumulators, 10 in the embodiment illustrated. The first two of these accumulators may be 8-bit registers and comprise a status and alarm section which may include the station identity. The next two accumulators may also be 8-bit registers and comprise the control section. The last comprise six data accumulators, each comprising one or more 8-bit registers, as hereinafter more fully explained. The data accumulators as a unit are considered as one data section.

The status and control section accumulators are static accumulators while the data section accumulators are basically digital counters for storing the pulses supplied from the associated digital transducers at the well test unit 32. The time accumulator 64 is the exception in this later group in that it stores pulses from an internal clock.

To increase the capacity of the accumulators in the data section, 8-bit registers may be connected serially in groups of two to make a 16-bit accumulator for each data function. The storage capacity is thus increased from 255 to 32,767 or from 99 to 9,999 depending upon whether the natural binary or binary coded decimal interpretation is to be utilized. All sixteen of the 8-bit registers will be sequentially scanned and the information contained therein transmitted as data to the computer 10 in the manner earlier described.

The station identification, register 80 of the status and alarm section, may be a set of switches or wired terminals to provide the encoding of a number up to 99 for identification of the particular remote terminal unit 30.

The status/alarm register 128 may be a series of gates which may be encoded by dry contact switches to indicate appropriate status or alarm functions such as would occur from high/low level switches or power on/-off indications, no flow indications, pressure and fire alarm detectors, or limit switches on the valves of the manifold 34 to indicate the open or closed position of a particular valve.

The control register 72 provides storage for the 8-bit control message word transmitted from the teletype unit or computer 10 to the remote terminal unit 30. The control register 72 may thus be read by the teletype unit or computer 10 prior to execution of the command stored therein. The capability of eight channels of on/off control is thus provided. This control word may be used, for example, to activate relays ultimately to position 8 valves remotely or to control pumping motors or other associated equipment as desired.

With continued reference to FIG. 2, fluid from a particular well 36 is fed to a separator 86 at the well test unit 32. The respective outputs from the separator 86 are gases taken from a conduit 88 in the upper portion thereof and liquids taken from a conduit 90 in the lower portion thereof.

A digital temperature sensor 92 in the gas flow conduit 88 is connected to the registers, which together comprise the temperature accumulator 94 of the data accumulator bank 50.

Similarly, the output from a pressure transducer 96 and from a turbine flowmeter 98 are fed to a gas totalizer unit 100 such as disclosed and claimed in Zimmerman et al. U. S. Pat. No. 3,566,685, issued Mar. 2, 1971, and assigned to the assignee of the present invention. The output of the gas totalizer 100 is applied to the two serially connected registers which together comprise the gas volume accumulator 52.

The pressure sensor 96 may be of the type disclosed and claimed in Love U.S. Pat. No. 3,478,594, issued Nov. 18, 1969. The flowmeter 98 may be of the type disclosed and claimed in Love et al. U.S. Pat. No. 3,526,133, issued Sept. 1, 1970, and assigned to the assignee of the present invention.

The output signal from a percent oil detector 54 such as that disclosed and claimed in the Love et al. U.S. Pat. No. 3,523,245, issued Aug. 4, 1970, and assigned to the assignee of the present invention, and the output signal from a turbine flowmeter 56 are fed to a net oil analyzer 58. The flowmeter 56 may be of the type disclosed and claimed in the previously referenced Love et al. U.S. Pat. No. 3,526,133, and net oil analyzer 58 may be of the type disclosed and claimed in Zimmerman et al U.S. Pat. No. 3,566,685, supra. The two output signals from the net oil analyzer 58 are fed respectively to the net oil and gross liquid accumulators 60 and 62 in the data section of the data accumulator bank 50.

The output signal of an additional pressure sensor 214 at the separator 86 is fed to the pressure accumulator 66 of the data accumulator bank 50. This pressure transducer may be of a type similar to the pressure transducer 96 discussed previously.

B. THE REMOTE TERMINAL UNIT

As earlier explained, the satellite station 28 of the system of FIG. 1 comprises the data set 26, the remote terminal unit 30, and at least one well test unit 32 and the associated wells 36. The remote terminal unit accumulates data from the well test unit in a number of registers and interfaces the telephone lines with these registers, command relays and a teletype unit. The teletype unit is conventional and may be, for example, the model 33 available from Teletype Corporation. The teletype unit may be included for written communication in the usual fashion between operators at the master and satellite stations. The teletype may also be used to test the unit by placing the remote terminal unit in test mode and calling through the remote terminal unit to the computer 10.

1. INTRODUCTION AND SIGNAL DEFINITION

The remote terminal unit 30 of FIG. 1 is an electronic data acquisition and control terminal which is utilized to acquire data and execute control functions at a remote location upon receipt of commands from a central processing station via standard telephone communications equipment.

The instructions transmitted to the remote terminal unit and the data from the unit is in the form of ASCII (American Standard Code for Information Interchange) characters each of which comprises eleven binary bits. The eleven binary bits comprise a "start" bit which is always at a high signal level, followed by eight "intelligence" bits which are in turn followed by two "stop" bits which are also always at a high signal level.

With reference to FIGS. 3(A) and 3(B), data in the form of ASCII coded signals is applied serially to the data set 26 via a conventional telephone communication system as illustrated in FIG. 1. The input data is converted to a data input or DAIN signal having voltage levels which are compatible with the integrated circuits utilized throughout the preferred embodiment of the remote terminal unit. The DAIN signal is applied to the input timing circuit 104, the input registers 106 and the test circuit 108.

The first bit of the DAIN signal, i.e. the start bit of each ASCII character, commences the input timing cycle illustrated in the signal diagram of FIG. 6 and the immediately successive eight information or intelligence bits along with the first "stop" bit of the DAIN signal are clocked into a serial input shift register RA (hereinafter described in connection with FIG. 7) at a rate of approximately 110 bits or ten characters per second. Assuming that the remote terminal unit 30 is not in its test mode, upon completion of the loading of one complete ASCII character into the serial shift register RA a "word transfer complete" signal FRO2 and a "gated word transfer complete" signal DRO2 from the timing circuit 104 assume a high signal level and effect the decoding of the contents of the serial shift register RA by the input code circuit 329 section of the code logic circuit 114 (hereinafter described in connection with FIGS. 8 – 12).

If the ASCII character in the serial shift register RA is any one of the special single character instructions when the enabling signal assumes the high signal level, a corresponding decoded control signal is generated by the input decode circuit 329 as set forth in the following table:

TABLE I

| Single Character Instruction | Decoded Control Signal |
|---|---|
| Line Feed (LF) | $\overline{DA212}$ |
| Slash (/) | $\overline{DA257}$ |
| E Control (Ec) | $\overline{DWRU}$ |
| T Control (Tc) | $\overline{TC}$ |
| Control Data (0's or 1's) | $\overline{COT}$ |

Immediately after the input decode circuit 329 has been enabled, a TRIG signal from the input timing circuit 104 loads the first six intelligence bits of the ASCII character stored in the serial shift register RA into a parallel register RB. A second ASCII character is then loaded serially into the register RA. This second character is monitored by the decode logic circuit 114 to determine if it is one of the above single character instructions, the first six bits of the second character thus loaded into the register RA are transferred to the six bit parallel register RB by the TRIG signal and the six bit character then in the RB register is simultaneously transferred to a second parallel register RC.

When both of the parallel registers RB and RC (hereinafter described in connection with FIG. 7) contain a six bit character, the contents of the two registers RB and RC may be decoded by the control word decode circuit 312 section of the input decode circuit 329 (hereinafter described in connection with FIGS. 8 – 12) to provide further decoded control signals which control the operation of the remote terminal unit. The two characters stored by the RB and RC registers together form a teletype instruction or control word which may be decoded to provide the following control signals:

TABLE II

| Name | Two Character Instruction | Decoded Control Signal |
|---|---|---|
| Control | CO | $\overline{DDCO}$ |
| Data | DA | $\overline{DDDA}$ |
| Alarm | AL | $\overline{DDAL}$ |
| Relay Status | KK | $\overline{DDKK}$ |
| Execute | EX | $\overline{DDEX}$ |
| Reset | RE | $\overline{DDRE}$ |
| Clear | CL | $\overline{DDCL}$ |
| Teletype mode | TT | $\overline{DDTT}$ |
| Main | MA | $\overline{DDMA}$ |
| Standby | ST | $\overline{DDST}$ |

The decoded control signals of Tables I and II have the following functional significance with respect to the operation of the remote terminal unit:

TABLE III $\overline{DA212}$ (LF) — Line Feed, causes the remote terminal unit to execute the immediately preceding control signal.

$\overline{DA257}$ (/) — Slash, causes the remote terminal unit to echo back in bit pattern the contents of the particular registers designated by the immediately preceding control signal.

$\overline{DWRU}$ (Ec) — Who are you, causes the remote terminal unit to transmit a terminal identification signal.

$\overline{TC}$ (Tc) — causes the remote terminal unit to change from the teletype mode back to its normal operating or command mode immediately.

$\overline{COT}$ (0 or 1) — causes the immediately succeeding bits transmitted to the remote terminal unit to be loaded into the control registers.

$\overline{DDCO}$ — places the remote terminal unit in the control mode when followed by LF or slash (/) and line feed (LF).

$\overline{DDDA}$ — places the remote terminal unit in the data mode when followed by a LF or slash (/) and line feed (LF).

$\overline{DDKK}$ — causes the remote terminal unit to transmit the status of the control relays when followed by a slash (/) and line feed (LF).

$\overline{DDEX}$ — causes the remote terminal unit to execute the signals stored by the control registers when the system is in the control mode when followed by a line feed (LF).

$\overline{DDRE}$ — causes the resetting of the status/alarm registers and those accumulator registers connected to the reset buss when followed by a line feed (LF).

$\overline{DDCL}$ — causes the control registers to be reset or cleared when followed by a line feed (LF).

$\overline{DDTT}$ — places the remote terminal unit in the teletype mode when followed by a line feed (LF).

$\overline{DDMA}$ — switches the remote terminal unit to main power when followed by a line feed (LF).

$\overline{DDST}$ — switches the remote terminal unit to standby power when followed by a line feed (LF).

$\overline{DDAL}$ — places the remote terminal unit in the alarm mode and, when followed by a slash (/) and line feed (LF), causes the status/alarm registers to be scanned and the values thereof transmitted.

The above-listed control signals may be combined and further decoded in the decode logic circuit 114 to provide for the acquisition and transmission of data and the execution of control functions. Various combinations of the control signals produce, for example, the CODA, COSH, $\overline{DSCN}$, DSKP, $\overline{FSL1}$, $\overline{EXQ}$, DVLD, CDB and KKB signals, which control the loading of the control registers, the execution of the control commands, and the scanning of the data stored in the data accumulators, status/alarm registers and the control registers.

For ready reference in perusing the following detailed circuit des-cription and to facilitate an understanding of the operation thereof, the following is a listing of primary signal nomenclature with a functional signal description where appropriate.

TABLE IV

| SIGNAL NAME | SIGNAL DESCRIPTION |
|---|---|
| DAIN | Data input |
| FEXT | TTY mode |
| CLOCK | 1 Kilohertz clock |
| FRO2 | Word transfer complete |
| DRO2 | Gated word transfer complete |
| $\overline{DRO1}$ | Alpha character gate |
| SYNC | Shift register synchronizing |
| TRIG | Character transfer trigger |
| RAO1–RAO6, $\overline{RAO7}$ | Contents of the RA register |
| RBO1–RBO6 | Contents of the RB register |
| RCO1–RCO6 | Contents of the RC register |
| $\overline{DA212}$ | Decoded line feed (LF) |
| $\overline{DA257}$ | Decoded slash (/) |
| $\overline{TC}$ | Decoded T control |
| $\overline{DDCO}$ | Decoded control mode |
| $\overline{DDDA}$ | Decoded data mode |
| $\overline{DDAL}$ | Decoded alarm mode |
| $\overline{DDEX}$ | Decoded execute mode |
| $\overline{DDRE}$ | Decoded reset |
| $\overline{DDMA}$ | Decoded main power mode |
| $\overline{DDST}$ | Decoded standby power mode |
| $\overline{DDCL}$ | Decoded clear |
| $\overline{DDTT}$ | Decoded teletype mode |
| $\overline{DWRU}$ | Decoded terminal identification |
| DVLD | Decoded data valid |
| $\overline{DSKP}$ | Decoded skip |
| $\overline{DSCN}$ | Decoded data scan |
| $\overline{FSL1}$ | Slash set |
| COSH | Control shift |

| | |
|---|---|
| CODA | Control data |
| $\overline{EXQ}$ | Execute command |
| CDB | Control data buss |
| KKB | KK buss |
| $\overline{TTDA}$ | Teletype data |
| $\overline{DFMD}$ | Start Scan |
| FSCN, $\overline{FSCN}$ | Scan mode |
| $\overline{DN99}$ | End of scan |
| FMD1 | Scan as bits |
| NCO1–NCO8 | Scan address counts |
| NCO9–NC12 | Scan mode counts |
| DS00 | Start of output timing |
| FØ01, FØ01–FØ03 | Control response time |
| FS05–FS08, $\overline{FS09}$ | Output character times |
| $\overline{DS00}$–$\overline{DS09}$ | Decoded output character times |
| $\overline{DG00}$–$\overline{DG07}$ | Decoded control response times |
| $\overline{FWRU}$ | "Who are you" latch |
| $\overline{DG10}$ | Space decode |
| $\overline{FGRU}$ | Gated "who are you" |
| $\overline{DNX0}$–$\overline{DNX9}$ | Decoded scan address signals |
| DGAT | Output buss gating signal |
| DNOX | Scan position |
| $\overline{DM00}$–$\overline{DM09}$ | Scan mode |
| DN9X | Scan complete |
| $\overline{DDKK}$ | Decoded relay mode |
| $\overline{DØ00}$–$\overline{DØ07}$ | Data registers output |
| $\overline{DR10}$ | Buss control signal |
| TTY | Teletype test switch |
| TTYI | Teletype input |
| DOUT | Data output |

2. GENERAL CIRCUIT DESCRIPTION

One of the remote terminal units 30 of FIG. 1 is illustrated functionally in FIGS. 3(A) and 3(B), (hereinafter collectively refered to as FIG. 3), and in greater detail in FIGS. 5–27 wherein like numerical designations have been used for like elements whenever possible to facilitate an understanding of the invention.

With reference to FIG. 3, data signals from the master or central processing station 12 of FIG. 1 are applied to the conventional data set 26 by way of commercially installed telephone communication lines. The data set 26 may be, for example, a model 103A2 serial data set manufactured by Western Electric Company.

The raw data from the data set 26 is applied to a suitable con-ventional signal level converter 102 which converts the raw input data signals into a data input or DAIN signal having voltage levels compatible with the integrated circuits utilized throughout the remote terminal unit 30. The DAIN signal from the output terminal 102A of the signal level converter 102 is applied to like numbered terminals 102A of an input timing circuit 104, input registers 106 and a test circuit 108.

The test circuit 108 generates a test mode or FEXT signal which is applied from an output terminal 108A thereof to the respective input terminals 108A of the input timing circuit 104 and the input registers 106. In addition, the test circuit 108 provides a teletype data or TTDA signal which is applied to a conventional teletype unit 110 via an output terminal 108B.

The teletype unit 110 may be, for example, a model 33 teletype manufactured by Teletype Corporation and may provide a teletype test or TTY signal at an output terminal 110A for application to an input terminal 110A of the test circuit 108. A teletype input or TTYI signal from an output terminal 110B may be applied to a like numbered input terminal 110B of an output buss circuit 112.

The contents of the input registers 106, as represented by the output signals RA01–RA06, RB01–RB06 and RC01–RC06 therefrom, are applied from a collective output terminal 106A of the input registers 106 to a collective and like numbered input terminal 106A of a decode logic circuit 114. In addition, a $\overline{RA07}$ signal from an output terminal 106B of the input registers 106 is applied to an input terminal 106B of both the input timing circuit 104 and the decode logic circuit 114. The RA06 signal from an output terminal 106C is applied to an input terminal 106C of the input timing circuit 104.

The input timing circuit 104 generates the timing signals which synchronize the operation of the remote terminal unit as will hereinafter be described. A CLOCK signal from an output terminal 104A of the input timing circuit 104 is applied to an input terminal 104A of a decode logic circuit 114, of the test circuit 108, a scan control circuit 116 and an output timing circuit 118.

A "word transfer complete" or FR02 signal and a "gated word transfer complete" or DR02 signal from respective output terminals 104B and 104C of the input timing circuit 104 are applied to respective input terminals 104B and 104C of the decode logic circuit 114.

A $\overline{DR01}$ signal from an output terminal 104D of the input timing circuit 104 is applied to an input terminal 104D of the test circuit 108, and a "shift register synchronizing" signal SYNC together with a "character transfer trigger" signal TRIG from respective output terminals 104E and 104F of the input timing circuit 104 are applied respectively to input terminals 104E and 104F of the input registers 106.

The decode logic circuit 114 decodes the RA01–RA06, $\overline{RA07}$ RB01–RB06, and RC01–RC06 signals from the input registers 104 and provides control signals which control the operation of the remote terminal unit 30. With continued reference to FIG. 3, a decoded teletype line feed (LF) or $\overline{DA212}$ control signal from an output terminal 114A of the decode logic circuit 114 is applied to like numbered input terminals 114A of the input timing circuit 104, the scan control circuit 116 and the output timing circuit 118.

A decoded "data valid" or DVLD control signal from an output terminal 114B is applied to an input terminal 114B of an output timing decode circuit 120. A decode "data scan" or $\overline{DSCN}$ control signal, a decoded "data mode" or $\overline{DDDA}$ control signal and an $\overline{FSL1}$ control signal from a collective output terminal 114D of the decode logic circuit 114 are applied to a collective input terminal 114D of the scan control circuit 116.

A "system reset" or $\overline{DDRE}$ control signal from an output terminal 114E of the decode logic circuit 114 is applied to an input terminal 114E of data accumulators 122 and a decoded "who are you" terminal identification or $\overline{DWRU}$ control signal from an output terminal 114F is applied to like numbered input terminals 114F of the input registers 106, the output timing circuit 118 and the output timing decode circuit 120.

The decode logic circuit 114 of FIG. 3 may additionally provide a decoded "control shift" or COSH control signal, a decoded "control data" or CODA control signal, a decoded "execute" or EXQ signal, a decoded "clear" or $\overline{DDCL}$ signal, and a decoded "relay mode" or $\overline{DDKK}$ signal, all of which are applied to a collective input terminal 114G of control registers 130 via collective output terminal 114G of the decode logic circuit 114. A decoded "teletype mode" or $\overline{DDTT}$ control signal and a decoded "T control" or $\overline{TC}$ control signal from a collective output terminal 114H of the decode logic circuit 114 are applied to a collective input terminal 114H of the test circuit 108.

A decoded "alarm mode" or $\overline{DDAL}$ signal, a decoded "relay mode" or $\overline{DDKK}$ signal, a decoded "control mode" or $\overline{DDCO}$ signal and a decoded "data mode" or $\overline{DDDA}$ signal are applied from a collective output terminal 114I of the decode logic circuit 114 to a like numbered input terminal of the scan control circuit 116.

The scan control circuit 116 provides a $\overline{DFMD}$ signal at the output terminal 116A and an FSCN signal at an output terminal 116B which are applied respectively to input terminals 116A and 116B of the output timing circuit 118. Scan address signals NC01–NC12 from a collective output terminal 116C of the scan control circuit 116 are applied to a collective input terminal 116C of a scan decode circuit 124 and a $\overline{DN99}$ signal from an output terminal 116D of the scan control circuit 116 is applied to like-numbered terminals 116D of the output timing circuit 118 and the output timing decode circuit 120. An FMD1 signal and an $\overline{FSCN}$ signal from respective output terminals 116E and 116F of the scan control circuit 116 are applied to respective input terminals 116E and 116F of the scan decode circuit 124. The $\overline{FSCN}$ signal is also applied to input terminal 116F of the input timing circuit 104. A $\overline{DSKP}$ signal from the output terminal 116G of the scan control circuit 116 is applied to the input terminal 116G of the output timing circuit 118.

A "start of output timing" or PSOO signal from an output terminal 118A of the output timing circuit 118 is applied to an input terminal 118A of the scan control circuit 116. A "control response time" or Fφ01 signal from an output terminal 118B of the output timing circuit 118 is applied to like numbered input terminals 118B of the output timing decode circuit 120, the input timing circuit 104, and the output buss logic circuit 112. Other response time signals Fφ02 and Fφ03, together with output control response character counts or FS05–FS08 signals at the collective output terminal 118C of the output timing circuit 118 are applied to collective input terminal 118C of the output timing decode circuit 120. The "control response time" or Fφ01 signal from the output terminal 118D of the output circuit 118 is applied to an input terminal 118D of the output buss logic circuit 112.

With continued reference to FIG. 3, the output timing decode circuit 120 provides a $\overline{DG02}$ signal at an output terminal 120A which is applied to an input terminal 120A of the output timing circuit 118. Decoded "character times" DS00-DS09, decoded "control response times" $\overline{DG00}$–$\overline{DG07}$, an FGRU signal, a DG10 signal, and an FGRU signal are applied from a collective output terminal 120B of the timing decode circuit 120 to a collective input terminal 120B of the output buss logic circuit 112.

The scan decode circuit 124 provides a $\overline{DN9X}$ signal and a $\overline{DNX9}$ signal at the output terminals 124A and 124B, which are applied respectively to input terminals 124A and 124B of the scan control circuit 116. Decoded "scan mode" or $\overline{DM00}$–$\overline{DM07}$ signals from an output terminal 124C of the scan decode circuit 124 are applied to an input terminal 124C of an output buss control circuit 126, the output signal $\overline{Dφ10}$ from which is applied to an input terminal 126A of the output buss logic circuit 122, via output terminal 126A.

A decoded "buss gating" signal or DGAT signal and a decoded "scan mode" signal DM08 from a collective output terminal 124D of the scan decode circuit 124 are applied to a collective input terminal 124D of the output buss logic circuit 112, and the decoded "address" or DNX0–DNX9, $\overline{DN0X}$–$\overline{DN9X}$ signals from a collective output terminal 124E are applied to like numbered input terminals 124E of the data accumulators 122, the status/alarm registers 128 and the control registers 130.

The data stored by the data accumulator bank 50, e.g., in the data accumulators 122, the status/alarm registers 128 and the control registers 130, is applied from a collective output terminal 130A of the accumulator bank 50 to like numbered collective input terminals 130A of the output buss control circuit 126 and the output buss logic circuit 122.

An "alarm buss" or $\overline{ALB}$ signal from an output terminal 128A of the status/alarm registers 128 is applied to an input terminal 128A of the scan control circuit 116. A "data buss" or $\overline{DAB}$ signal, a "control buss" or $\overline{COB}$ signal, and a "KK buss" or $\overline{KKB}$ signal from a collective output terminal 130C of the accumulator bank 50 are applied to an input terminal 130C of the scan control circuit 116. In addition, various signals are applied to the well test unit 32 from the data bank 50 and to the data bank 50 from the well test unit 32 as will subsequently be described in greater detail.

The "output data" or DOUT signal from the output buss logic circuit 112 is applied to input terminal 112A of the data set 26 via output terminal 112A.

In operation, the raw data from the central processing station is applied to the remote terminal unit 30 of FIG. 3 through the data set 26. The raw data is converted to a DAIN signal having integrated circuit compatible levels and is applied to the input timing circuit 104, the input registers 106 and the test circuit 108.

The first bit or "start" bit of the DAIN signal enables the input timing circuit 104 and initiates a timing sequence which synchronizes the remote terminal unit with the timing of the subsequent bits of the DAIN signal. The DAIN signal is shifted into the input registers and decoded by decode logic circuit 114 after each complete ASCII character has been shifted into the input registers 106.

If the remote terminal unit is placed in the "test" mode either by an operator at the remote terminal unit or by a decoded test mode instruction from the central processing station unit, the subsequent bits of the DAIN signal are gated to the output buss logic circuit 112 as the TTYI signal and transmitted back to the central processing station without being decoded. Thus, in the "test" mode, the accuracy of communication between the central processing station and the remote terminal unit may be tested.

In all other modes of operation, the instructions from the central processing station are decoded by the decode logic circuit 114 and provide various control signals which institute, for example, the scanning of the data bank 50 and the control of various functions of the well test unit 32.

The scanning of the registers of the data bank 50 is controlled primarily by the scan control circuit 116 and the scan decode circuit 124. For example, the decoded instructions are applied to the scan control circuit 116 and the scan control circuit, operating through the scan decode circuit, generates the scan address signals which sequentially connect the various data registers to the output buss logic circuit 112 for transmission of data back to the central processing station as the DOUT signal.

Since all data is transmitted in ASCII form, the data must be encoded prior to transmission. The output timing circuit 118 and the output timing decode circuit 120 provide the timing signals utilized to synchronize the transmission of data. The scan decode circuit 124, in addition to providing decoded scan address signals for sequential scanning of the data registers, instructs the output buss logic circuit 112 as to the manner in which the data is to be transmitted back to the central processing station, i.e. as individual bits of data or as complete characters.

The output timing circuit 118 and the output timing decode circuit 120 also provide various special ASCII characters, such as "bell" and carriage return (CR) at appropriate times.

In summary, the remote terminal unit 30 receives and transmits data and may be utilized to acquire data and effect control functions at a remote field location 28. The unit, when connected to the master station via commercially available telephone lines, appears to the central processing station as if it were a teletype unit capable of automatically receiving instructions and automatically transmitting information in accordance with the received instructions. Thus, the remote terminal unit may be interrogated by any conventional teletype unit and is particularly adapted to time sharing computer services which are compatible with the ASCII code or with any computer system properly interfaced for compatibility with this code. Various data may thus be monitored and various control instructions carried out by the remote terminal unit 30.

3. LOGIC SYMBOLS AND SIGNAL DEFINITIONS

The basic logic symbols and terminology utilized throughout the drawings and detailed description are hereinafter discussed in connection with FIGS. 4(A) through 4(G), to facilitate an understanding of the present invention. While two input terminal logic gates are illustrated, it should be understood that the operation of similar gates having more than two input terminals is similar to that described.

The logic symbols utilized throughout the drawings are derived from MIL STD 806B and are shown in such a manner that signals can be traced through the logic circuits in terms of high and low level signals by examination of the logic symbols without knowledge of the electrical characteristics of the various circuits. And gates differ from OR gates in that the input side is straight rather than concave.

The logic symbols are provided with high and low signal level indicators. A line connected directly to a gate or logic element at the input and output sides thereof indicates, respectively, that a high signal level is required to activate the circuit and that the output signal level is high when the circuit is activated. A line connected to a small circle in juxtaposition to the logic element indicates with respect to the input and output side thereof that a low signal level is required to activate the circuit and that a low signal level is provided when the circuit is activated.

Figure 4A:
Figure 4B:
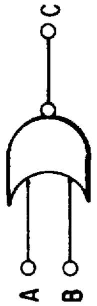

NOR gate. The symbols utilized to designate the NOR gates throughout the drawings are shown in FIGS. 4(A) and 4(B). The shape of the outline of the symbol indicates that the gate is an OR gate, i.e., the input side is concave in shape. The small circles at the intersection of the input lines and the gate symbol of FIG. 4(A) indicate that the level of the input signals applied to that terminal must be low, (i.e., a binary ZERO) to activate or enable the gate. The absence of the small circle at the intersection of the input lines and the gate symbol of FIG. 4(B) indicates that the level of the signals applied to the input terminals must be high (i.e., a binary ONE) to activate or enable the gate. Likewise, the small circle or absence thereof on the output lines indicates the signal level of the output signals when the gates are activated.

Thus, if either of the signals A or B applied to the input terminals of the NOR gate illustrated in FIG. 4(A) is at the low level, the gate is "activated" and the output signal C of the NOR gate assumes a high signal level.

If both of the signals A or B applied to the input terminals of the NOR gate of FIG. 4(B) is a high signal level, the output signal C assumes a low signal level.

Figure 4C:
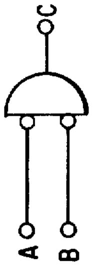
Figure 4D:
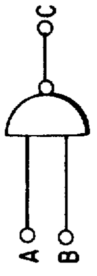

NAND gate. The symbols utilized to designate NAND gates throughout the drawings are shown in FIGS. 4(C) and 4(D). The shape of the outline of the gate symbol indicates that the gate is an AND gate. The small circles or absence thereof at the intersection of the input and output lines and the gate symbols indicate the required signal levels as described above in connection with the NOR gates.

Thus, when the signals A and B applied to the input terminals of the NAND gate of FIG. 4(C) are both at a low signal level, the level of the output signal C is high. Likewise, when the signals A and B applied to the input terminals of the NAND gate of FIG. 4(D) are at a high signal level, the level of the output signal C is low.

Figure 4E:
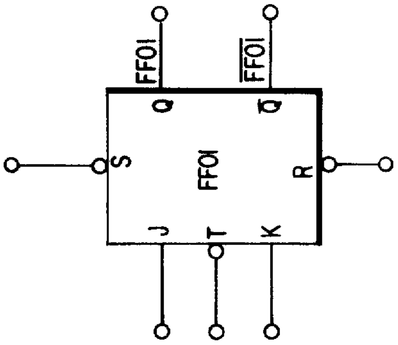

JK flipflop. The symbol utilized to designate JK flipflops throughout the drawings is shown in FIG. 4(E). The JK flipflop is shown as a rectangle having three input terminals connected to the left side thereof and two output terminals connected to the right side thereof. The uppermost input terminal is the set steering terminal, the center input terminal is the trigger or clock terminal, and the lowermost input terminal is the reset steering terminal. The uppermost output terminal is the set or binary ONE output terminal and the lowermost output terminal is the reset or binary ZERO output terminal. Two additional input terminals, the set input terminal and the reset input terminal, are provided respectively at the top and at the bottom of the rectangle.

For the purpose of description, the JK flipflop of FIG. 4(E) has been identified as the FFO1 flipflop. The output signal taken from the Q terminal is designated the FFO1 signal. The signal taken from the $\overline{Q}$ output terminal is designated the $\overline{FFO1}$ output signal. Either of these signals may be at a high or low signal level depending of course upon the state of the flipflop. For example, when the FFO1 flipflop is set, the FFO1 signal is at a high level and the $\overline{FFO1}$ signal is at a low level. When the FFO1 flipflop is reset, the FFO1 signal is at a low level and the $\overline{FFO1}$ signal is at a high level.

The condition or state of the flipflop, i.e. set or reset, may be established by applying a clock signal to the trigger input terminal while simultaneously applying a high level input signal to either one or both of the steering terminals in accordance with the following truth table:

JK FLIPFLOP TRUTH TABLE

| Input Signal Levels Before Clock J | K | F. F. State After Clock |
|---|---|---|
| Low | Low | Same as Before Clock |
| Low | High | Reset |
| High | Low | Set |
| High | High | Opposite of Before Clock |

It should be noted that the clocking action shown in the above table occurs when the clock signal makes the transition from a high to a low signal level. Additionally, the flipflop is set by a low signal level on the set input terminal and remains set as long as the low signal level is applied thereto. Likewise, the flipflop is reset when a low signal level is applied to the reset input terminal and remains reset as long as the low signal level is present.

Figure 4F:
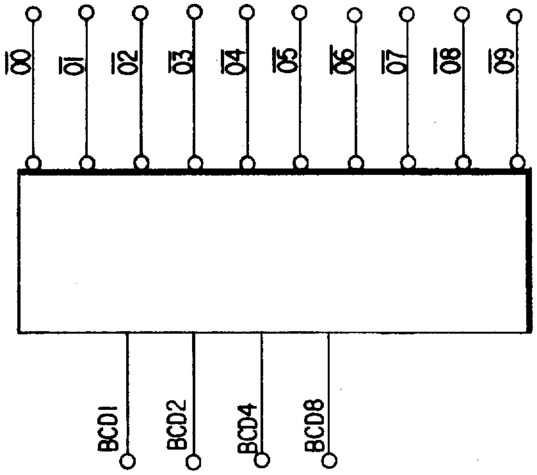

BCD/decimal converter. The symbol for the binary coded decimal to decimal converters or decoders which are utilized as decoding circuits is shown in FIG. 4(F). The converter or decoder is illustrated as a rectangle having four input terminals connected to the left side thereof and ten output terminals connected to the right side thereof. The input terminals are, from top to bottom, the BCD 1, BCD 2, BCD 4 and BCD 8 input terminals. The output terminals are, from top to bottom, the decimal O through 9 output terminals. Note that the signal level identification previously described has been utilized.

Figure 4G:
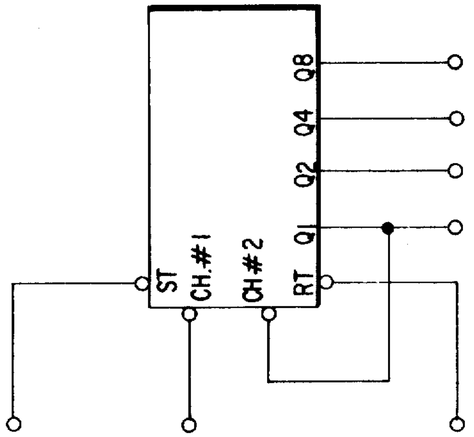
Figure 4H:
Figure 4I:

Inverter. The symbol for an inverter may vary as shown in FIGS. 4(H) and 4(I) depending upon the conventionally actuated condition of the device. Irrespective of the illustration, a high and low signal level at the input terminal A will produce respectively a low and high signal level at the output terminal C.

BCD counter. The symbol for the binary "decimal counter" utilized throughout the drawings is shown in FIG. 4(G). The BCD counter is shown as a rectangle having a strobe or ST input terminal connected to the top thereof, and a clock No. 1 or C1 input terminal and a clock No. 2 or C2 input terminal, connected respectively from top to bottom to the left side of the rectangle. A reset or RT input terminal is connected to the bottom left side of the rectangle and, from left to right, the output terminals connected to the bottom of the rectangle are the Q1, Q2, Q4, and Q8 output terminals. As utilized throughout the system, the BCD counter Q1 output terminal is connected back to the clock No. 2 input terminal to provide a BCD or divide by ten counter.

In operation, a low level signal applied to the strobe terminal allows clocking action to take place upon the transition of the clock signals from a high to a low signal level. As the signal applied to the C1 input terminal changes from a high signal level to a low signal level, the first flipflop in the counter is toggled and the output signal therefrom applied to the clock No. 2 input terminal via the Q1 output terminal clocks the next three flipflops in a divide by five configuration. Thus, by connecting the Q1 output terminal to the C2 input terminal, a one-two-four-eight BCD counter results. Further, it should be noted that a low signal level applied to the reset terminal RT resets all of the flipflops in the BCD counter.

4. INPUT TIMING CIRCUIT

The input timing circuit 104 of the remote terminal unit 30 of FIG. 3 is shown in detail in FIG. 5. Referring now to FIG. 5, the output signal CLOCK from a conventional 1 Kilohertz clock oscillator 200 is applied to the trigger input terminals of conventional JK flipflops FD01, FD02, FD04, FR01 and FR02. In addition, the output signal from the clock oscillator 200 is provided at an output terminal 104A of the timing circuit 104.

The DAIN signal is applied to the set steering terminal of the flipflop FR01 and immediately after receipt of the first DAIN bit, the flipflop FR01 is set by a pulse from the clock oscillator 200. The FR01 signal is inverted by an inverter 202 and applied to the reset terminal of the flipflops FD01 through FD08. Thus, when the flipflop FR01 is set upon receipt of the first DAIN bit, the flipflops FD01 through FD08 commence the timing cycle illustrated in the signal timing diagram of FIG. 6.

The flipflops FD01 through FD04, together with the NAND gate 206, collectively comprise an input bit time counter 204 which functions as a divide by 9 counter to divide the signal from the 1 Kilohertz CLOCK into equal groups of 9 clock pulses to thereby permit the timing circuit to generate a single pulse for each group of 9 CLOCK pulses. The FD02 and the $\overline{\textbf{FD03}}$ signals are applied to the input terminals of a two-input terminal NAND gate 208 to provide a SYNC signal at the output terminal 104E of the timing circuit 104. The SYNC signal is utilized to clock the DAIN signal into the input registers 106 of FIG. 4 as will hereinafter be described. As illustrated in FIG. 6, the SYNC signal occurs at approximately the middle of the periods defined by each group of 9 pulses of the CLOCK signal from the oscillator 200.

The FD03 signal is also applied to the trigger input terminals of the flipflops FD05 and FD06 which, together with flipflops FD07 and FD08, function as a divide by 11 counter and collectively constitute an input character time counter 210. The FD05, $\overline{\textbf{FD06}}$ and $\overline{\textbf{FD08}}$ signals are applied to the input terminals of a 3-input terminal NAND gate 212 and the output signal therefrom is applied to both the reset steering terminal of the flipflop FR01 and the set steering terminal of the flipflop FR02 which together form a word transfer counter 214.

Thus, after 11 bits of the DAIN signal have been clocked into the input registers 106 of FIG. 7 by the SYNC signal, the flipflop FR01 is reset and the flipflop FR02 is set. The high signal level of the output signal FR01 resets the flipflops FD01–FD08 and maintains these flipflops in a reset condition until another DAIN bit is received. Since the FR02 signal is applied to the reset steering terminal, the flipflop FR02 resets on the next clock pulse. A 1 millisecond high signal level output pulse is thus provided by the flipflop FR02 signifying that one complete 11 bit teletype character has been loaded into the input registers 106 hereinafter described.

The FR02 signal is also provided at an output terminal 104B and the $\overline{\textbf{FR02}}$ signal is applied to one input terminal of a 2-input terminal NAND gate 216 and to one input terminal of a 2-input terminal NAND gate 218. The FEXT signal from the test circuit 108 of FIG. 26 is applied to the other input terminal of the NAND gate 216 via input terminal 108A and the DR02 output signal from the NAND gate 216 is applied to an output terminal 104C of the timing circuit 104 and to the trigger input terminals of conventional JK flipflops FC01 and FC02 which together function as an input word counter 220.

RA06 and $\overline{\textbf{RA07}}$ signals are provided from the input registers 106 of FIG. 7 via input terminals 106C and 106B, respectively, to two of the input terminals of a 3-input terminal NAND gate 222. The FC02 signal from the FC02 flipflop is applied to the third input terminal of the NAND gate 222. The output signal DR01 from the NAND gate 222 is applied to the set steering trigger of the FC01 flipflop and through an inverter 224 as a $\overline{DR01}$ signal to the other input terminal of the NAND gate 218 and an output terminal 104D. The output signal from the NAND gate 218 is applied to an output terminal 104F as a TRIG output signal.

The $\overline{DA212}$ signal from the input decode circuit 329 of FIG. 8 is applied via an input terminal 114A to one input terminal of a 2-input NOR gate 226 and the $\overline{FC01}$ signal from the flipflop FC01 is applied to the other input terminal of the NAND gate 226. The output signal from the NAND gate 226 is applied to the reset steering terminals of the flipflops FC01 and FC02.

To insure that the flipflops FR01, FR02, FC01 and FC02 are reset when power is initially applied to the remote terminal unit or in other desired situations, the $\overline{FSCN}$ signal from the scan control circuit 116 and the $\overline{F\phi01}$ signal from the output timing circuit 118 of FIG. 21 are applied respectively via input terminals 116F and 118B to a reset circuit 228 such as that illustrated in greater detail in FIG. 5(A).

With reference now to FIG. 5(A), a switch 230 is illustrated as having one terminal grounded and the other terminal connected to the cathode of a diode 232, an output terminal 233, and to a positive 5-volt power supply by way of a resistor 234. The switch 230 is shunted by a capacitor 236 and the anode electrode of the diode 232 is connected to the positive 5-volt supply by way of a resistor 238. The resistor 238 and diode 232 interconnection is connected to the anode electrodes of a pair of diodes 240 and 242 and to an output terminal 244. The signals $\overline{FSCN}$ from the scan control circuit 116 of FIG. 15 and $\overline{F\phi01}$ from the output timing circuit 118 of FIG. 22 are applied to the cathode of the diodes 240 and 242, respectively.

When the remote terminal unit 30 is first energized, the delayed charging of the capacitor 236 provides reset signals RSTA and RSTB at output terminals 233 and 244, respectively. The switch 230 may thereafter be actuated when desired either manually or automatically to provide the RSTA and RSTB signals which reset the flipflops FR01, FR02, FC01 and FC02 of FIG. 5. The diodes 232, 240 and 242 form a 3-input OR gate which allows the flipflops FC01 and FC02 to be reset by the RSTB signal which is developed by either the switch 238 or either of the signals $\overline{FSCN}$ and $\overline{F\phi01}$.

Thus, the initial condition of the flipflops FC01, FC02, FR01 and FR02 is established by the delayed charging of the capacitor 236 and this condition may be subsequently reestablished by the switch 230. The condition of the flipflops FC01 and FC02 may alternatively be established by the $\overline{FSCN}$ signal and the $\overline{F\phi01}$ signal.

5. INPUT TIMING CIRCUIT OPERATION

Referring once again to FIG. 5 and assuming that the initial conditions of the flipflops of the timing circuit 104 have been determined as previously described, the first data input bit, i.e., the first bit of the DAIN signal, applied to the set steering trigger of the flipflop FR01 causes the flipflop FR01 to set upon the application of the next subsequent pulse of the CLOCK signal. The $\overline{FR01}$ signal resets the FD01–FD08 flipflops of the input bit time and input character time counters 204 and 210. The flipflops FD01–FC04 generate a SYNC signal which occurs at approximately the middle of successive 9 clock pulse time intervals. This corresponds to the spacing of the bits of data in the DAIN signal as received by the remote terminal unit 30, and the SYNC signal thus clocks the bits of the DAIN signal into an RA input register 106 of FIG. 7 in synchronism with the receipt thereof as will hereinafter be described. After eleven such SYNC signals, i.e., after one complete character comprising eleven bits has been clocked into the RA input register, the output signal from the NAND gate 212 resets the flipflop FR01 thereby preparing the input bit and input character counters 205 and 207 for the receipt of the next ASCII character. The flipflop FR02 is set and then reset on successives pulses from the clock 200, thereby providing a 1 millisecond high signal level output pulse which is gated with the $\overline{DR01}$ signal to provide the TRIG signal utilized to shift the complete ASCII character in the input shift register RA into a pair of parallel registers RB and RC hereinafter described in connection with FIG. 7.

In addition, the $\overline{FR02}$ signal is gated with the FEXT signal to generate the DR02 signal used in the decode logic circuit 114 of FIG. 8 and as the clock pulse for the input word counter 220. The FC01 flipflop thus is set when the FR02 flipflop signifies that a complete character has been loaded into the input shift register RA of FIG. 7. The FC02 flipflop is set when a second character has been loaded into the input register RA. Since two characters comprise one control word, the FC02 signal signifies that a control word has been loaded into the remote terminal unit registers. The FC01 and FC02 flipflops can be reset only when a decoded teletype line feed (LF) or DA212 signal is provided by the input decode circuit 329 of FIG. 8.

The operation of the input timing circuit of FIG. 5 may be more clearly understood by referring to the timing diagram of FIG. 6. The clock oscillator continuously provides a 1 Kilohertz CLOCK signal as illustrated in FIG. 6. The first transition of the CLOCK signal from a high to a low level after the receipt of the start bit of the DAIN signal sets the FR01 flipflop and the FR01 signal assumes a high signal level and enables the FD01–FD08 flipflops. The FD01–FD04 flipflops function as a divide by nine counter and divide the CLOCK signal into groups of nine pulses. By gating the FD02 signal with the $\overline{FD03}$ signal to form a SYNC signal, a positive pulse is generated approximately at the center of each group of nine pulses of the CLOCK signal. This SYNC signal is utilized to clock the bits of the DAIN signal into the input register RA.

The $\overline{FD03}$ signal is also utilized to clock the input character counter which includes the FD05–FD08 flipflops. The FD05, $\overline{FD06}$ and $\overline{FD08}$ signals are gated together to reset the FR01 flipflop after one complete character has been clocked into the RA register of FIG. 7 by the SYNC signal. The FR01 signal thus assumes a low signal level resetting all of the FD01–FD08 flipflops to prepare these flipflops for reception of the next character. In addition, the FR02 flipflop is set by the gated FD05, $\overline{FD06}$ and $\overline{FD08}$ signals, and the FR02 signal, a positive one millisecond pulse, is provided signifying that one complete character has been loaded into the RA register. The FR02 signal is utilized by the decode logic circuit 114 of FIGS. 8–12 to decode a signal character instruction which, when present, takes the remote terminal unit out of test mode and into command mode. If the remote terminal unit is not in test mode, the DR02 signal, i.e., the $\overline{FR02}$ signal gated with the FEXT signal, which occurs at the end of one character transfer, is utilized to enable the single character decode circuit 330 of FIG. 8.

The DR02 signal also clocks the FC01 and FC02 flipflops of the input word counter 220. After one control word, i.e., two characters, has been loaded by the TRIG signal into the RB and RC registers, the FC02 flipflop is set and the FC02 signal assumes a high signal level signifying that one complete control word is available for decoding by the control word decode circuit 312 of FIG. 8.

The $\overline{FR02}$ signal is also gated responsively to the input word counter 220 to provide a TRIG signal.

The TRIG signal assumes a high signal level for approximately one millisecond after each complete transfer of a character into the RA register to transfer the character in the RA register to the RB and RC registers as previously mentioned. Note that after a control word comprising two characters has been loaded into the RB and RC registers by the TRIG signal, the FC02 signal remains at a high signal level and prevents the further transfer of characters into the RB and RC registers until a decoded line feed, $\overline{DA212}$, signal resets the FC01 and FC02 flipflops.

6. INPUT REGISTERS

Referring now to FIG. 7, the input registers of the remote terminal unit comprise a conventional nine bit serial shift register RA and two conventional six bit parallel shift registers RB and RC previously mentioned in connection with the introduction and FIG. 3. The DAIN signal is applied via the input terminal 106 of the input shift register RA from the level converter of FIG. 3 to the set steering terminal 244 of the shift register RA and is also inverted in an inverter 246 and applied to the reset steering terminal 248 thereof. The SYNC signal from the timing circuit 104 of FIG. 5 is applied to the trigger input terminal 250 of the shift register RA to load the shift register RA in accordance with the timing sequence previously described.

The TRIG signal from the timing circuit 104 of FIG. 5 is applied via the input terminal 130 to the trigger input terminals 252 and 254, respectively, of the parallel registers RB and RC.

The FEXT signal from the test circuit 108 of FIG. 25 is applied via the input terminal 108A to one input terminal of a 2-input terminal NOR gate 256 and the $\overline{DWRU}$ signal from the decode logic circuit 114 of FIGS. 8 - 12 is applied via the input terminal 114F to the other input terminal of the NOR gate 256 by way of an inverter 258. The output signal from the NOR gate 256 is applied to the reset terminals 260 and 262 of the parallel registers RB and RC, respectively.

The output signals RA01 through RA06 from the shift register RA are applied to the data input terminals of the parallel shift register RB and are additionally applied to output terminals 264 through 269 which are represented collectively as output terminal 106A in the functional block diagram of FIG. 7. The RA06 signal is also provided at the output terminal 106C and the RA07 signal is inverted by an inverter 270 and provided at the output terminal 106B.

The output signals RB01 through RB06 from the parallel register RB are applied to the data input terminals of the parallel register RC and are additionally applied to output terminals 272–277, which are likewise collectively represented in the functional block diagram of FIG. 3 as an output terminal 106A. The output signals RC01 through RC06 from the parallel register RC are applied to output terminals 278 through 283 which are also collectively represented in FIG. 3 by the single output terminal 106A.

In operation, the SYNC signal serially loads the bits of the DAIN signal into the input shift register RA. When an entire character has been loaded into the RA register, the TRIG signal from the timing circuit 104 loads the first six bits of the first character then in the RA register into the parallel RB register. A second character is loaded into the RA input register and upon receipt of a second TRIG signal, the first character then in the RB register is loaded into the RC parallel register and the second character then in the RA register is loaded into the RB register by the second TRIG signal. The condition of the registers RA, RB and BC may be continuously monitored by the decode logic circuit 114 of FIGS. 8–12 to provide control signals as will hereinafter be described in connection with FIG. 8.

7. DECODE LOGIC CIRCUIT

The decode logic circuit 114 of the remote terminal unit of FIG. 3(A) is illustrated in more detail in FIGS. 8 through 12.

With reference to FIG. 8, the first character signals RB01 - RB06 and the second character signals RC01-RC06 which together constitute a two character control word are applied in groups of three to four conventional BCD to decimal converters DB1, DB2, DC1 and DC2 by way of input terminals 300 - 311, respectively, from the collective output terminal 106A of the parallel registers RB and RC of FIG. 7. The output signals $\overline{DB01}$–$\overline{DB17}$ adn $\overline{DC01}$–$\overline{DC17}$ from the converters DB1, DB2, DC1 and DC2 are applied to a control word decode circuit 312, hereinafter described in more detail in connection with FIG. 8(A), to generate control signals $\overline{DDCO}$, $\overline{DDDA}$, $\overline{DDAL}$, $\overline{DDKK}$, $\overline{DDEX}$, $\overline{DDRE}$, $\overline{DDCL}$, $\overline{DDTT}$, $\overline{DDMA}$, and $\overline{DDST}$. These control signals are applied by way of output terminals 313 - 322, respectively, to the various decode circuits of FIGS. 10–15 (and to various decode logic circuit output terminals 114 as indicated.)

With continued reference to FIG. 8, the signal RA01–RA06, which together constitute a single instruction character, are applied to an input decode circuit 330, hereinafter described in connection with FIG. 8(B), from the collective output terminal 106A of the input shift register RA of FIG. 7 by way of input terminals 323 - 328, respectively. In addition, the $\overline{RA07}$ signal from the input shift register RA and the DR02, CLOCK and FR02 signals from the timing circuit 104 of FIG. 5 are applied via respective single instruction terminals 106B, 104C, 104A and 104B to the input decode circuit 330.

The single instruction decode circuit 330 decodes the contents of the input register RA when the DR02 signal is applied thereto to provide a $\overline{DWRU}$ control signal, a $\overline{DA212}$ control signal, a $\overline{DA257}$ control signal, a $\overline{TC}$ control signal and a $\overline{COT}$ control signal at respective output terminals 332 - 336 (decode logic circuit terminals as indicated). Since the DR02 signal signifies that the RA register is loaded with a complete ASCII character, the contents of the shift register RA is decoded only upon receipt of a complete ACSII character to determine whether or not the special single character instruction of Table I has been transmitted to the remote terminal unit.

With reference now to FIG. 8(A), the control word decode circuit 312 comprises a plurality of identical logic circuits which decode the input signals $\overline{DB01}$ – $\overline{DB17}$ and $\overline{DC01}$ – $\overline{DC17}$ to provide the control signals previously described in connection with FIG. 8. While only one of the plurality of logic circuits of the control word decode circuits is shown in FIG. 8(A), a circuit of the type illustrated in FIG. 8(A) is provided for each of the control signals.

With continued reference to FIG. 8(A), the logic circuit utilized to generate each of the control signals comprises a first NAND gate 336 having two input terminals A and B, a second NAND gate 338 having two input terminals C and D, and a third NAND gate 340 having an output terminal E and two input terminals connected respectively to the output terminals of the NAND gates 336 and 338.

For the sake of clarity, the input signal conditions at the input terminals A, B, C and D of the logic circuits of the control word decode circuit 312 which must be satisfied to generate the various control signals are listed in the following table V wherein letter designations corresponding to those of FIG. 8(A) have been utilized:

TABLE V

| A | B | C | D | E |
|---|---|---|---|---|
| $\overline{DC10}$ | $\overline{DC03}$ | $\overline{DB11}$ | $\overline{DB07}$ | $\overline{DDCO}$ |
| $\overline{DC10}$ | $\overline{DC04}$ | $\overline{DB10}$ | $\overline{DB01}$ | $\overline{DDDA}$ |
| $\overline{DC10}$ | $\overline{DC01}$ | $\overline{DB11}$ | $\overline{DB04}$ | $\overline{DDAL}$ |
| $\overline{DC11}$ | $\overline{DC03}$ | $\overline{DB11}$ | $\overline{DB03}$ | $\overline{DDKK}$ |
| $\overline{DC10}$ | $\overline{DC05}$ | $\overline{DB13}$ | $\overline{DB00}$ | $\overline{DDEX}$ |
| $\overline{DC12}$ | $\overline{DC02}$ | $\overline{DB10}$ | $\overline{DB05}$ | $\overline{DDRE}$ |
| $\overline{DC10}$ | $\overline{DC03}$ | $\overline{DB11}$ | $\overline{DB04}$ | $\overline{DDCL}$ |
| $\overline{DC12}$ | $\overline{DC04}$ | $\overline{DB12}$ | $\overline{DB04}$ | $\overline{DDTT}$ |
| $\overline{DC11}$ | $\overline{DC05}$ | $\overline{DB10}$ | $\overline{DB01}$ | $\overline{DDMA}$ |
| $\overline{DC12}$ | $\overline{DC03}$ | $\overline{DB12}$ | $\overline{DB04}$ | $\overline{DDST}$ |

Thus, it can be seen from the above table V that when, for example, the signals $\overline{DC10}$, $\overline{DC03}$, $\overline{DB11}$ and $\overline{DB07}$ are at their low signal level at the input terminals A, B, C and D, respectively, of the logic circuit associated with the $\overline{DDCO}$ command signal, the output $\overline{DDCO}$ signal present at the output terminal E will be at its high signal level which corresponds, in this particular example, to the output terminal 313 of the control word decode circuit 312.

With reference to FIG. 8(B), the single instruction decode circuit 330 comprises a plurality of eight input terminal NAND gates 342. One NAND gate 342 is provided to decode each of the output signals $\overline{DWRU}$, $\overline{DA212}$, $\overline{DA257}$, $\overline{TC}$ and $\overline{COT}$. For the sake of clarity, only one NAND gate 342 has been shown in FIG. 8(B). Eight input terminals F, G, H, J, K, L, M and N and an output terminal P are provided.

The following table VI illustrates the signals applied to the input terminals of each of the NAND gates 342 associated with the above control signals from the input decode circuit 330:

first line of input signals in the above table. When these signals all assume a low signal level, the output signal $\overline{DWRU}$ at the output terminal 332 of the single instruction decode circuit 330 will assume a high signal level.

The control signals generated as described above are further decoded in the decode logic circuits of FIGS. 9 – 12 to provide command signals and other control signals utilized throughout the remote terminal unit.

As illustrated in FIG. 9, the control data and control shift command signals CODA and COSH are generated by the control data decode circuit 343. With reference now to FIG. 9, the DDCO signal at the output terminal 313 of the control word decode circuit 312 of FIG. 8 is applied through an inverter 344 to one input terminal of a two-input terminal NAND gate 346. The $\overline{COT}$ signal from the output terminal 336 of the single instruction decode circuit 330 of FIG. 8 is applied through an inverter 348 to the other input terminal of the NAND gate 346 and to one input terminal of a two-input terminal NAND gate 350. The RA01 signal from the output terminal 106A of the input registers 106 of FIG. 7 is applied to the other input terminal of the NAND gate 350 and the output signals COSH and CODA from the NAND gates 346 and 350, respectively, are applied to the collective output terminal 114G.

The FSL1 and FSL2 execute control signals are generated by the execute control circuit 345, illustrated in FIG. 10. Referring to FIG. 10, the $\overline{DA257}$ signal from the output terminal 334 of the single instruction decode circuit 330 of FIG. 8 is applied to the set steering terminal of a JK flipflop FSL1 by way of an inverter 353 and the $\overline{DA212}$ signal from the output terminal 333 of the single instruction decode circuit 330 of FIG. 8 is applied to the reset steering terminal of the flipflop FSL1 by way of an inverter 354. The $\overline{DA212}$ signal is also applied to one input terminal of a three-input terminal NAND gate 355 and the $\overline{FSL1}$ signal from the FSL1 flipflop together with the $\overline{DDCO}$ signal from the output terminal 313 of the control word decode circuit 312 of FIG. 8 are applied to the second and third input terminals of the NAND gate 355.

The output signal from the NAND gate 355 is applied to the set steering terminal of a J-K flipflop FSL2 and to one input terminal of a three input terminal NAND gate 356. The $\overline{DDCO}$ signal from the output terminal 317 of the control word decode circuit 312 of FIG. 8 and an $\overline{FS09}$ signal from the output terminal 118E of the output timing circuit 118 of FIG. 21 are applied respectively to the second and third input terminals of the NAND gate 356. The output signal from the NAND gate 356 is applied to the reset steering terminal of the flipflop FSL2 and the CLOCK signal from the output terminal 104A of the timing circuit 104 of FIG. 5 is applied to the trigger input terminals of both of the FSL1

TABLE VI

| F | G | H | J | K | L | M | N | P |
|---|---|---|---|---|---|---|---|---|
| RA01 | $\overline{RA02}$ | RA03 | $\overline{RA04}$ | $\overline{RA05}$ | $\overline{RA06}$ | $\overline{RA07}$ | DR02 | $\overline{DWRU}$ |
| $\overline{RA01}$ | RA02 | $\overline{RA03}$ | RA04 | $\overline{RA05}$ | $\overline{RA06}$ | $\overline{RA07}$ . | DR02 | $\overline{DA212}$ |
| RA01 | RA02 | RA03 | RA04 | $\overline{RA05}$ | RA06 | $\overline{RA07}$ | DR02 | $\overline{DA257}$ |
| $\overline{RA01}$ | $\overline{RA02}$ | $\overline{RA03}$ | $\overline{RA04}$ | $\overline{RA05}$ | $\overline{RA06}$ | $\overline{RA07}$ | FR02 | $\overline{TC}$ |
| CLOCK | $\overline{RA02}$ | $\overline{RA03}$ | $\overline{RA04}$ | RA05 | $\overline{RA06}$ | $\overline{RA07}$ | DR02 | $\overline{CO}$ |

It can thus be seen from the above table VI that, for example, the input signals applied to the NAND gate 342 associated with the $\overline{DWRU}$ signal are those of the and FSL2 flipflops. The output signals FSL2, and $\overline{FSL1}$ from the FSL2 and FSL1 flipflops are applied by way of output terminals 359 and 114D, respectively, to the execute decode logic circuit 361 of FIG. 11 and the scan control circuit 116 of FIG. 13.

With reference now to FIG. 11, an execute command signal $\overline{EXQ}$ and a data valid command signal DVLD are generated by the execute decode circuit 361 illustrated. The $\overline{DDEX}$ signal from the output terminal 317 of the control word decode circuit 312 of FIG. 8 is applied to one input terminal of a two-input terminal NAND gate 362 and the FSL2 signal from the output terminal 359 of the FSL2 flipflop of FIG. 10 is applied to the other input terminal of the NAND gate 362. The execute signal $\overline{EXQ}$ from the NAND gate 362 is applied to an output terminal 114G and to one input terminal of an eight input terminal NOR gate 364. The $\overline{DDCO}$, $\overline{DDDA}$, $\overline{DDRE}$, $\overline{DDCL}$, $\overline{DDTT}$, $\overline{DDMA}$ and $\overline{DDST}$ output signals from the respective output terminals 313, 314, and 318 - 322 of the control word decode circuit 312 of FIG. 8 are applied individually to the remaining seven input terminals of the NOR gate 364, and the output signal from the NOR gate 364 is applied to an output terminal 114B as a DVLD signal.

The data scan command signal $\overline{DSCN}$ is generated by the input scan decode circuit 366 illustrated in FIG. 12. With reference now to FIG. 12, the $\overline{DDCO}$ and $\overline{DDDA}$ control signals from the output terminals 313 and 314 of the control word decode circuit 312 of FIG. 8 are applied to the input terminals of a two - input terminal NOR gate 367 and the $\overline{DDAL}$ and $\overline{DDKK}$ control signals from the output terminals 315 and 316 of the control word decode circuit 312 of FIG. 9 are applied to the input terminals of a two-input terminal NOR gate 368. The output signals from the NOR gates 367 and 368 are applied to the input terminals of a two-input terminal NOR gate 369, and the $\overline{DSCN}$ signal output therefrom is applied to an output terminal 114D. The $\overline{DSCN}$ control signal is thus generated by the input scan decode circuit 366 whenever the control word in the RB and RC registers of FIG. 7 are decoded as control signals $\overline{DDCO}$, $\overline{DDDA}$, $\overline{DDAL}$ or $\overline{DDKK}$ by the control word decode circuit 312 of FIG. 8.

8. DECODE LOGIC CIRCUIT OPERATION

As previously described, the decode logic circuit of FIGS. 8–12 decodes the contents of the input registers 106 of FIG. 7 to provide the various control signals utilized to control the operation of the remote terminal unit. An understanding of the operation of the decode logic circuit 114 of FIG. 3(A) will be more easily gained through a description of the operation of the more detailed circuits of FIGS. 8–12.

As illustrated in FIG. 8, the contents of the parallel registers RB and RC are applied respectively to the DB and the DC decoders. Eight of the ten output signals from the DB and DC decoders are connected to the control word decode circuit 312 which decodes the binary signals from the DB and DC decoders to provide the two character instructions or control signals previously described in connection with FIG. 8.

Likewise, the contents of the RA serial shift register of FIG. 7 are applied to the single instruction decode circuit 330 along with various timing signals to provide the control signals associated with the single character instructions.

The control signals generated by the input decode circuit 329 of FIG. 8 may be directly utilized in other circuits throughout the remote terminal unit or may be further combined to provide additional control or command signals. As shown in FIG. 9, when both the $\overline{DDCO}$ control signal and the $\overline{COT}$ control signal assume a low signal level, the control shift or COSH signal assumes a low signal level and the NAND gate 350 is enabled allowing the RAO1 signal to generate the control data or CODA signal. Both the COSH and CODA signals are applied via the collective output terminal 114G to the control registers hereinafter described to control the loading of the registers with various command signals.

Thus, the control data decode circuit 343 of FIG. 9 provides a COSH signal which clocks the CODA signal into the control registers when the remote terminal unit is in the control mode, i.e., when a two-character instruction is decoded as a low signal level $\overline{DDCO}$ signal, and when the single character instruction is decoded as a low signal level $\overline{COT}$ control signal. The COSH signal continues to clock the CODA signal into the control registers unit a teletype slash (/) character, decoded as a $\overline{DA257}$ control signal by the single instruction decode circuit 330, signifies that the control register RB and RC have been loaded and readies the remote terminal unit for the receipt of an execute instruction and the generation of an execute or $\overline{EXQ}$ command signal as will now be described in connection with FIGS. 10 and 11.

With reference to FIG. 10, the execute control circuit 345 provides an FSL1 signal to the scan control circuit 116 of FIG. 13 via the output terminal 114D and an FSL2 signal to the execute decode circuit 361 of FIG. 11. The FSL1 flipflop is set when the contents of the input shift register RA of FIG. 7 are decoded by the input decode circuit 329 of FIG. 8, as a decoded slash (/) or $\overline{DA257}$ signal. The $\overline{FSL1}$ signal assumes a low signal level and causes the scan control circuit 116 of FIG. 15 to scan the control registers and transmit the contents thereof to the master station.

The $\overline{FSL1}$ signal is also applied to the NAND gate 355 along with the $\overline{DA212}$ signal and the $\overline{DDCO}$ signal. When all of these signals assume a low signal level, i.e., when the CO instruction followed by a slash (/) followed by a line feed (LF) has been transmitted to the remote terminal unit from the master station, the FSL2 flipflop will be set and the FSL2 signal will assume a high signal level.

The FSL2 signal generated by the circuit of FIG. 10 is applied to the NAND gate 362 of the execute decode circuit 361 of FIG. 11 and enables the NAND gate 362 when at a high signal level. Thus, when an execute instruction is transmitted to the remote terminal unit and decoded as a low signal level DDCO control signal, the $\overline{EXQ}$ signal from the NAND gate 362 assumes a low signal level and the command stored by the control registers is executed. The low level DDCO control signal also allows the flipflop FSL2 of the execute control circuit 345 of FIG. 10 to be reset, thus readying the execute control circuit 345 and the execute decode circuit 361 of FIGS. 10 and 11 for the next set of execute commands.

Thus, the transmission of the ASCII instruction CO/LF followed by EX and LF to the remote terminal unit causes the control data signal CODA to be stored by the control registers, to be echoed back to the master station and to be subsequently executed.

In addition, the data valid or DVLD signal from the execute decode circuit 361 of FIG. 11 assumes a high signal level whenever any one of the control signals $\overline{DDCO}$, $\overline{DDDA}$, $\overline{DDRE}$, $\overline{DDCL}$, $\overline{DDTT}$, $\overline{DDMA}$, $\overline{DDST}$ or the command signal $\overline{EXQ}$ applied to the NOR gate 364 assumes a low signal level. The assuming of a high signal level by the DVLD signal signifies to the output timing decode circuit 120 of FIG. 22 that a valid instruction has been decoded by the remote terminal unit.

The input scan decode circuit 366 of FIG. 12 provides a $\overline{DSCN}$ signal which institutes the scanning of the data register. When any one of the decoded control signals $\overline{DDCO}$, $\overline{DDDA}$, $\overline{DDAL}$, or $\overline{DDKK}$ assumes a low signal level, the $\overline{DSCN}$ signal assumes a low signal level and permits the scan control circuit 116 of FIG. 13 to generate various scanning signals as will hereinafter be described.

9. SCAN CONTROL CIRCUIT

The scan control circuit 116 of FIG. 3 is illustrated in greater detail in FIGS. 13 through 19.

With reference now to the functional block diagram of FIG. 13, the $\overline{DN9X}$ and $\overline{DNX9}$ signals from the respective output terminals 124A and 124B of the scan decode circuit 124 of FIG. 20 are applied to the input terminals 124A and 124B, respectively, of a scan control logic circuit 404. The CLOCK signal from the input timing circuit 104 of FIG. 5 is applied to an input terminal 104A of the scan control logic circuit 404 and the $\overline{DA212}$ control signal from the signal instruction decode circuit 330 of the decode logic circuit 114 of FIG. 8 is applied to the logic circuit 404 via input terminal 114A. The $\overline{FSL1}$, $\overline{DDDA}$ and $\overline{DSCN}$ control signals from various sections of the decode logic circuit 114 of FIGS. 8–12 are applied by way of the collective input terminal 114D to input terminals 407–409 of the scan control logic circuit 404.

The output signals $\overline{DFMD}$, FMD1, $\overline{FSCN}$, FSCN and $\overline{DN99}$ from the scan control logic circuit 404 are applied to respective output terminals 116A, 116E, 116F, 116B and 116D of the scan control circuit 116 by way of output terminals 116A, 413, 116F, 415 and 116D of the scan control logic circuit 404. The FMD1 signal from the scan control logic circuit 404 is also applied to an input terminal 413 of a scan mode logic circuit 418. The FSCN signal from the scan control logic circuit 404 is also applied to both an input terminal 415 of a scan address counter 420 and an input terminal 415 of a scan logic circuit 422.

The $\overline{KKB}$, $\overline{COB}$ and $\overline{DAB}$ signals from the accumulator bank 50 are applied to a collective input terminal 130C of a skip decode circuit 384 in the scan control circuit 116. The $\overline{ALB}$ signal from the accumulator bank 50 is applied to an input terminal 128A of the skip decode circuit 384 and the $\overline{DDAL}$, $\overline{DDKK}$, $\overline{DDCO}$, and $\overline{DDDA}$ signals from the decode logic circuit 114 of FIG. 3 are applied via collective input terminal 114I to the skip decode circuit 384.

The $\overline{DSKP}$ signal from the skip decode circuit 384 is applied to an output terminal 116G of the scan control circuit 116. The DSKP signal from the skip decode circuit 384 is applied via an output terminal 384A to an input terminal 384A of the scan address logic circuit 422 of the scan control circuit 116.

The DSOO output signal from the output terminal 118A of the output timing circuit 118 of FIG. 21 is applied both to an input terminal 118A of the scan address logic circuit 422 and to an input terminal 118A of a scan mode counter circuit 428.

A DNCT signal from an output terminal 410 of the scan address logic circuit 422 is applied to an input terminal 410 of the scan control logic circuit 404 and to an input terminal 410 of the scan address counter 420. The output signals NC01–NC08 from the scan address counter 420 are applied to a collective output terminal 116C of the scan control circuit 122.

The output signal from an output terminal 441 of the scan mode logic circuit 418 is applied to an input terminal 441 of the scan mode counter circuit 428. The NC09 signal from an output terminal 432 of the scan mode counter circuit 428 is applied to an input terminal 432 of the scan mode logic circuit 418. The NC09, NC10 and NC11 signals from the output terminals 432, 434 and 435, respectively, of the scan mode counter circuit 428 are applied to the collective output terminal 116C, together with an output signal NC12 from an output terminal 430 of a two input terminal NOR gate 437. The input signals to the NOR gate 437 include the FMD1 signal from the output terminal 413 of the scan control logic circuit 404 and the output signal from the output terminal 436 of the scan mode counter circuit 428 by way of an inverter 438. The NC12 signal from the NOR gate 437 is also applied to an input terminal 430 of the scan mode logic circuit 418 and an input terminal 430 of the scan address logic circuit 422.

The skip decode circuit 384, scan control logic circuit 404, the scan address logic circuit 422, the scan address counter 420, the scan mode logic circuit 418 and the scan mode counter 428 illustrated in the functional block diagram of FIG. 13 are described in greater detail in connection with FIGS. 14 through 19 to facilitate an understanding of the invention.

The decoded skip control signals $\overline{DSKP}$ and $\overline{DSKP}$ are generated by the decode logic circuit 384 in the skip decode circuit 384 of FIG. 14. Referring to FIG. 14, the $\overline{DAB}$, $\overline{COB}$, and $\overline{KKB}$ signals from the collective output terminal 130C of the accumulator bank 50 of FIG. 3 are applied to three input terminals of a four-input terminal NOR gate 385. The $\overline{ALB}$ signal from the status/alarm register 128 of FIG. 3 is applied via terminal 128A to the fourth input terminal of the NOR gate 385, and each of the four input terminals of the NOR gate 385 is connected to a positive 5-volt power supply through current limiting resistors 386. The output signal from the NOR gate 385 is applied to one input terminal of a two-input terminal NAND gate 387 and the $\overline{DDDA}$ control signal from the output terminal 314 of the control word decode circuit 312 of FIG. 8 is applied through an inverter 388 to the other input terminal of the NAND gate 387.

The $\overline{ALB}$ signal is also applied through an inverter 389 to one input terminal of a two input terminal NAND gate 390 and the $\overline{DDAL}$ control signal from the output terminal 315 of the control word decode circuit 312 of FIG. 8 is applied through an inverter 391 to the other input terminal of the NAND gate 390. The $\overline{COB}$ signal is applied through an inverter 392 to a one input terminal of a two input terminal NAND gate 393, and the $\overline{DDCO}$ control signal from the output terminal 313 of the control word decode circuit 312 of FIG. 8 is applied through an inverter 394 to the other input terminal of the NAND gate 393. The $\overline{KKB}$ signal is applied through an inverter 395 to one input terminal of a NAND gate 396 and the $\overline{DDKK}$ control signal from the output terminal 316 of the control word decode circuit 312 of FIG. 8 is applied through an inverter 397 to the other input terminal of the NAND gate 396.

The output terminals of the NAND gates 387, 390, 393 and 396 are connected together and are connected to a positive 5-volt power supply through a resistor 398. The DSKP command signal at the interconnection of the output terminals of the NAND gates 387, 390, 393 and 396 is applied to an output terminal 384A and is inverted through an inverter 400 and applied as the signal $\overline{DSKP}$ to an output terminal 116G.

With reference now to the scan control logic circuit 404 of FIG. 15, the $\overline{DA212}$ signal is applied via input terminal 114A to one input terminal of a two input terminal NAND gate 444. The $\overline{DDDA}$ control signal applied to the input terminal 408 of the scan control logic 404 is applied to one input terminal of a two input terminal NOR gate 445 by way of an inverter 446. The $\overline{DSCN}$ and $\overline{FSL1}$ control signals are applied via input terminals 409 and 407, respectively, to the input terminals of a two input terminal NAND gate 447, and the output signal therefrom is applied to the other input terminal of the NOR gate 445. The output signal from the NOR gate 445 is applied to the other input terminal of the NAND gate 444 and the output signal $\overline{DFMD}$ therefrom is applied to the set steering trigger of a flipflop FSCN, to an output terminal 116A and through an inverter 448 to one input terminal of a two input terminal NAND gate 449. The $\overline{FSL1}$ signal from the input terminal 407 is applied to the other input terminal of the NAND gate 449 and the output signal therefrom is applied to the set steering trigger of a flipflop FMD1.

The $\overline{DN9X}$, $\overline{DNX9}$ and DNCT signals are applied respectively from input terminals 124A, 124B and 410 to the input terminals of a three input terminal NAND gate 450. The output signal DN99 from the NAND gate 450 is applied to the reset steering terminal of the flipflop FSCN, the reset steering terminal of the flipflop FMD1, and to the output terminal 116D of the scan control logic circuit 404 through an inverter 451. The FSCN and $\overline{FSCN}$ signals from the FSCN flipflop are applied to the output terminals 415 and 116F, respectively, and the FMD1 signal from the FMD1 flipflop is applied to the output terminal 413.

With reference now to FIG. 16, the scan address logic circuit 422 of FIG. 13 comprises a three input terminal NAND gate 452, a two input terminal NAND gate 453 and a two input terminal NOR gate 454. The FSCN, CLOCK and DSKP signals are applied respectively from input terminals 415, 104A and 114A to the input terminals of the NAND gate 452, and the output signal therefrom is applied to one of the input terminals of the NOR gate 454. The DSOO and NC12 signals are applied via respective input terminals 118A and 430 to the input terminals of the NAND gate 453 and the output signal from the NAND gate 453 is applied to the other input terminal of the NOR gate 454. The DNCT signal from the NOR gate 454 is applied to the output terminal 410 of the scan address logic circuit 422.

As illustrated in FIG. 17, the scan address counter 420 of the scan control circuit 116 of FIG. 13 comprises two serial one decade BCD counters 455 and 456, which together count from 0 to 99 in binary coded decimal to thereby select as many as 99 channels of data.

The DNCT signal is applied via input terminal 410 to the C1 input terminal of the first decade 456 of the scan address counter 420 and the FSLN signal is applied to the strobe terminals of each decade 456 and 457. The NCO1–NCO4 signals from the first decade 456 and the NC05–NC08 signals from the second decade 457 are applied to a collective output terminal 116C of the scan address counter 420. The NC04 is also applied to the trigger input terminal of the second decade 457.

Referring now to FIG. 18, the scan mode logic circuit 418 of the scan control circuit 116 of FIG. 13 comprises a two-input terminal NAND gate 458, a pair of two input terminal NOR gates 459 and 460, and an RC network comprising a capacitor 461 and a resistor 462.

The FMD1 signal from the FMD1 flipflop of FIG. 16 is applied to one input terminal of the NOR gate 460 via input terminal 413 and the NCO9 and NC12 signals from the scan mode counter circuit 428 of FIG. 19 and from the NOR gate 437 of FIG. 13, respectively, are applied via respective terminals 432 and 430 to the NAND gate 458. The output signal from the NAND gate 458 is applied to one input terminal of the NOR gate 459 and the output signal from the NOR gate 459 is applied through the capacitor 461 to the other input terminal of the NOR gate 460, the input terminal of the NOR gate 460 being connected to ground through the resistor 462. The output signal from the NOR gate 460 is applied to an output terminal 441 and is also applied to the other input terminal of the NOR gate 459.

The capacitor 461 and resistor 462 function as an RC timing network and may be, for example, 0.0047 microfarads and 470 ohms, respectively.

With reference now to FIG. 19, the scan mode counter circuit 428 of FIG. 13 comprises a single decade BCD counter 463. The DSOO signal from the output timing circuit 118 of FIG. 21 is applied via input terminal 118A to the C1 input terminal of the counter 463, and the output signal from the output terminal 441 of the scan mode logic circuit 418 of FIG. 18 is applied to the reset input terminal of the counter 463. The signals NCO9, NC10 and NC11 from the BCD1, BCD2 and BCD4 output terminals, respectively, of the counter 463 are applied to the respective output terminals 432, 434, 435, and the output signal from the BCD8 output terminal of the counter 463 is applied to an output terminal 436.

10. SCAN CONTROL CIRCUIT OPERATION

With continued reference to FIGS. 13 through 19, the scan control circuit 116 generates, in conjunction with the scan decode circuit 124, the output timing circuit 118 and the output timing decode circuit 120 hereinafter described, the various signals which control the scanning of the data registers.

The skip decode circuit 384 of FIG. 14 utilizes the $\overline{DAB}$, $\overline{COB}$ and $\overline{KKB}$ output signals from the accumulator bank 50, as well as the $\overline{ALB}$ signal from the alarm register and the decoded $\overline{DDDA}$, $\overline{DDAL}$, $\overline{DDCO}$ and $\overline{DDKK}$ control signals from the input decode circuit 329 of FIG. 8 to generate the DSKP and $\overline{DSKP}$ signals. Whenever any one of the $\overline{DAB}$, $\overline{ALB}$, $\overline{COB}$, or $\overline{KKB}$ signals is at a low signal level and the $\overline{DDDA}$ signal assumes a low signal level, the DSKP and $\overline{DSKP}$ signals assume a high and low signal level respectively. Likewise, when the $\overline{ALB}$ signal and the $\overline{DDAL}$ signal assume a low signal level, or when the $\overline{COB}$ signal and the $\overline{DDCO}$ signal assume a low signal level, or when the $\overline{KKB}$ signal and the $\overline{DDKK}$ signal assume a low signal level, the DSKP and $\overline{DSKP}$ signals assume a high and low signal level respectively. The DSKP and $\overline{DSKP}$ signals are utilized internally by the scan control circuit 116 of FIG. 13 and externally by the output timing circuit 118 of FIG. 21 as will hereinafter be described.

The decoded scan or DSCN signal from the input scan decode circuit 366 of FIG. 12 assumes a low signal level when the control word transmitted to the remote terminal unit is decoded as a $\overline{DDCO}$, $\overline{DDDA}$, $\overline{DDAL}$ or $\overline{DDKK}$ control signal thereby enabling the NAND gate 447. When the FSL1 flipflop of FIG. 11 is set by a decoded "slash" or $\overline{DA257}$ control signal, or when the control word transmitted to the remote terminal unit is a decoded "data mode" or $\overline{DDAA}$ signal, the NAND gate 444 is enabled thereby providing a high signal level at the set steering terminal of the FSCN flipflop and enabling the NAND gate 449 at the set steering terminal of the FMD1 flipflop. Thus, when the instruction received by the remote terminal unit is a CO/, DA/, AL/ or KK/, followed by a line feed (LF), both the FSCN and FMD1 flipflops are set and the FSCN and FMD1 signals assume high signal levels.

When both the FSCN and the FMD1 flipflops are set as previously described, the contents of the data registers are scanned bit by bit, with a comma following each group of eight bits. The FSCN flipflop may be set without setting the FMD1 flipflop if the decoded "data mode" or $\overline{DDDA}$ signals assumes a low level followed by a low signal level of the decoded line feed or $\overline{DA212}$ signal. When this happens, i.e., the FSCN flipflop is set and the FMD1 flipflop remains reset, the contents of the data registers are read as complete characters comprising 8 bits contrasting to the bit by bit reading when the FMD1 flipflop is also set. The scanning of the data registers as complete characters or as individual bits is controlled by monitoring the FSCN and FMD1 signals in the scan decode circuit of FIG. 20, as will hereinafter be described.

The FSCN signal applied to the scan address counter 420 allows the counter 420 to count from 0 to 99 in response to the DNCT signal from the scan address logic circuit 422. As illustrated in FIG. 16, the DNCT signal is either a 1 kilohertz clock signal when the FSCN flipflop is set and the decoded skip or DSKP signal is at a high signal level, or is a 1 millisecond pulse occurring at the start of each output character when the DSOO and NC12 signals simultaneously assume high signal levels. The scan signal FSCN thus permits the scan address counter 420 to count at either of the two rates previously described in binary code decimal from 0 to 99 thereby providing BCD scan address counts or NCO1 - NCO8 signals. These address counts or NCO-1-NCO8 signals are applied to the scan decode circuit 124, to provide sequential scanning signals for scanning the data registers as will hereinafter be described.

In addition, when the FMD1 signal assumes a high signal level, the signal at the output terminal 441 of the scan mode logic circuit 418 of FIG. 18 is held at a low signal level, thus preventing the generation of pulses when the NCO9 and NC12 signals both assume a high signal level. The scan mode counter 463 is thus held in a reset condition whenever the FMD1 flip-flop is set and the data registers are being scanned sequentially bit by bit.

However, when the FMD1 signal is at a low signal level, the scan mode logic circuit 418 output signal is a high signal level which goes low for approximately 4.0 microseconds (as determined by the RC network of resistor 462 and capacitor 461) when both the NCO9 and NC12 signals assume a high signal level i.e., when the scan mode counter 463 output signal is a BCD9.

In summary, the scan control circuit 116 determines whether the data registers will be scanned bit by bit or as complete characters. If the registers are to be scanned bit by bit, the FMD1 and the FSCN flipflops are both set and the scan mode counter 463 is held in its reset condition and is not allowed to count. The scan address counter 420 counts from 0 to 99 in binary coded decimal at a 1 kilohertz rate providing up to 99 address signals.

However, when the FSCN flipflop is set and the FMD1 flipflop remains reset, the scan mode logic circuit 418 is enabled, the scan mode counter circuit 463 is clocked by the start of output timing or DSOO signal and the scan address counter 420 is clocked at the beginning of complete 8 bit characters. The scan control logic circuit 404 is returned to its initial condition, i.e., the FSCN and FMD1 flipflops are reset when the DN9X and DNX9 signals assume low signal levels, after 99 address signals have been generated.

11. SCAN DECODE CIRCUIT

In order to facilitate a greater understanding of the invention, the scan decode circuit 124 of FIG. 3 is shown in greater detail in FIG. 20(A).

With reference to FIG. 20(A),the NCO1–NC12 signals from the collective output terminal 116C of the scan control circuit 116 of FIG. 13 are applied to the scan decode circuit 124.The NCO1–NCO4 signals are applied respectively to the BCD1–BCD8 input terminals of a conventional BCD/deci-mal converter 465. The output signals $\overline{DNXO}$–$\overline{DNX9}$ from the converter 465 are applied to a collective output terminal 124E and the $\overline{DNX9}$ signal is also applied to an output terminal 124B.

The NCO5 signal from the collective terminal 116C is applied to one input terminal of a two-input terminal NAND gate 466, and through an inverter 467 to one input terminal of a two-input terminal NAND gate 468. The NCO6, NCO7 and NCO8 signals from the collective input terminal 116C are applied to the input terminals of a three input terminal NAND gate 469 and the NCO8 signal is also applied to the other input terminal of the NAND gate 466. The output signal from the NAND gate 469 is applied to the other input terminal of the NAND gate 468 and the output signals $\overline{DN9X}$ and DNOX from the NAND gates 466 and 468 respectively are applied to the respective output terminals 124A and 124 .

The NCO9–NC12 signals are applied to the respective BCD1–BCD8 input terminals of a BCD/decimal converter 470 and the output signals $\overline{DMOO}$–$\overline{DMO9}$ therefrom are applied to a collective output terminal 124C. The $\overline{FSCN}$ and FMD1 signals from the scan control circuit 116 of FIG. 13 are applied via input terminals 116F and 116E respectively to the input terminals of the two input terminal NAND gate 471, and the DGAT signal therefrom is applied, together with the $\overline{DMO8}$ signal from the BCD/decimal converter 470 to an output terminal 124D.

FIG. 20(B) shows an expanded addressing system for decoding addresses up to the number 99.

12. SCAN DECODE CIRCUIT OPERATION

In operation, the scan decode circuit 124 of FIG. 20(A) receives various scan control signals from the scan control circuit 116 of FIG. 13 and provides the decoded "scan address" or $\overline{DNXO}$–$\overline{DNX9}$ signals, the "scan complete" or DN9X signal, the "scan position" or DNOX signal, the decoded "scan mode" or $\overline{DMOO}$–$\overline{DMO9}$ signals, and the "output gating" or DGAT signal.

The decoded "scan address" signals $\overline{DNXO}$–$\overline{DNX9}$ are generated by converting the first four BCD scan address counts NCO1–NCO4 into decimal form through the converter of decoder 465. The $\overline{DN9X}$ signal assumes a low signal level whenever NCO5 and NCO8 address counts are both at a high signal level, signifying that the second decade of the scan address counter 420 of FIG. 13 has reached a count of 9. The DNOX signal, which signifies that the first 10 data registers (zero through nine) are being addressed, assumes a low signal level when the scan address counts NCO5–NCO8 of the second decade of the scan address counter 420 of FIG. 13 all assume a low signal level thus signifying that the scan address counter has not yet reached the count of 10.

The decoded "scan mode" signals $\overline{DMOO}$–$\overline{DMO9}$ are generated by applying the scan mode counts or NCO9–NC12 signals to the BCD/decimal coverter 470. Since, as previously described, the scan mode counter 428 of FIG. 13 counts only when the FMD1 signal from the FMD1 flipflop of FIG. 15 is in a low signal level (i.e., the FMD1 flipflop is reset), the $\overline{DMOO}$–$\overline{DMO9}$ signals are at a high signal level when the data registers are scanned as complete characters. However, when the data registers are scanned bit by bit, the scan mode counter circuit 428 of FIG. 13 is enabled and counts from 0 to 9 as the "start of output timing" or DSOO signal hereinafter described is applied thereto. The $\overline{DMOO}$–$\overline{DMO9}$ signals thus represent the beginning and end of each 8 bit group of data scanned.

When the FSCN and FMD1 signals both assume a low signal level, i.e., the FSCN flipflop is set and the FMD1 flipflop is reset, the "output bus gating" or DGAT signal assumes a high signal level and the data registers are scanned as complete characters rather than bit by bit as will subsequently be described.

FIG. 20(B) shows an additional expansion of the signals NCO5, NC08 to provide the signals $\overline{DNOX}$ – $\overline{DN9X}$ inclusive. This allows discrete address decoding from 0–99. In the embodiment disclosed, only the addresses 0–9 and 99 are utilized. If an address is missing, the system scans at a 1 KHz rate.

13. OUTPUT TIMING CIRCUIT

The output timing circuit 118 of FIG. 3, illustrated in greater detail in FIG. 21, provides the timing signals utilized to synchronize the scanning and transmission of data from the remote terminal unit to the central processing station.

With reference to FIG. 21 the CLOCK signal from the input timing circuit 104 of FIG. 5 is applied via input terminal 104A to the trigger input terminal of a "start and end of output character" flipflop FSOO and to the trigger input terminals of flipflop FSO1, FSO2 and FSO4, together with flipflop FSO3 and a three input terminal NAND gate 480, comprise an output bit time counter 482. The output bit time counter 482 is identical in operation to the input bit time counter 204 of FIG. 5 and therefore will not be described in detail. The CLOCK signal is also applied via input terminal 104A to flipflop FϕO1 which, together with the flipflops FϕO2 and FϕO3, functions as a control response counter 484 as will hereinafter be described.

The FSCN signal from the scan control circuit 116 of FIG. 13 is applied via input terminal 116B to one input terminal of two input terminal NAND gate 485 and the $\overline{DSKP}$ signal from the skip decode circuit 384 of FIG. 14 is applied via input terminal 114C to the other input terminal of the NAND gate 485. The output signal from the NAND gate 485 is applied to one input terminal of a two input terminal NOR gate 486 and the $\overline{F\phi O1}$ signal from the FϕO1 flipflop of the control response counter 484 is applied to the other input terminal of the NOR gate 486.

The output signal from the NOR gate 486 is applied to the set steering signal of the flipflop FSOO and FSOO signal therefrom is applied to the reset terminal of the FSO1–FSO4 flipflops of the output bit counter 482 and to the reset terminal of a flipflop FSO9. The flipflop FSO9, together with a conventional BCD counter 487, functions as to control response character counter 488. The $\overline{FSOO}$ signal is applied to one input terminal of a two input terminal NOR gate 489, and the output signal from the NOR gate 489 is applied to the strobe input terminal of the BCD counter 487 of the control response character counter 488.

The FSO4 signal from the FSO4 flipflop of the output bit time counter 482 is applied to one input terminal of a two input terminal NAND gate 492 and the $\overline{FSO4}$ signal from the FSO4 flipflop is applied to the set steering terminal of the FSO1 flipflop, to one input terminal of a two input terminal NAND gate 490, and through an inverter 491 to the C1 input terminal of the BCD counter 487. The output signal DSOO from the NAND gate 490 is applied to the reset steering terminal of the FSOO flipflop and is provided at output terminal 118A.

The FSO5–FSO8 signals from the BCD counter 487 are provided as output signals at a collective output terminal 118C and the FSO5 signal is also applied to the trigger input terminal of the flipflop FSO9. The FSO8 signal is also applied to the set steering terminal of the flipflop FSO9 and the reset steering terminal of the flipflop FSO9 is grounded. The FSO9 signal is also applied to the other input terminal of the NOR gate 489 and to the other input terminal of the NAND gate 492. The $\overline{FSO9}$ signal is provided at an output terminal 118E and is applied to the other input terminal of the NAND gate 490.

The output signal from the NAND gate 492 is applied through an inverter 493 to one input terminal of a two input terminal NAND gate 494 and to the trigger input terminals of the flipflops FϕO2 and FϕO3. The $\overline{DGO2}$ signal from the output terminal 120A of the output timing decode circuit 120 of FIG. 22, hereinafter to be described, is applied via the input terminal 120A to the other input terminal of the NAND gate 494 by way of an inverter 495. The signal $\overline{DFO1}$ from the NAND gate 494 is inverted in an inverter 496 and applied to the reset steering terminal of the flipflop Fϕ01.

The $\overline{DN99}$ signal from the scan control circuit 116 of FIG. 13, the $\overline{DWRU}$ signal from the single instruction decode circuit 330 of FIG. 8, and the $\overline{DA212}$ signal from the single instruction decode circuit 330 of FIG. 8 are applied to the cathode electrodes of respective diodes 497, 498 and 499 via input terminals 116D, 114F and 114A, respectively. The anode electrodes of the diodes 497, 498 and 499 are connected together so that the diodes function as a three input terminal OR gate. The signal from this OR gate, i.e. from the connection between the anode electrodes of the diodes

497, 498, and 499, is applied to one input terminal of a two input terminal NAND gate 500. The $\overline{DFMD}$ signal from the scan control circuit 116 of FIG. 13 is applied via input terminal 116A to the other input terminal of the NAND gate 500.

The output signal from the NAND gate 500 is applied to the set steering terminal of the flipflop FφO1 and the $\overline{F\phi O1}$ signal therefrom is applied to the other input terminal of the NOR gate 486, to an output terminal 118B, and to a collective output terminal 118D. The FφO1 signal is applied to the set steering terminal, the reset steering terminal and the reset terminal of the flipflop Fφ02, to the reset terminal of the flipflop FφO3 and to the collective output terminal 118D. The FφO2 signal is applied to both the set steering terminal and the reset steering terminal of the flipflop FφO3 and to a collective output terminal 118C. The Fφ03 signal from the FφO3 flipflop is applied to the collective output terminal 118C.

14. OUTPUT TIMING CIRCUIT OPERATION

With continued reference to FIG. 21, when the FSCN and $\overline{DSKP}$ signals both assume a high signal level or when the $\overline{F\phi 01}$ signal assumes a low signal level, the FSOO flipflop is set thus enabling the flipflop FSO1–FSO4 of the output bit time counter 482 and the flipflop FSO9 of the control response character counter 488. The output bit time counter 482 thus commences counting groups of 9 clock pulses and continues to count until the FSOO flipflop is reset.

Since the BCD counter 487 of the control response character 488 is clocked by the $\overline{FSO4}$ signal which occurs once for every 9 pulses of the CLOCK signal, the BCD counter 487 provides output bit times FSO5–FSO8 which are utilized to transmit data back to the central processing station. The ninth output bit time, i.e. eight data bits followed by comma, sets the FSO9 flipflop and, when the FSO9 signal assumes a high signal level, the FSOO flipflop is reset and the FφO2 and FφO3 flipflops are clocked.

When any of the $\overline{DN99}$, $\overline{DWRU}$, or $\overline{DA212}$ signals assumes a low signal level and the $\overline{DFMD}$ signal assumes a low signal level, the FφO1 flipflop is set enabling the FφO2 and FφO3 flipflops. The FφO1 flipflop is reset when the DGO2 signal assumes a low signal level and when both the FSO4 and FSO9 signals assume high signal levels.

Assuming that the FφO1 flipflop is set when the FφO2 and FφO3 flipflops are clocked, the FφO2 flipflop is set by the first clocking signal from the NAND gate 492. The second clocking signal resets the FφO2 flip-flop and sets the FφO3 flipflop.

In summary, the output bit time counter 482 provides a positive level one millisecond pulse (FSO4 signal) at the end of every group of 9 pulses of the CLOCK signal when the remote terminal unit is in the scan mode. The bits or pulses of the FSO4 signal are counted by the control response character time counter 488 and the signals FSO5 and FSO8 therefrom indicate the timing of the transmission of data to the central station as will hereinafter be described. The FSO9 signal provides an indication of one complete character time after nine bit times (8 data bits followed by comma) are generated. The FφO1, FφO2, and FφO3 signals from the control response counter 484 section of the output timing circuit 118 are decoded by the output timing decode circuit 120 described in connection with FIG. 22 to provide special ASCII characters e.g. bell, asterisk, and carriage return, as will hereinafter be described.

15. OUTPUT TIMING DECODE CIRCUIT

The output timing decode circuit 120 of FIG. 3 is illustrated in greater detail in FIG. 22 to facilitate a greater understanding of the invention.

Referring now to FIG. 22, the FSO5–FSO8 signals from the output timing circuit of FIG. 21 are applied via the collective input terminal 118C to a conventional BCD/decimal converter 502 as illustrated. The $\overline{F\phi O1}$ signal from the output timing circuit 118 of FIG. 21 is applied via input terminal 118B to the BCD 1 input terminal of a conventional BCD/decimal converter 504, and the FφO2 and FφO3 signals from the output timing circuit 118 are applied to the respective BCD 2 and BCD 4 input terminals of the BCD/decimal converter 504 via collective input terminal 188C.

The $\overline{DWRU}$ signal from the single instruction decode circuit 330 of FIG. 8 is applied via input terminal 114F to a two input terminal NOR gate 505, the output signal FWRU from which is applied to the BCD 8 input terminal of the BCD/decimal converter 504 and to one input terminal of a two input terminal NOR gate 506. The decimal 0–9 output signal $\overline{DSOO}$–$\overline{DSO9}$ and $\overline{DGOO}$–$\overline{DGO9}$ from the BCD/decimal converters 502 and 504, respectively, are applied to a collective output terminal 120D, and the DGO2 signal from the converter 504 is applied to the output terminal 120A.

The $\overline{DGO7}$ signal from the converter 504 is also applied to the other input terminal of the NOR gate 506, and the output signal $\overline{FWRU}$ from the NOR gate 506 is applied to both the other input terminal of the NOR gate 505 and to the collective output terminal 120B.

The $\overline{DN99}$ signal from the scan control circuit 116 of FIG. 13 is applied via input terminal 116D to one input terminal of a three input terminal NOR gate 507, and the output signal from the NOR gate 507 is applied to one input terminal of a two input terminal NOR gate 508. The $\overline{DGO1}$ signal is applied to the other input terminal of the NOR gate 508 and the output signal $\overline{FGRU}$ from the NOR gate 508 is applied to a second input signal of the NOR gate 507, the cathode electrode of a diode 509 and to the collective output terminal 120D. The $\overline{DGO3}$ signal is applied to the third input terminal of the NOR gate 507.

The $\overline{DGOO}$ signal is applied to one input terminal of a two input terminal NAND gate 510. The DVLD signal from the execute decode circuit 361 of FIG. 11 is applied via input terminal 114B to the other input terminal of the NAND gate 510 and the output signal from the NAND gate 510 is applied through an inverter 511 to the cathode electrode of a diode 512. The anode electrodes of the diodes 509 are connected together to form a two input terminal OR gate and the output signal $\overline{DGIO}$ from the connection between the anode electrodes of the diodes 509 and 512 is applied to the collective output terminal 120B.

16. OUTPUT TIMING DECODE CIRCUIT OPERATION

In operation, the FSO5–FSO8 signals applied to the BCD/decimal converter 502 are converted from binary coded decimal-to-decimal to provide the "decoded output bit time" or $\overline{DSOO}$–$\overline{DSO9}$ signals which control the transmission of data from the remote terminal unit to the central processing station as will hereinafter be described. The Fφ01–Fφ03 and the FWRU signals applied to the BCD/decimal converter 504 to provide the "decoded special character" or $\overline{\text{DG00}}$–$\overline{\text{DG09}}$ signals which generate specific single character instructions such as carriage return (CR), line feed (LF) bell, question mark, and the "who are you" identifiers which are transmitted to the central processing station in response to specific control response conditions.

The NOR gates 505 and 506 together function as a bistable circuit which provides for the transmission to the central station of an ASCH special character in response to a particular control condition. This bistable circuit is set when the DWRU signal assumes a low signal level and which is reset when the $\overline{\text{DG07}}$ signal assumes a low signal level. When, for example, the DWRU signal assumes a low signal level, the FWRU signal assumes a high signal level and the $\overline{\text{FWRU}}$ signal assumes a low signal level. Since the $\overline{\text{FWRU}}$ signal is applied to the other input terminal of the NOR gate 505, the FWRU signal remains at a high signal level irrespective of a change in the signal level of the DWRU signal. Likewise, when the $\overline{\text{DG07}}$ signal assumes a low signal level, the $\overline{\text{FWRU}}$ signal assumes a high signal level and the FWRU signal assumes a low signal level which prevents the $\overline{\text{FWRU}}$ signal from changing due to a change in the signal level of the DG07 signal.

The NOR gates 507 and 508 also function together as a bistable circuit to provide for the transmission to the central station of another special ASCII coded character. This bistable circuit is reset when the $\overline{\text{DG01}}$ signal assumes a low signal level and is set when either the $\overline{\text{DN99}}$ signal or the $\overline{\text{DG03}}$ signal assumes a low signal level. The $\overline{\text{DG10}}$ assumes a low signal level when the DVLD and $\overline{\text{DG00}}$ signals both assume low signal levels or when the $\overline{\text{FGRU}}$ signal assumes a low signal level.

17. OUTPUT BUSS CONTROL CIRCUIT AND OPERATION

The output buss control circuit 126 of FIG. 3 is illustrated in greater detail in FIG. 23 in order to facilitate an understanding of the invention.

With reference to FIG. 23, the $\overline{\text{D}\phi\text{00}}$–$\overline{\text{D}\phi\text{07}}$ signals from the data bank 50, hereinafter described in connection with FIGS. 26 and 27, are applied individually to one input terminal of the respective 2-input terminal NAND gates 514–521 by way of the collective input terminal 130A. The $\overline{\text{DM07}}$ – $\overline{\text{DM00}}$ signals are applied via the collective input terminal 124C to the other input terminals of the NAND gates 514 – 521, respectively. The output signals from the NAND gates 514 – 517 are applied to the four input terminals of a 4-input terminal NOR gate 522 and the output signals from the NAND gates 518 – 521 are applied to the four input terminals of a 4-input terminal NOR gate 523. The output signals from the NOR gates 522 and 523 are applied to the input terminals of a 2-input terminal NOR gate 524 and the output signal from the NOR gate 524 is applied through an inverter 525 to an output terminal 126A.

In operation, the $\overline{\text{D}\phi\text{10}}$ signal at the output terminal 126A of the output bus control circuit 126 assumes a low signal level when the output signal from any one of the NAND gates 514 – 521 assumes a high signal level. Thus, for example, when the $\overline{\text{D}\phi\text{00}}$ and the $\overline{\text{DM07}}$ signals both assume a low signal level, the output signal from the NAND gate 514 assumes a high signal level, the output signal from the NOR gate 522 assumes a low signal level, the output signal from the NOR gate 524 assumes a high signal level and, due to the inverter 525, the $\overline{\text{D}\phi\text{10}}$ signal assumes a low signal level. Any other combination of two low signal level signals applied to the NAND gates 514 – 521 operates similarly to provide a low signal level $\overline{\text{D}\phi\text{10}}$ signal.

18. OUTPUT BUSS LOGIC CIRCUIT

The output buss logic circuit 112 of FIG. 3 is illustrated in greater detail in FIG. 24 to facilitate an understanding of the present invention.

Referring now to FIG. 24, the output buss logic circuit 112 generally comprises a plurality of logic gates through which various signals are gated for transmission via an output driver circuit 530, hereinafter described in detail in connection with FIG. 24(A), to the central processing station.

The DGAT signal from the scan decode circuit 124 is applied by way of the input terminal 124D to one input terminal of a plurality of logic circuits 532–546 and to one input terminal 548 of the logic circuit 550. The logic circuits 532–546 may be identical and therefore only logic circuit 532 is shown in detail. The logic gate 550 will be described hereinafter in connection with FIG. 24(B).

The logic circuit 532 generally comprises an inverter 552, a two input terminal NAND gate 554 and a NOR gate 556 having up to eight input terminals. A first data bit $\overline{\text{D}\phi\text{00}}$ from the collective input terminal 130A is applied to the inverter 552 to one input terminal of the NAND gate 554 and the DGAT signal is applied to the other input terminal of the NAND gate 554. The output signal from the NAND gate 554 is applied to one input terminal of the NOR gate 556. This portion of the logic circuit 532 corresponds identically to a portion of the logic circuits 534–546, with the exception that the signals applied to the inverters of the logic circuits 534–546 are, respectively, the $\overline{\text{D}\phi\text{01}}$, $\overline{\text{D}\phi\text{02}}$, $\overline{\text{D}\phi\text{03}}$, $\overline{\text{D}\phi\text{04}}$, $\overline{\text{D}\phi\text{05}}$, $\overline{\text{D}\phi\text{06}}$ and $\overline{\text{D}\phi\text{07}}$ signals.

The remaining input signals to the NOR gate 556 are given in the Table VII which appears below. The signals applied to the input terminals of the corresponding NOR gates in the circuits 534–546 are also given in this table. Further, it should be noted that a jumper wire 558, the common terminal contact 560 of which is connected to one input terminal of the NOR gate 556 and the two terminals 562 and 564, having signals applied thereto, may be provided in the logic circuits 532–546. The signals applied to the contacts 562 and 564 are also given by the Table VII. Selection is made from terminal 560 for the special character to be transmitted.

TABLE VII

| Logic circuit | Contact 562 | Contact 564 | A | B | C | D | E | F |
|---|---|---|---|---|---|---|---|---|
| 532 | $\overline{\text{DGOO}}$ | $\overline{\text{DG10}}$ | $\overline{\text{D}\text{Ø}\text{10}}$ | $\overline{\text{DGO1}}$ | $\overline{\text{DGO4}}$ | $\overline{\text{DGO5}}$ | $\overline{\text{DGO6}}$ | $\overline{\text{DG10}}$ |
| 534 | | | $\overline{\text{DGOO}}$ | $\overline{\text{DGO2}}$ | $\overline{\text{DGO4}}$ | $\overline{\text{DGO5}}$ | $\overline{\text{DGO6}}$ | $\overline{\text{DG10}}$ |
| 536 | $\overline{\text{DGOO}}$ | $\overline{\text{DG10}}$ | $\overline{\text{DG10}}$ | $\overline{\text{DGO1}}$ | $\overline{\text{DGO4}}$ | $\overline{\text{DGO5}}$ | $\overline{\text{DGO6}}$ | $\overline{\text{DMD2}}$ |
| 538 | $\overline{\text{DGOO}}$ | $\overline{\text{DG10}}$ | $\overline{\text{DGO1}}$ | $\overline{\text{DGO2}}$ | $\overline{\text{DGO4}}$ | $\overline{\text{DGO5}}$ | $\overline{\text{DGO6}}$ | $\overline{\text{DMD2}}$ |
| 540 | | | $\overline{\text{DG10}}$ | $\overline{\text{DMD3}}$ | FWRU | | | |
| 542 | $\overline{\text{DGOO}}$ | $\overline{\text{DG10}}$ | | | | | | |
| 544 | | | $\overline{\text{FGRU}}$ | | | | | |
| 546 | | | DGAT | | | | | |

It should be understood that the signals DMD2, DMD3, and DMD4 from the logic circuit 550 are provided at the input terminals of the NOR GATES specified in the Table V. However, for the purpose of clarity, the actual connection has not been shown in FIG. 25. This logic circuit 550 is hereinafter described in greater detail in connection with FIG. 25(B).

Additionally, as previously mentioned, the NOR gates 556 of the logic circuits 532–546 may have up to eight input terminals. However, the number of input terminals actually utilized may be less than eight. It should be apparent, for example, that the NOR gate 556 of the logic circuit 546 need only be a two input terminal NOR gate.

The output signals from the logic circuits 532–546 are applied to one input terminal of a plurality of two input terminal NAND gates 566–573, respectively. The $\overline{DS02}$–$\overline{DS09}$ signals are applied via the input terminal 120D to the second input terminals of the NAND gates 566–573, respectively. The output signals from the NAND gates 566–569 are each applied to one input terminal of a four input terminal NOR GATE 574 and the output signals from the NAND gates 570–573 are each applied to one input terminal of a four input terminal NOR gate 575. The output signals from the NOR gates 574 and 575 are applied, respectively, to a first and second input terminal of a three input terminal NOR gate 576 and the $\overline{DS01}$ signal is applied to the third input terminal of the NOR gate 576 by way of the input terminal 120B.

The output signal from the NOR gate 576 is applied to one input terminal of a two input terminal NOR gate 577, and the output signal from the NOR gate 577 is applied to an input terminal 531 of the output driver circuit 530 described in detail in connection with FIG. 24(A) and the output signal from the output driver circuit 530 is applied to an output terminal 112A of the ouput buss logic circuit 112.

The TTYI signal from the teletype unit 110 is applied via input terminal 110B to one input terminal of a two input terminal NAND gate 578, and the output signal from the NAND gate 578 is applied through an inverter 579 to the second input terminal of the NOR gate 577. The FEXT signal from the output terminal 108A of the test circuit 108 (hereinafter described in detail in connection with FIG. 25) is applied to the second input terminal of the NAND gate 578.

The output driver circuit 530 of FIG. 24 is illustrated in detail in FIG. 24(A). With reference now to FIG. 24(A), the output signal from the NOR gate 577 of FIG. 24 is applied via the input terminal 531 through a resistor 580 to the base electrode of an NPN transistor 581. The base electrode of the transistor 581 is grounded through a resistor 582, the emitter electrode is grounded, and the collector electrode is connected through a resistor 583 to a suitable source of a positive 24 volt d.c. potential.

The collector electrode of the transistor 581 is connected to the cathode electrode of a zener diode 584 and the anode electrode thereof is connected directly to the base electrode of an NPN transitor 585 and to the base electrode by a PNP transistor 586. The base electrodes of the transistors 585 and 586 are connected to a negative source of 6 volt potential through a resistor 587 and the collector electrodes of the transistors 585 and 586 are connected, respectively, to a 5 volt d.c. power source through a resistor 588 and to ground potential through a resistor 589. The emitter electrodes of the transistors 585 and 586 are connected directly together and are connected to the output terminal 112A.

The following are typical values of components which may be utilized in the above described driver circuit 530:

TABLE VIII

| Component | Value |
|---|---|
| Resistor 580 | 1K ohm |
| Resistor 582 | 1K ohm |
| Resistor 583 | 3.9K ohms |
| Resistor 587 | 4.7K ohms |
| Resistor 588 | 220 ohms |
| Resistor 589 | 220 ohms |
| Zener diode 584 | 5.6 volts |
| Transistor 581 | 2N3565 |
| Transistor 585 | 2N3565 |
| Transistor 586 | 2N2905A |

The logic circuit 550 of FIG. 24 is illustrated in greater detail in FIG. 24(B) to facilitate an understanding of the invention.

Referring to FIG. 24(B), the F$\phi$01 signal from the collective output terminal 118D of the output timing circuit 118 of FIG. 21 is applied to one input terminal of a two input terminal NAND gate 590 and the output signal from the NAND gate 590 is applied to one input terminal of a two input terminal NAND gate 591. The DMD4 signal from the NAND gate 591 is applied to the collective terminal 551.

The $\overline{FWRU}$ signal from the collective output terminal 120B of the ouput timing decode circuit 120 of FIG. 22 is applied to the second input terminal of the NAND gate 590. The DGAT and $\overline{DM08}$ signals from the collective output terminal 124D of the scan decode circut 124 of FIG. 20 are applied, respectively, through an inverter 592 to one input terminal of a two input terminal NAND gate 593 and to the second input terminal of the NAND gate 593. The output signal from the inverter 592 is also applied to the second input terminal of the NAND gate 591 and to the cathode electrode of a semiconductor diode 594, which, together with diodes 595 and 596 function as a three input terminal OR gate.

The output signal DMD3 from the NAND gate 593 is applied to the collective output terminal 551 and to the cathode electrode of the diode 596. The $\overline{F\phi01}$ signal from the output terminal 118B of the output timing circuit 118 is applied to the cathode electrode of the diode 595. The anode electrode of the diodes 594–596 are connected together and the signal therefrom is applied to an inverter 597. The DMD2 signal from the inverter 597 is applied to the collective output terminal 551 of the logic circuit 550.

19. OUTPUT BUSS LOGIC CIRCUIT OPERATION

The output buss logic circuit is the logic circuit through which all data transmitted to the central processing station is gated.

The data signals $\overline{D\phi00}$–$\overline{D\phi07}$ from the various data registers hereinafter described are gated through the NAND gate 554 of the logic circuits 532–546 when the gating or DGAT signal assumes a high signal level.

These gated data signals are then applied through the NOR gates 556 of the logic circuits 532–546 to one input terminal of the NAND gates 566–573. The output bit time or DS02–DS09 signals sequentially assume low signal levels and sequentially gate the data signals through the NOR gates 574–577 to the output driver circuit 530.

Alternatively, should any of the other signals of Table VII, applied to the input terminals of the NOR gate 556 of the logic circuits 532–546 assume a low signal level, the output signals from the logic circuits 532–546 will be gated through the NAND gates 566–573 as unique ASCH characters, such as the bell character, the carriage return (CR) character, the question mark (?), and any others which may be desired.

When the remote terminal unit is in teletype mode, an operator may transmit data to the central station directly from the teletype unit 110 via the output buss logic circuit 112.

The teletype output or TTYI signal from the output terminal 110B of the teletype unit 110 is transmitted to the central processing station via the NAND gate 578, the inverter 579 and the NOR Gate 577 when the NAND gate 578 is enabled by the FEXT signal assuming a high signal level.

20. MODEM DRIVER CIRCUIT

The modem driver circuit 108 of FIG. 3 is illustrated in greater detail in FIG. 25 to facilitate an understanding of the present invention.

The DR01 signal from the output terminal 104D of the input timing circuit 104 of FIG. 5 is applied to one input terminal of the collective two input terminal NAND gate 600 and the $\overline{DDTT}$ signal from the output terminal 114H of the decode logic circuit 114 of FIG. 3 (from the output terminal 320 of the control word decode circuit 312 as shown in FIG. 8) is applied through an inverter 601 to the other input terminal of the NAND gate 600. The output signal from the NAND gate 600 is applied to one input terminal of a two input terminal NOR gate 602 and the output signal from the NOR gate 602 is applied to the set steering terminal of a flipflop FEXT. The TTY signal from the output terminal 110A of the teletype unit 110 is applied to the other input terminal of the NOR gate 602, which in turn is connected to a source of positive 5 volt d.c. potential through a current limiting resistor 604 and is grounded through a capacitor 605. The CLOCK signal from the output terminal 104A of the input timing circit 104 is applied to the trigger input terminal of the FEXT flipflop and the $\overline{TC}$ signal from the decode signal circuit 114 is applied via collective input terminal 114H to the reset input terminal of the FEXT flipflop. The RSTB signal from the output terminal 244 of the reset circuit 228 of FIG. 5(A) or other suitable reset signal may be applied to the reset steering terminal of the FEXT flipflop through an inverter 614 to insure proper initial conditions.

The FEXT signal from the FEXT flipflop is applied to one input terminal of a two input terminal NOR gate 603 and to an output terminal 108A. The DAIN signal from the level converter 102 is aplied via input teminal 102A through an inverter 606 to the other input terminal of the NOR gate 603 and the output signal from the NOR gate 603 is applied to a relay driver circuit 615 and through a resistor 607 to the base electrode of a NPN transistor 608.

The base electrode of the transistor 608 is grounded through a resistor 609, the eollector electrode is connected to a source of positive 24 volt d.c. potential through a relay coil K1 and the emitter electrode of the transistor 608 is connected to the 24 volt d.c. return or common. A diode 610 is connected across the relay coil K1 and is poled to provide a path for the current generated by the collapsing field of the relay coil when the transistor 608 is cut off.

A set of normally open contacts 611 operated by the relay coil K1 are connected between two output terminals 612 and 613, and provide a current path between the output terminals when the relay coil K1 is energized. The output terminals 612 and 613 are connected to a collective output terminal 108B to provide the TTDA signal utilized by the teletype unit 110 to transmit data.

Typical values of the components utilized in the relay driver circuit 615 are as follows:

| Component | Value |
|---|---|
| Resistor 607 | 1 K ohm |
| Resistor 609 | 1 K ohm |
| Transistor 608 | 2N3565 |
| Diode 609 | 1N914 |
| Relay K 1 | Clare MRMD 1043 |

In operation, if the control word in the input registers is decoded as a teletyped test control signal, the $\overline{DDTT}$ signal assumes a low signal level and the FEXT flipflop is set. Alternately, if the remote terminal unit is placed in TTY mode by an operator at the remote site, the TTY signal from the teletype unit 110 assumes a low signal level and sets the flipflop FEXT. When the FEXT flipflop is set, the FEXT signal assumes a high signal level and the output signal from the NOR gate 603 assumes a low signal level permitting the DAIN signal to control the energization of the relay coil K1 in accordance with the DAIN signal level.

Thus, when the remote terminal unit is placed in the TTY mode either by an appropriate command from the central processing station or by the TTY signal generated at the remote terminal unit, the DAIN signal is applied through the modem driver circuit 108 to the teletype unit 110 which then transmits the DAIN signal or other teletype operator initated data to the central processing station via the output buss logic circuit 112 as previously described in connection with FIG. 24. In addition, when the FEXT signal assumes a high signal level, the decoding of control words by the control word decode circuit 312 of FIG. 8 is inhibited since the DR02 signal from the input timing circuit 104 of FIG. 5 cannot assume a high signal level. Thus, in TTY mode, data may only be transmitted to the central station via the teletype unit 110.

21. DATA REGISTERS AND OPERATION

The registers utilized to accumulate and store data and to store and execute various control functions at the remote sight are illustrated in greater detail in FIGS. 26–27.

A typical control register which stores the various control signals and executes these signals upon receipt of the proper commands is illustrated in FIG. 26. Referring to FIG. 26, the control data or CODA signal, the control shift or COSH signal, the decoded clear or $\overline{DDCL}$ signal, the execute or $\overline{EXQ}$ command signal and the decoded relay mode or $\overline{DDKK}$ signal from the output terminal 114G of the decode logic circuit 114 of FIG. 3 are provided at a collective input terminal 114G of the control register 130. The CODA signal is applied through inverter 620 to both the set steering terminal and the reset steering terminal of a conventional eight-bit serial shift register 622 and the COSH signal from the collective input terminal 114G is applied through an inverter 624 to the trigger input terminal of the serial shift register 622. The $\overline{DDCL}$ signal from the collective input terminal 114G is applied to the reset or clear input terminal of the shift register 622.

The $\overline{DDKK}$ signal from the collective input terminal 114G is applied to a like numbered input terminal of a buss enable circuit 371 hereinafter described in greater detail in connecton with FIG.26(B). The $\overline{DNOX}$ and an associated one of the $\overline{DNX0}$–$\overline{DNX9}$ from the scan decode circuit 124 signal are applied via collective input terminal 124E to a second input terminal 124E of the buss enable circuit 371. The $\overline{DAB}$, $\overline{COB}$ and $\overline{KKB}$ signals from the buss enable circuit 371 are applid to a collective output terminal 130C, and the KKB and COB signals from the buss enable circuit 371 are utilized internally of the control register 130 as is subsequently described.

The output signals FC0–FC7 from the serial shift register 622 and the $\overline{EXQ}$ signal from terminal 114G are applied to a control relay logic circuit 626 hereinafter described in connected with FIG. 26(A). The relay position or DC0–DC7 signal from a collective output terminal 628 of the control relay logic circuit 626 are applied, respectively, to one input terminal of the two-input terminal NAND gates 630–637 and the KKB signal from the buss enable circuit 371 is applied via output terminal 378 to the other input terminal of each of the NAND gates 630–637. The output signals DK0–DK7, i.e., the output signals utilized to control the operation of valves and other control devices at the remote sight, are provided at an ouptut terminal 130B to be utilized as previously described in connection with FIGS. 1 and 2.

The data or $\overline{D\phi00}$–$\overline{D\phi07}$ signal from the NAND gate 630–637 are provided at a collective output terminal 130A. In addition the FC0–FC7 signals from the shift register 622 are applied respectively to one input terminal of the NAND gates 640–647 and the COB signal from the outout terminal 380 of the buss enable circuit 371 is applied to the other input terminal of each of the NAND gates 640–647. The output signals $\overline{D\phi00}$–$\overline{D\phi07}$ from the NAND gates 640–647 are also provided at the collective output terminal 130A.

Referring now to FIG.26(A) wherein the control relay logic 626 of FIG. 27 is illustrated in greater detail, the $\overline{EXQ}$ signal applied to the control relay logic circuit 626 via the collective input terminal 114G is applied through a resistor 650 to the base electrode of a NPN transistor 651 and through a resistor 652 to a source of positive 5 volt potential. The base electrode of the transistor 651 is grounded through a resistor 653 and the emitter electrode of the transistor 651 is connected directly to ground. The collector electrode of transitor 651 is connected through a resistor 654 to a source of positive 24 volt potential and is connected directly to the base electrode of a second NPN transistor 655.

The collector electrode of the transistor 655 is connected directly to the positive 24 volt soursce of potential and the emitter electrode is grounded through a resistor 656 and is connected directly to the base electrode of a third NPN transistor 657. The collector electrode of the transistor 657 is connected directly to the positive 24 volt potential and the emitter electrode of the transistor 657 is grounded through a resistor 658.

An output signal EXQA, taken directly from the emitter electrode of the transistor 657 is applied to the center tap 660 of a plurality of center tapped relay coils 661 (only one shown) which are provided as part of a plurality of identical relay driver circuits K1–K8. The FC0–FC7 signals from the shift register 622 of FIG. 26 are applied, respectively, to the relay driver circuits K1–K8 to control, together with the EXQA signal from the emitter electrode of the transistor 657, the energization of the relay coils 661 of the driver circuits K1–K8.

Since, as previously stated, the driver circuits K1–K8 may be identical, only the driver circuit K8 is illustrated and will be described in detail. With continued reference to FIG. 26(A), the FC7 signal applied to the driver circuit K8 is applied through a resistor 662 to the base electrode of an NPN transistor 663, through a resistor 664 to a positive 5-volt potential, and to an inverter 665. The base electrode of the transistor 663 is grounded through a resistor 666, and the emitter electrode of the transistor 663 is connected directly to ground. The collector electrode of the transistor 663 is connected to one side of the center tapped relay coil 661 and is connected to the anode electrode of a diode 667, the cathode electrode of which is connected to the center tap of the coil 661.

The output signal from the inverter 665 (the $\overline{FC7}$ signal) is applied through a resistor 668 to the base electrode of an NPN transistor 669 and through a resistor 670 to a positive 5-volt potential. The base electrode of the transistor 669 is grounded through a resistor 671 and the emitter electrode of the transistor 669 is connected directly to ground. The collector electrode of the transistor 669 is connected to the other side of the center tapped relay coil 661 and to the anode electrode of a diode 672, the cathode electrode of which is connected to the center tap 660 of the relay coil 661.

The buss enable circuit 371 of FIG. 26(B) provides the signal $\overline{DAB}$, $\overline{COB}$, COB, KKB and $\overline{KKB}$ which control the scanning of the control register and control the operation of the skip decode circuit 384 of FIG. 14.

With reference to buss enable circuit 371 illustrated in FIG. 26(B), a data buss signal $\overline{DAB}$, a control buss signal $\overline{COB}$, a control or data buss signal COB, and a KK buss signal $\overline{KKB}$ are generated by decoding the $\overline{DDKK}$ signal from the control word decode circuit 312 of FIG. 8 and the $\overline{DNOX}$ and $\overline{DNX0}$–$\overline{DNX9}$ signals from the scan decode circuit 124 of FIG. 20. the $\overline{DDKK}$ signal from the collective output terminal 114I of the control word decode circuit 312 of FIG. 8 is applied directly to an input terminal of a three-input terminal NAND gate 372 and is also applied through an inverter 373 to a second three-input terminal NAND gate 374. The $\overline{DNOX}$ signal is applied via input terminal 124E to a second input terminal of the NAND gate 372 and to a second input terminal of the NAND gate 374. The single correct signal which is associated with the collective control register from the group of $\overline{DNX0}$–$\overline{DNX9}$ signals is applied via collective input terminal 124E to the third input terminals of the NAND gates 372 and 374.

The output signal from the NAND gate 273 is applied to an output terminal 380 of the COB signal, through an inverter 377 to a collective output terminal 130C as the $\overline{COB}$ signal and through an inverter 379 to the output terminal 130C as the $\overline{DAB}$ signal. The output signal KKB from the NAND gate 374 is applied to an output terminal 378 and is also inverted by an inverter 382 and applied to the output terminal 130C as the $\overline{KKB}$ signal.

In operation, the control data or CODA signal applied to the shift register 622 is shifted into the register 622 by the control shift or COSH signal. After the CODA signal has been loaded into the shift register 622, the operator at the central processing station may check the register to ensure that it has been properly loaded by transmitting appropriate instructions which are decoded by the buss enable circuit 371 of FIG. 26(B) to provide a high signal level COB signal. When the COB signal assumes a high signal level, the data stored in the shift register 622, (the FC0–FC7 signals) are gated through the NAND gate 640–647 as the $\overline{D\phi00}$–$\overline{D\phi07}$ signals which are in turn applied to the output buss logic circuit for transmission back to the central station.

If the information in the shift register 622 is other than that desired by the operator at the central station, a clear instruction may be transmitted to the remote unit causing the DDCL signal to assume a low signal level and clear the shift register 622. Assuming, however, that the information in the shift register 622 is correct, an execute instruction may be transmitted to the remote terminal unit causing the $\overline{EXQ}$ signal to assume a low level which in turn cuts off the transistor 651 of FIG. 26(A), causing the 24-volt potential to be applied to the center tap 660 of each of the relay coils 661 of the relay driver circuits K1–K8 of FIG. 26(A). Thus, each of the relay driver circuits K1–K8 is enabled and these data signals FC0–FC7 applied thereto which are at a high signal level cause one side of the relay coil 661 to be energized closing the relay contacts K1–K8 associated therewith.

Each of the relay coils 661 of the driver circuits K1–K8 has been associated therewith two sts of relay contacts. One set of contacts provides positive 5 volt signals DCO–DC7 at a collective output terminal 628 when the relay coils are energized and the other set of contacts provide 24-volt output signals DK0–DK7 at a collective output terminal 130B. The signals DK0–DK7 are utilized to control various mehanical functions at the well site. The signals DC0–DC7 are utilized to provide an indication to the operator at the central station as to the positions of the relays after a control signal has been executed.

The DC0–DC7 signals are applied to the NAND gates 630–637 and by transmitting a KK instruction to the remote terminal unit to cause the KKB signal from the buss enable circuit 371 to assume a high level, the DC0–DC7 signals are applied to the previously described output buss logic circuit as the $\overline{D\phi00}$–$\overline{D\phi07}$ signal which are transmitted back to the central station.

Briefly summarizing, the operator at the central station may load data into the serial shift register 622 and read the contents of the shift register 622 prior to the execution thereof. After executing the signals in the shift register 622, the operator may read the positions of the various control relays to insure that the relays have assumed the desired positions. In addition, as will hereinaftr be described in connection with FIG. 27, the operator may also check the status of the various valves or other mechanical components controlled by the control relays as a further check that the desired control functions have been executed.

A typical status/alarm register 128 of the data accumulator bank 50 of the remote terminal unit 30 of FIG. 3 is illustrated in greater detail in FIG. 27.

Referring now to FIG. 27, up to eight input signals representative of, for example, the status or position of valves and switches of the well test unit 32 or alarm functions, such as would occur from high/low level switches, flow indicators, and pressure indicators, are applied to a corresponding number of relay coils K1–K8 indicated schematically at 680. The contacts K1–K8 associated with each of the relay coils K1–K8 are normally open and are connected between ground and the set input terminal of a plurality of bistable latch circuits or flipflops 681–688, respectively. The flipflop 681–688 may, for example, each comprise two NOR gates 689 and 670 connected as previously described in connection with FIG. 23.

Each of the set input terminals of the flipflop 681–688 is also connected through resistors 691–698 to a source of a positive 5-volt potential.

The $\overline{DDRE}$ signal from the output terminal 114E of the decode logic circuit 114 of FIG. 8 is applied to the reset input terminal of each of the flipflops 681–688 and the common connection between the reset input terminals of these flipflops is connected through a resistor 699 to the positive 5-volt potential. The binary ONE or set output signals from the flipflops 681–688 are applied, respectively, to two input terminal NAND gates 700–707. The binary ZERO or reset output signal from the flipflops 681–688 are each applied to one input terminal of an eight input terminal NOR gate 708. The output signal from the NOR gate 708 is applied through the contacts of a switch 709 to an output terminal 711.

The $\overline{DNOX}$ signal from the scan decode circuit 124 of FIG. 20 may be applied to one input terminal of a two input terminal NAND gate 710 via input terminal 124E. A selected one of the $\overline{DNXO}$–$\overline{DNX9}$ signals from the output terminal 124E of the scan decode circuit 124, e.g. $\overline{DNXO}$ are applied to the other input terminals of the NAND gate 710 The output signal from the NAND gate 710 is applied to the second input terminal of each of the NAND gates 700–707 and the output signals $\overline{D\phi00}$–$\overline{D\phi07}$ from the NAND gate 700–707 repectively are provided at a collective output terminal 130A of the data bank 50.

In operation, the status/alarm register 18 may be utilized to indicate the status or position of various valves and other similar mechanical elements in the well test unit 32 by leaving the switch 709 in its open position. By closing the switch 709, the register becomes an alarm register.

In either case, the signals from the well test unit 32 representative of either status or alarm functions are applied via input terminal 32B to associated relay coils K1—K8. If any of the applied signals assumes, for example a high signal level, the associated relay coil is energized, closing the contact associated therewith. The closing of any of the contacts, for example the contact K8, connects the set input terminal of the associated flipflop 688 to ground, thereby setting the flipflop. Thus the binary ONE output signal from that flipflop, i.e. $\overline{D\phi07}$, assumes a high signal level and the binary ZERO output signal therefrom assumes a low signal level. The flipflops 681–688 remain in their last assumed states and when the register is scanned by the application of the selected address signals to the NAND gate 710, the sate of each of the flipflops 681–688 is gated through the respective NAND gates 700–707 to the output buss logic circuit 112 via the output terminal 130A.

If the switch 709 is closed and any one of the flipflops 681–688 is set by an alarm function from the well test unit 32, the output signal from the NOR gate 708 assumes a high signal level and an alarm signal is transmitted to the central processing station. If an alarm signal is received at the central processing station, the alarm registers may be scanned to determine the cause of the alarm by scanning the flipflops 681–688 as previously described.

In addition, if it is desired to double check the status or alarm function, a reset instruction, decoded as a $\overline{DDRE}$ signal, may be transmitted to the remote terminal unit 30 to reset the flipflops 681–688. The status/alarm registers may then be scanned once again to ensure that the first indication was not erroneous.

The data accumulators or accumulator registers 122 of the data bank 50 may be any suitable conventional serial digital registers as was previously described in connection with FIGS. 1 and 2. In addition, the accumulator registers 122 may be provided with conventional counting circuits responsive to the CLOCK signal of the remote terminal unit 30 to provide an elapsed time indication between the readings of the accumulators to thereby provide rate information.

The scanning of the accumulator registers 122 of the data bank 50 may be accomplished by the decoding of scan address signals as previously described in connection with the status/alarm registers 128. In addition, when a particular accumulator register is addressed, a "hold" signal may be generated to prevent the further accumulation of data until the register has been read and double checked. To prevent loss of data during the "hold" period, a second temporary storage register may be provided to accumulate data during the "hold" period and to dump this data into the main accumulator register after scanning is complete. Since the accumulation of data and the counting of elapsed time may be accomplished by any suitable conventional digital circuits, the accumulator registers 122 will not be described in detail.

V. SUMMARY

The system of the present invention may be summarized with reference to FIGS. 1, 2 and 3.

With reference to FIG. 1, a teletype operator or properly programmed computer at the master station 12 may initiate a call to a desired satellite station 28 utilizing a telephone number preassigned to the particular satellite station. The central processing or master station 12 is then connected through commercially available telephone lines 24 to the satellite station 28 and transmission of date to and from the satellite station 28 may commence.

The master station 12 may, through either the teletype unit 40 or the computer program, transmit predetermined sequences of the single character and two character instructions of Tables I and II and the instructions are decoded and executed by the remote terminal unit 30 at the satellite station 28.

The remote terminal unit 30 of FIG. 3 may, for example, be instructed to scan any of the registers in the data bank 50 in a manner determined by the particular instructions received, or may be instructed to carry out a particular control function. Test procedures may be initiated by particular instructions and the sequence of the instructions may be utilized to double check data as to the conditions at the well site 36. In this manner, data may be gathered from a large number of widely scattered sites on a continuing basis and with very little consumption of manpower.

For example, as illustrated in FIG. 2, the production fluid from a particular well may be monitored to provide information as to pressure, temperature, gas volume, net oil, and gross liquid. This information is accumulated and stored by the registers of the data bank 50 until it is desired to scan the data bank 50.

With continued reference to FIGS. 1–3, the teletype operator at the central processing station 12, or the computer through its software program, may initiate a call utilizing a satellite station identifying code. The identifying code readies the computer to accept and store data in a particular memory section previously set aside for the particular satellite station being called, and, in addition, connects the central processing station 12 with the desired satellite station 28 via the telephone communication system.

Assuming automatic control through the software program of the computer 10, the computer next transmits the characters MA to switch the remote terminal unit from standby to main power. The E control character may then be transmitted to check the identity of the satellite station 28 connected to the central station 12. The E control character is decoded by the remote terminal unit 30 thereby instructing the remote terminal unit to transmit a three-character identifying code associated with that particular station.

After identifying the satellite station on the line, the contents of all of the registers of the data bank 50 may be read. By transmitting the characters DA, followed by a slash (/) and line feed (LF), the central station places the remote terminal unit in the data mode (in response to the DA instructions) and the remote terminal unit echoes back, in a bit-by-bit manner (in response to the / LF), the contents of all of the registers in the data bank 50.

If the DA instructions is immediately followed by a line feed (LF), the remote terminal unit is likewise placed in the data mode and the contents of the data bank 50 are transmitted to the central processing station. However, the DA LF instruction causes the remote terminal unit to transmit the contents of the register as complete characters as opposed to individual bits. In either case, the DA instruction followed by either a /LF or just LF provides the operator with an indication of the contents of all registers, including the status register, the alarm registers, the accumulator registers, and the control registers.

After having read the contents of all registers, the computer may then be programmed to open or close particular valves or to execute other control functions. The remote terminal unit is first placed in the control mode by the CO instruction followed by a line feed (LF). Thereafter, the operator may transmit groups of eight bit instructions, each group being separated by a comma, which are fed into the control registers sequentially until the control registers of interest have been loaded. The transmission of a slash (/) and line feed (LF) signals signifies that the desired control registers have been loaded, causes the remote terminal unit to echo back the contents of the control registers for checking purposes, and also perpares the remote terminal unit for the receipt of an execute command. When the execute command is transmitted to the remote terminal unit 30 as an EX instruction, the control signal stored by the control registers are executed and the desired control functions occur.

It may be desirable to check the status of the control relays to ascertain whether or not the control instructions were carried out properly. This is accomplished by transmitting a KK instruction to the remote terminal unit 30 followed by a /LF. The remote terminal unit 30 then transmits signals representative of the positions of the control relays of the control registers 130 back to the central processing station for checking purposes. An additional check may be made, of course, by reading the contents of the status registers through the use of the DA/LF instructions.

It is apparent that the system of the present invention is very versatile and may be easily expanded to include additional data terminal units at other remote sites as well as to include additional data accumulation at a particular site. The system is adaptable to commercially available processing and communication equipment and therefore, in addition to being readily serviceable, it is particularly reliable due to the relative ease with which a breakdown in the system may be bypassed or repaired.

The present invention may thus be embodied in other specific forms without departing from the spirit or essential characteristics thereof. The presently disclosed embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. Apparatus for the remote testing of a plurality of producing oil wells comprising:

a master station including a printing unit and digital data processing means for selectively generating instruction signals;

a satellite station remote from said master station and including digital data storage means, switch means, a plurality of sensors responsive to the temperature, the pressure and the constituency of production fluid each remote from said storage means for monitoring production fluid at each of said plurality of oil wells and for each generating a digital signal related to a condition thereof, and circuit means for applying said digital signals to said storage means; and a data transmission system connected between said master station and said satellite station including commercial, voice quality telephone lines and a plurality of commercial telephone switching exchanges for selectively connecting said data processing means at said master station to said data storage means at said satellite station for the selective transmission of data from said data storage means at said satellite station to said data processing means at said master station and for the selective transmission of said instruction signals from said data processing means at said master station to said switch means at said satellite station.

2. The apparatus of claim 1 wherein said master station includes means for selectively generating commercial telephone dialing signals, and wherein said satellite station includes means for electrically connecting said satellite station to said master station in response to said commercial telephone dialing signals.

3. The apparatus of claim 2 wherein the generation of said dialing signals is automatically and periodically instituted by said data processing means.

4. The apparatus of claim 1 wherein said satellite station digital data storage means includes a plurality of digital accumulators, at least one of said accumulators being responsive to the condition of said switch means.

5. The apparatus of claim 1 wherein said digital data processing means includes: a computer, means for storing the data transmitted from said satellite station, means for displaying said stored data, and circuit means interfacing said computer to said printing unit.

6. The apparatus of claim 5 wherein said instruction signals each comprise at least one character, said character being defined by at least five serially arranged bits of binary information.

7. The apparatus of claim 6 wherein said data storage means includes:

first means for storing at least five bits of binary information:

clock means for clocking said character into said first storage means;

decode means responsive to said first storage means when enlabed; and means responsive to said clock means for enabling said decode means.

8. The apparatus of claim 7 wherein said digital storage means includes means for storing the data clocked into said first storage means upon the enabling thereof.

9. The apparatus of claim 7 including second storage means for storing at least five bits of binary information;

wherein said clock means includes means for clocking said second character into said second storage means; and wherein said decode means is responsive to said first and second storage means.

10. Apparatus for the remote testing of a plurality of producing oil wells comprising:

a master station including a printing unit and digital data processing means for selectively generating intruction signals;

a satellite station remote from said master station and including digital data storage means, switch means, a plurality of condition responsive sensors each remote from said storage means for monitoring production fluid at each of said plurality of oil wells and for each generating a digital signal related to a condition thereof, and circuit means for applying said digital signals to said storage means;

said satellite station further including:

a gas/liquid separator having both gas and liquid outlet means;

means responsive to said switch means for supplying the production fluid from a selected one of said oil wells to said separator; and a net oil analyzer for generating a digital signal related to the constituency of the fluid in said liquid outlet means; and a data transmission system connected between said master station and said satellite including commercial, voice quality telephone lines and a plurality of commercial telephone switching exchanges for selectively connecting said data processing means at said master station to said data storage means at said satellite station for the selective transmission of data from said data storage means at said satellite station to said data processing means at said master station and for the selective transmission of said instruction signals from said data processing means at said master station to said switch means at said satellite station.

11. The apparatus of claim 10 wherein said satellite station digital data storage means includes a plurality of digital accumulators, at least one of said accumulators being responsive to the condition of said switch means.

12. The data terminal unit of claim 11 inlcuding means for inhibiting the accumulation of data in said accumulators during the period of time in which one of said gates is enabled.

13. Apparatus for the remote testing of a plurality of producing oil wells comprising:

a master station including a printing unit and digital data processing means which comprises means for storing instructions to be transmitted to a satellite station and for selectively generating instruction signals;

a satellite station remote from said master station and including digital data storage means comprising means for storing a received instruction from the master station, switch means, a plurality of condition responsive sensors each remote from said storage means for monitoring production fluid at each of said plurality of oil wells and for each generating a digital signal related to a condition thereof, and circuit means for applying said digital signal to said storage means; and at least one sensor responsive to said instruction storing means whereby stored instructions may be transmitted to said master station for comparison with the instructions there stored prior to the execution thereof by another instruction signal; and a data transmission system connected between said master station and said satellite station including commercial, voice quality telephone lines and a plurality of commercial telephone switching exchanges for selectively connecting said data processing means at said master station to said data storage means at said satellite station for the selective transmission of data from said data storage means at said satellite station to said data processing means at said master station and for the selective transmission of said instruction signals from said control means at said master station to said switch means at said satellite station.

14. A data handling system for sequentially connecting a central control station to each of a plurality of satellite stations for monitoring and recording data received from said satellite stations and for transmitting command and command execution signals to control conditions at the satellite station, said central control station and each of said satellite stations being connected by a commercial voice quality telephone transmission channel including commercial telephone switching exchanges whereby each satellite station is called by automatic dialing apparatus located at the central control station;

said central control station comprising: a register means for recording data received from each satellite station, and a printing unit for generating command signals for effecting said commands at the satellite station;

a data transmission link connecting said central control station to each of said satellite stations comprising a commercial telephone line connected through switching exchanges and having voice quality characteristics; and a plurality of satellite stations remote from each other and from the central control station with each satellite station comprising: a plurality of registers for storing data indicative of conditions detected at said remote station, a plurality of means for varying said conditions, and scanning means for scanning sequentially the data storage registers, switching means responsive to the instruction effecting signal from said central control station for selectively enabling one of said scanning means and said means for varying said conditions, and means for inhibiting condition changes in the register being scanned during the period of time in which the associated scanning means is enabled.

15. Apparatus comprising:

a central station including means for generating and transmitting instruction signals each comprising a two character instruction where each of said characters is defined by a predetermined plurality of binary pulses serially arranged in accordance with a predetermined code, and a satellite station remote from said central station comprising:

means for receiving said instruction signals, said receiving means including input timing circuit means responsive to the receipt of a first binary pulse in each of said instruction signals for generating input timing signals, and input storage means for temporarily storing said instruction signals responsively to said timing signals;

decode circuit means for generating control signals in response to said stored instruction signals and to said input timing signals;

sensor means for generating a plurality of digital signals each related to a variable condition;

control means for controlling at least one of said variable conditions:

switch means for selectively operating said control means responsively to said control signals;

data storage means for storing said digital signals; and means for selectively transmitting said stored digital signals to said central location responsively to said control signals.

16. The apparatus of claim 15 including:

means for storing said control data signal responsive to a first predetermined control signal from said decode circuit means;

means for applying said stored control data signal to said switch means to execute the desired operation of said control means responsively to a second predetermined control signal from said decode circuit means.

17. The apparatus of claim 16 including means for retransmitting said stored control data signal to said central location prior to executing said control data signal.

18. Apparatus comprising:

a central station including means for generating and transmitting instruction signals each comprising a plurality of binary pulses serially arranged in accordance with a predetermined code; and a satellite station remote from said central station comprising:

means for receiving said instruction signals, said receiving means including input timing circuit means responsive to the receipt of a first binary pulse in each of said instruction signals for generating input timing signals, and input storage means for temporarily storing said instruction signals responsively to said timing signals, said input storage means comrising first, second, and third storage registers, and said input timing circuit comprising means for successively loading one instruction character into each of said first, second, and third storage registers;

decode circuit means for generating control signals in response to said stored instruction signals and to said input timing signals;

sensor means for generating a plurality of digital signals each related to a variable condition;

data storage means for storing said digital sgiansl; and means for selectively transmitting said stored digital signals to said central location responsively to said control signals.

19. The apparatus of claim 18 wherein said decode circuit means includes:

means for generating control signals responsively to the instruction characters in said second and thrid storage registers; and, means for generating control signals responsively to the instruction character in said first storage register.

20. The apparatus of claim 19 wherein said satellite station includes a gas/liquid separator having both gas and liquid outlet means, and means responsive to said control signals for selectively supplying production fluid from a selected one of a plurality of oil wells to said separator; and, wherein each of said plurality of digital signals is related to a variable physical condition of the fluid in said outlet means.

21. A method of testing the production of a plurality of remote oil wells comprising:

a. generating at one of the wells a plurality of digital data signals each related to a condition at one of the wells;

b. storing the generated digital data signals at a common location;

c. selectively generating electrical signals at a central station for establishing a voice quality telephonic transmission link via commercial telephone lines and switching exchanges between the central station and the common location;

d. generating serially coded electrical signals at the central station for transmission over the telephonic transmission link to the common location to effect the selective transmission of the stored digital data signals from the common location to the central station;

e. inhibiting the storing of the digital data signals during the tansmission thereof;

f. comparing the successive transmission of the stored digital data signals;

g. retransmitting the stored digital data signals until a predetermined comparison has been made; and h. visually manifesting the digital data signals received at the central station.

22. The method of claim 1 including the step of selectively generating a series of electrical pulses arranged in a predetermined code at the central station for transmission over the telephonic transmission link to the common location to effect the modification of a condition of one of the wells.

23. A method of transferring digital data from a satellite station to a remote master station over commercial voice quality telephone lines and through a plurality of telephone exchanges comprising the steps of:

a. storing data signals at a satellite station:

b. generating at the master station a serially encoded, digital data transmission enabling signal comprising three teletypewriter characters, each character being defined by a predetermined number of binary pulses;

c. detecting a data transmission enabling signal at the satellite station;

d. generating a periodic signal responsively to the detection of the data transmission enabling signal by;

1. temporarily storing each of said three characters in a serial register at the satellite station;
2. transferring each of the first and second characters received at said satellite station from said serial registers into parallel storage registers;
3. decoding the contents of the parallel registers when two characters are stored in said registers to provide satellite station control signals;
4. decoding the contents of the serial registers upon receipt and storage thereby of the third characer; and
5. executing said control signals responsively to the decoding of the contents of said serial register;

e. successively enabling a plurality of gates responsively to the periodic signal; and f. transmitting the stored data through the enabled gate responsively to the periodic signal.

24. A method for selectively interrogating a satellite station from a remote master station comprising the steps of:

establishing a voice quality, telephonic communication link between the master station and the satellite station;

selectively generating at the master station digital, plural bit instruction signals representing a desired control function;

transmitting a station identification signal from the satellite station to the master station responsively to a predetermined instruction signal after establishing the telephonic communication link;

serially transmitting the instruction signals to the satellite station via the established communication link;

receiving the serially transmitted instruction signal at the satellite station and generating a timing signal synchronized with the received plural bits of the instruction signal in response thereto;

storing a first instruction signal received at the satellite station in response to the timing signal;

transmitting from the satellite station to the master station an indication of which instruction signal is stored at the satellite station via the established communication link; and executing the instruction signal stored at the satellite station reponsively to a determination at the master station that the desired instruction signal is stored.

25. The method of claim 24 wherein the communication link is established by:

selectively generating commercial telephone signals corresponding to a telephone number assigned to a predetermined satellite station; and, operatively connecting the selected predetermined satellite station to the master station via commercial telephone lines and switching stations responsively to the generated dialing signals.

26. The method of claim 24 wherein the communication link is established by selectively generating commercial telephone calling signals to a predetermined satellite station periodically and automatically and operatively connecting the selected predetermined satellite station to the master station via commercial telephone lines and switching stations responsively to the generated dialing signals.

27. The method of claim 24 wherein instruction signals are generated by operating a preprogrammed computer at the master station.

28. The method of claim 24 wherein said instruction signals are generated by operating a teletype unit at the master station.

29. The method of claim 24 including the steps of:

sensing a plurality of physical conditions at the satellite station; and, transmitting an alarm indication to the master station in response to the sensing of an abnormal condition.

* * * * *